(12) United States Patent
Hara et al.

(10) Patent No.: US 10,717,468 B2
(45) Date of Patent: Jul. 21, 2020

(54) VEHICLE BODY FRONT STRUCTURE AND IMPACT ABSORBING METHOD OF VEHICLE BODY FRONT STRUCTURE

(71) Applicant: HONDA MOTOR CO., LTD., Minato-ku, Tokyo (JP)

(72) Inventors: Yukiyasu Hara, Wako (JP); Tetsuhiro Arima, Wako (JP); Yasuhito Sato, Wako (JP); Tomoya Takeda, Wako (JP); Hirokazu Kobayashi, Wako (JP); Akihiro Ikeya, Wako (JP); Akira Kobayashi, Wako (JP); Ken Yasui, Wako (JP); Eisei Higuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 36 days.

(21) Appl. No.: 16/071,222

(22) PCT Filed: Jan. 10, 2017

(86) PCT No.: PCT/JP2017/000376
§ 371 (c)(1),
(2) Date: Jul. 19, 2018

(87) PCT Pub. No.: WO2017/130676
PCT Pub. Date: Aug. 3, 2017

(65) Prior Publication Data
US 2019/0118863 A1    Apr. 25, 2019

(30) Foreign Application Priority Data
Jan. 28, 2016    (JP) .................................. 2016-014299

(51) Int. Cl.
*B62D 21/02*    (2006.01)
*B62D 25/20*    (2006.01)
(Continued)

(52) U.S. Cl.
CPC ............. *B62D 21/02* (2013.01); *B62D 21/00* (2013.01); *B62D 21/06* (2013.01); *B62D 21/09* (2013.01);
(Continued)

(58) Field of Classification Search
CPC .............................. B62D 21/11; B62D 21/155
See application file for complete search history.

(56) References Cited

U.S. PATENT DOCUMENTS

| 6,761,242 B2 * | 7/2004 | Yoshida .................. B60K 5/12 180/232 |
| 7,229,099 B2 | 6/2007 | Reim et al. |

(Continued)

FOREIGN PATENT DOCUMENTS

| JP | S49-133323 U | 11/1974 |
| JP | S62-61779 U | 4/1987 |

(Continued)

*Primary Examiner* — Nicole T Verley
(74) *Attorney, Agent, or Firm* — Carrier Blackman & Associates, P.C.; William D. Blackman; Joseph P. Carrier

(57) ABSTRACT

In a vehicle body front structure, a sub frame is fixed to front mount brackets and rear mount brackets of a pair of front side frames. A power unit is arranged on the front side of the sub frame in the vehicle body, and the power unit is supported by the pair of front side frames. A tilt surface is formed on the sub frame, and the tilt surface tilts to ascend toward the rear of the vehicle body. A rear portion of the power unit faces the tilt surface.

5 Claims, 24 Drawing Sheets

(51) Int. Cl.
*B62D 21/00* (2006.01)
*B62D 21/15* (2006.01)
*B62D 25/08* (2006.01)
*B62D 21/06* (2006.01)
*B62D 21/09* (2006.01)
*B62D 21/11* (2006.01)

(52) U.S. Cl.
CPC ............ *B62D 21/11* (2013.01); *B62D 21/152* (2013.01); *B62D 21/155* (2013.01); *B62D 25/08* (2013.01); *B62D 25/085* (2013.01); *B62D 25/20* (2013.01); *B62D 25/2018* (2013.01)

(56) References Cited

U.S. PATENT DOCUMENTS

| | | | |
|---|---|---|---|
| 7,654,543 B2 | 2/2010 | Tanaka et al. | |
| 7,669,688 B2 * | 3/2010 | Yamaguchi | B62D 21/152 180/232 |
| 7,926,609 B2 * | 4/2011 | Kusaka | B60G 99/004 180/232 |
| 8,480,102 B2 * | 7/2013 | Yamada | B62D 21/155 180/311 |
| 8,490,988 B2 * | 7/2013 | Takeshita | B62D 21/155 280/124.109 |
| 8,672,393 B2 * | 3/2014 | Tomozawa | B62D 25/082 296/187.09 |
| 8,794,370 B2 * | 8/2014 | Hiramatsu | B60K 17/16 180/274 |
| 9,045,172 B2 | 6/2015 | Gopal et al. | |
| 9,096,275 B2 * | 8/2015 | Yasui | B62D 21/11 |
| 9,150,251 B2 * | 10/2015 | Ghislieri | B62D 21/152 |
| 9,150,253 B2 * | 10/2015 | Watanabe | B62D 21/11 |
| 9,352,785 B2 * | 5/2016 | Winberg | B62D 21/11 |
| 9,751,565 B2 * | 9/2017 | Tatsuwaki | B62D 21/155 |
| 10,494,028 B2 * | 12/2019 | Madasamy | B62D 25/082 |
| 2004/0046381 A1 | 3/2004 | Yoshida et al. | |
| 2011/0095568 A1 * | 4/2011 | Terada | B62D 25/088 296/187.09 |
| 2011/0316295 A1 | 12/2011 | Yamada et al. | |
| 2012/0187724 A1 | 6/2012 | Tomozawa et al. | |
| 2014/0319880 A1 | 10/2014 | Shigihara | |
| 2015/0166104 A1 | 6/2015 | Ohhama et al. | |
| 2016/0207569 A1 | 7/2016 | Iwamoto | |
| 2018/0312198 A1 * | 11/2018 | Shimizu | B62D 21/155 |
| 2020/0017146 A1 * | 1/2020 | Tomizawa | B60L 50/66 |

FOREIGN PATENT DOCUMENTS

| | | | |
|---|---|---|---|
| JP | H05-62383 U | 8/1993 | |
| JP | H11-091620 A | 4/1999 | |
| JP | 2004-098799 A | 4/2004 | |
| JP | 2006-082574 A | 3/2006 | |
| JP | 2007-118874 A | 5/2007 | |
| JP | 2008056191 A * | 3/2008 | |
| JP | 2009227120 A * | 10/2009 | |
| JP | 2010-179898 A | 8/2010 | |
| JP | 2010-274912 A | 12/2010 | |
| JP | 2011-088597 A | 5/2011 | |
| JP | 2012-006545 A | 1/2012 | |
| JP | 2012-153258 A | 8/2012 | |
| JP | 2012-214213 A | 11/2012 | |
| JP | 2013-018434 A | 1/2013 | |
| JP | 2013-032042 A | 2/2013 | |
| JP | 2013-119313 A | 6/2013 | |
| JP | 2014-019269 A | 2/2014 | |
| JP | 5417463 B2 | 2/2014 | |
| JP | 2014080090 A * | 5/2014 | |
| JP | 2015-047919 A | 3/2015 | |
| WO | WO-2012133101 A1 * | 10/2012 | ........... B62D 21/152 |
| WO | 2013/108353 A1 | 7/2013 | |
| WO | 2014/017260 A1 | 1/2014 | |
| WO | WO-2015133050 A1 * | 9/2015 | ........... B62D 21/152 |

* cited by examiner

VEHICLE BODY FRONT STRUCTURE AND IMPACT ABSORBING METHOD OF VEHICLE BODY FRONT STRUCTURE

TECHNICAL FIELD

The present invention relates to a vehicle body front structure in which a sub frame is supported by front side frames, and a power unit is arranged in front of the sub frame in the vehicle body, and an impact absorbing method of the vehicle body front structure.

BACKGROUND ART

There is known a vehicle body front structure in which the front fastening portions and the rear fastening portions of a sub frame are connected from below to front side frames, a front bulkhead is provided on the front portions of the front side frames, and the lower end of the front bulkhead and the front end of the sub frame are connected by an extended arm (for example, see PTL 1).

According to this vehicle body front structure, when an impact load is input to the lower portion of the front bulkhead by a front collision, the vicinity of the connecting portion between the extended arm and the sub frame bends downward. When the vicinity of the connecting portion bends downward, the sub frame starts rotating downward using the rear end of the sub frame as a fulcrum, and the front fastening portions of the sub frame separate from the front side frames.

Here, the rear fastening portions are provided on the front side of the rear end of the sub frame in the vehicle body. Hence, when the sub frame rotates downward using the rear end as a fulcrum, the rear fastening portions of the sub frame are separated from the front side frames.

The sub frame is thus separated from the front side frames, and it is therefore possible to ensure the deformation amount of the front side frames and absorb impact energy input by the front collision.

In the vehicle body front structure of PTL 1, however, the sub frame is rotated downward only by the extended arm that connects the lower end of the front bulkhead and the front end of the sub frame. Hence, to further increase the impact energy absorbing amount, a contrivance to further ensure the deformation amount of the front side frames is needed.

There is also known a vehicle body front structure in which front side frames are deformed by a front collision, thereby separating the front fastening portions and the rear fastening portions of a sub frame and thus separating the sub frame from the front side frames. It is therefore possible to ensure the deformation amount of the front side frames and absorb impact energy input by the front collision (for example, see PTL 2).

In the vehicle body front structure of PTL 2, however, the front fastening portions and the rear fastening portions of the sub frame need to be separated from the front side frames only by the deformation of the front side frames. Hence, it is difficult to reliably separate the sub frame from the front side frames.

For this reason, the sub frame remains unseparated from the front side frames, and the sub frame becomes an obstruction. It is difficult to sufficiently ensure the deformation amount of the front side frames and increase the impact energy absorbing amount.

There is also known a vehicle body front structure in which a power train is bumped against the catcher bracket of a sub frame by a front collision, an impact load is input to the catcher bracket horizontally toward the rear of the vehicle body, and the rear fastening portions of the sub frame are separated from the front side frames by the input impact load only by a shearing load (for example, see PTL 3).

However, it is difficult to separate the rear fastening portions of the sub frame from the front side frames only by the shearing load, as in the vehicle body front structure of PTL 3.

For this reason, the sub frame remains unseparated from the front side frames, and the sub frame becomes an obstruction. It is difficult to sufficiently ensure the deformation amount of the front side frames and increase the impact energy absorbing amount.

CITATION LIST

Patent Literature

PTL 1: Japanese Patent No. 5417463
PTL 2: U.S. Pat. No. 7,229,099
PTL 3: U.S. Pat. No. 9,045,172

SUMMARY OF INVENTION

Technical Problem

It is an object of the present invention to provide a vehicle body front structure and an impact absorbing method of the vehicle body front structure capable of reliably separating the front fastening portions and the rear fastening portions of a sub frame from front side frames and reliably absorbing impact energy.

Solution to Problem

In the invention according to one aspect thereof, there is provided a vehicle body front structure comprising a pair of front side frames in each of which a lower horizontal portion, a lower bent portion, a tilt portion, an upper bent portion, and an upper horizontal portion on a side of a dash lower are sequentially continuously extended toward a front of a vehicle body, and each including a front mounting portion provided on the upper bent portion or in the vicinity of the upper bent portion and a rear mounting portion provided on the tilt portion, a sub frame fixed to the front mounting portions and the rear mounting portions from a lower side of the pair of front side frames and configured to support a lower arm of a suspension and a steering gear box, and a power unit arranged on a front side of the sub frame in the vehicle body and supported by the pair of front side frames, wherein the sub frame comprises front arms including front fastening portions formed on left and right front portions of the sub frame and fixed to the front mounting portions, a tilt surface formed between the left and right front arms and tilting to ascend toward a rear of the vehicle body, and rear fastening portions formed on left and right rear portions of the sub frame and fixed to the rear mounting portions, a rear extended portion is extended from the rear fastening portion to a lower surface of the lower horizontal portion via a bent lower surface of the lower bent portion and forms a rear end serving as a fulcrum of a rotation, a concave angular portion is formed in the rear extended portion, and the concave angular portion faces a ridge of the lower horizontal portion formed into a curve with a convex shape on the front side frame, and a rear portion of the power unit faces the tilt surface, the sub frame can rotate downward using the rear end as the fulcrum of the rotation by interference between the rear portion of the power unit and the tilt surface, and the concave angular portion of the rear extended portion following a movement of the power unit is guided toward the rear of the vehicle body by cancel of fixing in the front fastening portions and the rear fastening portions by the rotation.

In this way, the front fastening portions of the sub frame are fixed to the front mounting portions of the pair of front side frames. In addition, the rear fastening portions of the sub frame are fixed to the rear mounting portions of the pair of front side frames. Furthermore, the power unit is arranged on the front side of the sub frame in the vehicle body, and the power unit is supported by the pair of front side frames via power unit support portions.

In this state, the rear portion of the power unit is made to face the tilt surface of the sub frame.

Here, if the rear portion of the power unit is uneven, the rear portion indicates a projecting portion that projects at the rearmost end.

Hence, the front mounting portion of each front side frame is deformed by a front collision load to separate from the front fastening portion, and the power unit moves toward the rear of the vehicle body together with the power unit support portion. When the power unit moves toward the rear of the vehicle body, the rear portion of the power unit interferes with the tilt surface of the sub frame.

Accordingly, at almost the same timing as the deformation of the front mounting portion separating from the front fastening portion, the component force of the impact load acts downward on the tilt surface so as to separate from the front mounting portion. Hence, the displacement amount (that is, a first phase difference) of the front fastening portion from the front mounting portion becomes large. It is therefore possible to easily separate the front fastening portion of the sub frame from the front mounting portion of the front side frame.

In particular, when the front mounting portion of the front side frame is made to match the tilt surface of the sub frame in the longitudinal direction of the vehicle body, the timing of the deformation of the front mounting portion and the timing of the interference of the rear portion of the power unit with the tilt surface can be made to match.

Accordingly, the displacement amount (that is, the first phase difference) of the front fastening portion separating from the front mounting portion can be made large, and the front fastening portion of the sub frame can reliably be separated.

After the front fastening portion is separated, the power unit continuously moves toward the rear of the vehicle body and continuously interferes with the tilt surface of the sub frame, or the power unit moves onto the upper surface of the sub frame. Hence, the sub frame rotates downward using the rear end of the sub frame as a fulcrum.

Accordingly, the displacement amount (that is, a second phase difference) of the rear fastening portion separating from the rear mounting portion becomes large. It is therefore possible to easily separate the rear fastening portion of the sub frame from the rear mounting portion of the front side frame.

That is, the front fastening portion and the rear fastening portion of the sub frame can sequentially be separated using the deformation of the front mounting portion of the front side frame and the interference of the rear portion of the power unit with the tilt surface of the sub frame. It is therefore possible to reliably separate (that is, drop) the sub frame from the front side frame.

Accordingly, the deformation amount of the front side frame and the moving amount of the power unit can be ensured, and impact energy input by the front collision can reliably be absorbed. When the impact energy is reliably absorbed in this way, for example, application to a small vehicle in which the length of the front side frame is suppressed small is particularly useful.

In addition, the lower end of a front bulkhead and the front end of the sub frame are connected by an extended arm, and the sub frame need not be separated using the extended arm. This can decrease the number of parts and suppress the cost and weight.

In particular, in the power unit, an engine is mounted horizontally, and the engine and a transmission are arranged in the vehicle width direction in general. In this state, the front portion of the power unit is kept almost flat, and the rear portion of the transmission projects toward the rear of the vehicle body. It is therefore possible to regard the rear portion of the transmission as the rear portion of the power unit and bring the rear portion of the power unit close to the tilt surface. That is, the distance between the tilt surface and the rear portion of the power unit can be reduced.

This can adjust the timing of the deformation of the front mounting portion of the front side frame in the direction to separate and the timing of the interference of the rear portion of the power unit with the tilt surface of the sub frame.

In addition, the rear portion of the power unit can also be constituted by mounting a separate member on the power unit.

In the invention according to another aspect, preferably, the front side frame includes a bending deformation permitting portion, and the bending deformation permitting portion permits bending deformation in a direction to decrease an angle of bending of the upper bent portion by a front collision load.

In this way, the bending deformation permitting portion is included in the front side frame. When the bending deformation permitting portion is bent and deformed by the front collision load, the angle of bending of the upper bent portion can be made small. When the bending angle of the upper bent portion is made small, the displacement amount of the front mounting portion of the front side frame, which is displaced upward, can be increased.

Additionally, in the vehicle body front structure, the engine of the power unit is mounted horizontally, and the power unit is arranged near the inside of the front side frame in the vehicle width direction. Hence, to mount the power unit, the front side frame is curved outward in the vehicle width direction. This can increase the displacement amount of the front mounting portion of the front side frame, which is displaced outward in the vehicle width direction.

It is therefore possible to satisfactorily separate the front fastening portion from the front mounting portion of the front side frame.

In the invention according to another aspect, preferably, the front arms comprise arm portions formed on the left and right front portions of the sub frame, and front fastening portions fixed to the arm portions by first fastening members and fixed to the front mounting portions by second fastening members, the front fastening portion comprises slits though which the first fastening member and the second fastening member extend, and the slits include at least one of a vertical slit extending in a vertical direction and having a lower end open, and a horizontal slit extending in a vehicle width direction and having an outer end open.

In this way, the slits are formed in the front fastening portion. In addition, the front fastening portion is fixed to the arm portion (that is, the sub frame side) by the first fastening member extending through the slit and/or the front fastening portion of the front side frame is fixed to the front mounting portion by the second fastening member extending through the slit.

Here, the slit includes at least one of a vertical slit and a horizontal slit. Hence, when the front side frame is bent and deformed upward or outward in the vehicle width direction by a front collision load, the first fastening member and the second fastening member slip from the vertical slit and the horizontal slit, and the first fastening member and the second fastening member can satisfactorily be removed. This can reliably separate the sub frame from the front mounting portion of the front side frame.

In the invention according to another aspect, preferably, the front fastening portion is formed into a hollow shape and comprises a through collar provided inside the hollow shape and extending in a vertical direction, the front mounting portion comprises a nut on a lower surface of the front mounting portion, and a bolt extends through the through collar from below, and the bolt is fastened to the nut, thereby fixing the front fastening portion to the front mounting portion.

In this way, the through collar is provided inside the front fastening portion of the sub frame, and the nut is provided in the front mounting portion of the front side frame. Additionally, the bolt extends through the through collar, and the bolt is fastened to the nut, thereby fixing the front fastening portion to the front mounting portion. Hence, when the front side frame is bent and deformed upward or outward in the vehicle width direction by a front collision load, it is possible to make a crack in the welding portion between the front fastening portion and the through collar or in the welding portion between the front mounting portion and the nut and rupture each welding portion.

Accordingly, it is possible to pull the nut downward from the front mounting portion or pull the through collar upward from the front fastening portion and satisfactorily remove the front fastening portion from the front mounting portion. It is therefore possible to reliably separate the sub frame from the front fastening portion of the front side frame.

In the invention according to another aspect, preferably, the tilt surface of the sub frame has a strength that causes the tilt surface to be deformed into a concave shape by interference of the rear portion of the power unit and fitted on the rear portion.

In this way, when the rear portion of the power unit interferes with the tilt surface of the sub frame, the tilt surface is deformed into a concave shape by the retreat load of the power unit. Additionally, a state in which the rear portion of the power unit is fitted in the tilt surface with the concave shape is maintained.

It is therefore possible to efficiently transmit the retreat load of the power unit to the front fastening portion or the rear fastening portion and cause stress concentration on each fastening portion. This can increase the first phase difference (that is, the displacement amount of the front fastening portion in a direction to separate from the front mounting portion) or the second phase difference (that is, the displacement amount of the rear fastening portion in a direction to separate from the rear mounting portion). Hence, the sub frame can more reliably be separated from the front side frame.

In the invention according to another aspect thereof, preferably, the steering gear box is provided on a rear side of the tilt surface in the vehicle body, and the vehicle body front structure comprises a slider member configured to cover the steering gear box and continue to the tilt surface.

In this way, the slider member that continues to the tilt surface of the sub frame is provided. In addition, the steering gear box is covered with the slider member. Hence, when the rear portion of the power unit interferes with the tilt surface of the sub frame, the rear portion of the power unit can smoothly be guided to the upper surface of the sub frame by the slider member.

Accordingly, the rear portion of the power unit can be prevented from being caught by the steering gear box, and the rear portion can satisfactorily be moved onto the sub frame. It is therefore possible to stably separate the rear fastening portion of the sub frame from the rear mounting portion of the front side frame.

In the invention according to another aspect thereof, preferably, the sub frame is formed into a rigid body, and the rear fastening portions of the sub frame are fixed, by fastening members, on the same axis on the rear mounting portions of the tilt portions together with the lower arm.

In this way, the lower arm of the suspension is fixed on the same axis on the rear mounting portion of the front side frame together with the rear fastening portion of the sub frame. Hence, stress concentration on the rear fastening portion can be caused by a load transmitted to the sub frame by a front collision and a load transmitted from a front wheel to the lower arm.

It is therefore possible to more satisfactorily separate the rear fastening portion of the sub frame from the rear mounting portion of the front side frame.

Here, it is known that the sub frame is normally formed into a rigid body. Hence, when the rear fastening portion of the sub frame and the lower arm are fixed on the same axis on the rear mounting portion of the front side frame, the lower arm can firmly be supported by the rear mounting portion.

Accordingly, the rigidity of the peripheral of the mounting portion of the lower arm improves, and the maneuvering stability can be improved.

In the invention according to another aspect, preferably, the sub frame comprises a frame rear portion formed into one of a substantially arch shape and a substantially V shape in a plan view between the left and right rear fastening portions.

In this way, the frame rear portion of the sub frame is formed into a substantially arch shape or a substantially V shape in a plan view. Here, the retreat load of the power unit or the downward component force of the tilt surface acts on the center of the frame rear portion in the vehicle width direction (that is, the top portion of the substantially arch shape or the substantially V shape in a plan view). Hence, when the frame rear portion is formed into a substantially arch shape or a substantially V shape in a plan view, a high rigidity of the sub frame against the retreat load of the power unit or the downward component force of the tilt surface can be ensured.

This can smoothly rotate the sub frame by the downward component force acting on the tilt surface. It is therefore possible to sequentially satisfactorily separate the front fastening portion and the rear fastening portion of the sub frame from the front side frame.

In addition, when the frame rear portion of the sub frame is formed into a substantially arch shape or a substantially V shape in a plan view, and a high rigidity is ensured, the suspension portion can stably be supported by the sub frame.

The rigidity of the suspension portion (that is, the undercarriage portion) thus increases, and the maneuvering stability can be improved.

In the invention according to another aspect thereof, preferably, the sub frame comprises a rear extended portion integrally or separately extended from the rear fastening portion toward the rear of the vehicle body and outward in a vehicle width direction, and in the rear extended portion, an upper surface of the rear extended portion gradually lowers toward a rear end, thereby reducing a section, and the rear end is connected to a lower surface of the lower horizontal portion.

In this way, the rear extended portion is extended from the rear fastening portion of the sub frame toward the rear of the vehicle body and outward in a vehicle width direction. In addition, the rear end of the rear extended portion is connected to the lower surface of the lower horizontal portion (that is, the front side frame).

Hence, the rear fastening portion of the sub frame can be reinforced by the rear extended portion, and the rigidity of the rear fastening portion can be increased. This allows the sub frame to support the suspension portion in a stable state. It is therefore possible to increase the rigidity of the suspension portion (that is, the undercarriage portion) and improve the maneuvering stability.

In addition, the upper surface of the rear extended portion is gradually lowered toward the rear end. Hence, a concave angular portion is formed by the upper surface and the rear end. Here, a hard ridge is formed by the intersection between the lower surface of the lower horizontal portion of the front side frame and the inner wall of the lower horizontal portion. The concave angular portion faces the ridge.

Hence, after the front fastening portion of the sub frame is separated from the front mounting portion, and the rear fastening portion of the sub frame is separated from the rear mounting portion, the concave angular portion can be guided along the hard ridge toward the rear of the vehicle body. Accordingly, the sub frame can reliably be separated (that is, dropped) from the front side frame.

In the invention according to another aspect thereof, preferably, the vehicle body front structure further comprises a rear mount bracket provided on the rear mounting portion of the front side frame, the lower surface of the lower horizontal portion is arranged at a position lower than a lower surface of the rear mount bracket, and in a state in which the rear fastening portion is fastened to the rear mount bracket, the rear extended portion is extended to the lower surface of the lower horizontal portion via a lower surface of the lower bent portion.

In this way, the rear mount bracket is provided on the rear mounting portion of the front side frame, and the lower surface of the lower horizontal portion is arranged at a position lower than the lower surface of the rear mount bracket. In addition, in the state in which the rear fastening portion is fastened to the rear mount bracket, the rear extended portion is extended to the lower surface of the lower horizontal portion via the lower surface of the lower bent portion.

Hence, the rear end of the sub frame faces the lower surface (that is, the bent lower surface) of the lower bent portion in a contact or adjacent state. Accordingly, when the downward component force acts on the tilt surface of the sub frame, the sub frame can be rotated downward using the rear end of the sub frame as a fulcrum.

Here, the rear mounting portion is provided on the tilt portion. Hence, a long distance can be ensured from the rear mounting portion to the bent lower surface. Accordingly, when the sub frame is rotated downward using the rear end of the sub frame as a fulcrum, a separation load (that is, a pull-out load) acting on the front fastening portion and the rear fastening portion can be increased.

In addition, the front side frame is a frame that forms the skeleton of the vehicle body and is a member with a high strength. Hence, the high strength (that is, hard) lower bent portion can reliably support the rear end of the sub frame. This enables a reliable rotation motion of the sub frame using the rear end of the sub frame as a fulcrum.

In the invention according to another aspect, preferably, a lower surface of the lower bent portion between the tilt portion and the lower horizontal portion is formed into a curve with a downward convex shape, and the rear extended portion is extended along the lower surface of the lower bent portion.

In this way, the lower surface of the lower bent portion is formed into a curve with a downward convex shape, and the rear extended portion is extended along the lower surface of the lower bent portion. Hence, after the rear fastening portion is separated from the rear mounting portion by the downward rotation of the sub frame, the rear extended portion can smoothly be moved toward the rear of the vehicle body along the lower surface of the lower bent portion.

That is, the sub frame can smoothly be moved toward the rear of the vehicle body. This can ensure the moving amount of the power unit toward the rear of the vehicle body and ensure the deformation amount of the front side frame.

In the invention according to another aspect thereof, there is provided a vehicle body front structure comprising: a pair of front side frames in each of which a lower horizontal portion, a lower bent portion, a tilt portion, an upper bent portion, and an upper horizontal portion on a side of a dash lower are sequentially continuously extended toward a front of a vehicle body, and each including a front mounting portion provided on the upper bent portion or in the vicinity of the upper bent portion and a rear mounting portion provided on the tilt portion; a sub frame fixed to the front mounting portions and the rear mounting portions from a lower side of the pair of front side frames and configured to support a lower arm of a suspension and a steering gear box; and a power unit arranged on a front side of the sub frame in the vehicle body and supported by the pair of front side frames, wherein the sub frame comprises: front arms including front fastening portions formed on left and right front portions of the sub frame and fixed to the front mounting portions; a tilt surface formed between the left and right front arms and tilting to ascend toward a rear of the vehicle body; and rear fastening portions formed on left and right rear portions of the sub frame and fixed to the rear mounting portions, a rear portion of the power unit faces the tilt surface, the sub frame comprises a rear extended portion integrally or separately extended from the rear fastening portion toward the rear of the vehicle body and outward in a vehicle width direction, in the rear extended portion, an upper surface of the rear extended portion gradually lowers toward a rear end, thereby reducing a section, and the rear end is connected to a lower surface of the lower horizontal portion, the rear extended portion comprises a reinforcing stay configured to support an input load from the lower arm and formed independently of the sub frame, the reinforcing stay comprises a vertical wall portion extending in a longitudinal direction of the vehicle body and including a rear portion offset inward in the vehicle width direction, and a notch formed on an outer side of the rear portion of the vertical wall portion in the vehicle width direction and opening outward in the vehicle width direction, and the reinforcing stay is fastened to the lower surface of the lower horizontal portion by a fastening member extending through the notch.

In this way, the vertical wall portion is formed on the rear extended portion (that is, the reinforcing stay), and the rear portion of the vertical wall portion is offset (shifted) inward in the vehicle width direction. Hence, after the rear fastening portion of the sub frame separates from the rear mounting portion of the front side frame, the rear portion of the vertical wall portion is bent inward in the vehicle width direction by the retreat load of the power unit.

In addition, the notch is formed on the outer side of the rear portion of the vertical wall portion in the vehicle width direction, and the notch is opened outward in the vehicle width direction. Furthermore, the reinforcing stay is fastened to the lower surface of the lower horizontal portion by the fastening member extending through the notch. Hence, when the rear portion of the vertical wall portion is bent inward in the vehicle width direction, the notch moves inward in the vehicle width direction, and the notch disengages from the fastening member.

This can reliably drop the sub frame from the front side frame.

In the invention according to another aspect, preferably, the sub frame comprises a storage concave portion formed on a rear side of the tilt surface of a lower portion of the sub frame, recessed upward, and extended in a vehicle width direction.

In this way, the storage concave portion is formed on the rear side of the tilt surface of the lower portion of the sub frame. The storage concave portion is recessed upward and extended in the vehicle width direction. Accordingly, a stabilizer can be arranged in the storage concave portion, and the stabilizer can be protected by the sub frame.

In the invention according to another aspect, preferably, the sub frame comprises a sub frame main body formed into a hollow body by two high strength steel sheets on upper and lower sides, and the front arms formed on left and right front portions of the sub frame main body, each front arm being formed into a hollow column by two high strength steel sheets on front and rear sides, and a lower arm support portion configured to support the lower arm is formed by the high strength steel sheet on the front side and the high strength steel sheet on the upper side.

In this way, the sub frame main body of the sub frame is formed into a hollow body by two high strength steel sheets on upper and lower sides. In addition, the front arm is formed into a hollow column by two high strength steel sheets on front and rear sides. This can improve the rigidity of the sub frame main body and the front arm (that is, the sub frame).

Furthermore, the lower arm support portion is formed using the high strength steel sheet on the front side and the high strength steel sheet on the upper side. The lower arm support portion is formed using the high strength steel sheet on the front side and the high strength steel sheet on the upper side in this way, thereby decreasing the number of parts of the sub frame.

In the invention according to another aspect thereof, preferably, the dash lower is provided on the front side frame, the vehicle body front structure further comprises a dash cross member provided on a cabin-side surface of the dash lower, and the dash cross member is extended in a vehicle width direction to cross the tilt portion of the front side frame and faces the rear mounting portion.

In this way, the dash cross member is provided on the cabin-side surface of the dash lower, thereby providing the dash cross member on the tilt portion of the front side frame via the dash lower. In addition, the dash cross member is made to face the rear mounting portion.

Hence, even if the rear mounting portion is mounted on the inner side of the front side frame in the vehicle width direction, the rear mounting portion can firmly be supported by the dash cross member. This can satisfactorily separate the rear fastening portion from the rear mounting portion.

In addition, when the dash cross member is provided on the cabin-side surface of the dash lower, the dash cross member need not be projected to the engine room side. Hence, the moving amount of the power unit toward the rear of the vehicle body can be increased, and the deformation amount of the front side frame can be increased. It is therefore possible to suitably ensure the collision stroke by a front collision and reliably absorb the impact energy.

In the invention according to another aspect, preferably, the power unit comprises an engine and a transmission, the transmission projects toward the rear of the vehicle body with respect to the engine, the projecting portion forms the rear portion of the power unit, and a vicinity of the rear portion of the power unit is connected to the sub frame via a torque rod.

In this way, the transmission is projected toward the rear of the vehicle body with respect to the engine, and the rear portion of the power unit is formed by the projected portion. In addition, the vicinity of the rear portion of the power unit is connected to the sub frame via the torque rod.

Here, the connection between the power unit and the sub frame is normally canceled by a rupture or the like in the torque rod caused by the retreat load of the power unit.

In addition, the rear portion of the power unit is connected to the vicinity of the torque rod. It is therefore possible to suppress the swing of the rear portion of the power unit small and also reduce the interval between the rear portion of the power unit and the tilt surface of the sub frame in a state in which interference during a normal time is inhibited.

This can make the rear portion of the power unit interfere with the tilt surface of the sub frame early (quickly) and reliably at the time of a front collision and satisfactorily separate the sub frame from the front side frame.

In the invention according to another aspect, preferably, in the torque rod, a rear connecting portion connected to the sub frame and a front connecting portion connected to the power unit are offset in a vertical direction.

In this way, the front connecting portion is connected to the power unit, and the rear connecting portion of the torque rod is connected to the sub frame. Here, the rear connecting portion is located on the front side of the rear fastening portion of the sub frame in the vehicle body.

Hence, when the rear connecting portion is offset to the upper side with respect to the front connecting portion, the retreat load of the power unit is transmitted to the sub frame via the torque rod, and an upward component force acts on the sub frame.

In this state, the power unit further moves toward the rear of the vehicle body. The retreat load of the power unit causes a break, bending, or cut-off in the torque rod, and the rear portion of the power unit interferes with the tilt surface of the sub frame. Accordingly, the component force of the front collision load acts downward on the tilt surface.

Here, the upward component force acts on the sub frame until just before the downward component force acts on the tilt surface. Hence, when the downward component force acts on the tilt surface, the upward component force is removed, and the downward component force acting on the sub frame can thus be increased.

This can more satisfactorily separate the sub frame from the front side frame.

On the other hand, when the rear connecting portion is offset to the lower side with respect to the front connecting portion, the retreat load of the power unit is transmitted to the sub frame via the torque rod, and a downward component force acts on the sub frame. In the state in which the downward component force acts on the sub frame, the power unit further moves toward the rear of the vehicle body. The retreat load of the power unit causes a break, bending, or cut-off in the torque rod, and the rear portion of the power unit interferes with the tilt surface of the sub frame. By the interference of the power unit, a downward component force acts on the tilt surface.

In this way, when the downward component force is made to act on the sub frame before the downward component force acts on the tilt surface by the interference of the power unit, the downward component force acting on the sub frame can be increased. This can more satisfactorily separate the sub frame from the front side frame.

In the invention according to another aspect, preferably, the vehicle body front structure further comprises a front bulkhead provided on the front portion of the front side frame, and an under load path member configured to connect the front bulkhead and a front portion of the sub frame.

In this way, the front bulkhead and the front portion of the sub frame are connected by the under load path member. Accordingly, in the early stage of a front collision, it is possible to cause axial collapse of the under load path member by a front collision load and absorb the impact energy.

In addition, the rear portion of the power unit interferes with the tilt surface of the sub frame, and a downward load can be made to act on the tilt surface. This can separate the front fastening portion of the sub frame from the front mounting portion of the front side frame.

Furthermore, in the later stage of the front collision, a downward component force acts from the under load path member that has caused the axial collapse on the front portion of the sub frame. Additionally, the power unit continuously moves toward the rear of the vehicle body. In addition to the movement of the power unit toward the rear of the vehicle body, the downward component force by the under load path member is made to act, thereby separating the rear fastening portion from the rear mounting portion of the front side frame.

It is therefore possible to satisfactorily drop the sub frame from the front side frame.

Accordingly, in the later stage of the front collision, the deformation amount of the front side frame and the moving amount of the power unit can be ensured, and impact energy input by the front collision can be absorbed.

In this way, when the front bulkhead and the front portion of the sub frame are connected by the under load path member, the impact energy can satisfactorily be absorbed in both the early stage and the later stage of the front collision.

In the invention according to another aspect, preferably, the front side frame comprises a first bent portion deformed into a substantially V shape inward in a vehicle width direction by an impact load input to a front end by a front collision, a second bent portion located on a rear side of the first bent portion in the vehicle body and deformed into a substantially V shape outward in the vehicle width direction, and a third bent portion located on a rear side of the second bent portion in the vehicle body and deformed into a substantially V shape when a portion on a side of the second bent portion is bent outward in the vehicle width direction, and the front mounting portion of the front side frame is provided between the second bent portion and the third bent portion.

In this way, the front side frame includes the first bent portion, the second bent portion, and the third bent portion. Hence, the front side frame is bent by a front collision in the vehicle width direction at the three, first to third bent portions.

Here, the front mounting portion of the front side frame is provided between the second bent portion and the third bent portion. The front fastening portion of the sub frame is connected to the front mounting portion. In addition, a frame portion (that is, the upper bent portion or the vicinity of the upper bent portion) of the front side frame between the second bent portion and the third bent portion is deformed outward in the vehicle width direction.

Hence, the frame portion moves in a direction to separate from the front fastening portion of the sub frame. This can increase the retreat amount of the power unit and more satisfactorily separate the front fastening portion of the sub frame from the front mounting portion of the front side frame.

In the invention according to another aspect, preferably, the front fastening portion comprises a slit extending outward in the vehicle width direction and having an outer end open, and the front fastening portion is fixed to the front mounting portion by a fastening member extending through the slit from below.

In this way, the slit (notch) is formed in the front fastening portion. The slit is extended outward in the vehicle width direction, and the outer end is opened. In addition, the front fastening portion is fixed to the front mounting portion by a fastening member extending through the slit.

Here, the front mounting portion is provided in the frame portion between the second bent portion and the third bent portion, and the frame portion is deformed by a front collision outward in the vehicle width direction. Hence, the slit of the front fastening portion moves in a direction to separate from the fastening member and disengages from the fastening member. This can more satisfactorily separate the front fastening portion of the sub frame from the front mounting portion of the front side frame.

In the invention according to another aspect, preferably, the vehicle body front structure further comprises a mounting bracket is mounted on the power unit, and a torque rod configured to connect the mounting bracket and the sub frame and suppress a vibration of the power unit, the mounting bracket comprises a slit extending toward a front of the vehicle body and having a front portion open, and is connected to a front connecting portion of the torque rod by a fastening member extending through the slit.

In this way, the mounting bracket is mounted on the power unit, and the mounting bracket and the sub frame are connected by the torque rod. In addition, the slit (notch) is formed in the mounting bracket, the slit is extended toward the front of the vehicle body, and the front portion is opened. Furthermore, the front connecting portion of the torque rod is connected to the mounting bracket by the fastening member extending through the slit.

Here, when the power unit moves toward the rear of the vehicle body in a front collision, the mounting bracket (that is, the slit) moves toward the rear of the vehicle body. Hence, the slit disengages from the fastening member, and the movement of the power unit toward the rear of the vehicle body is not impeded by the torque rod.

This can make the rear portion of the power unit satisfactorily interfere with the tilt surface of the sub frame and more satisfactorily separate the sub frame from the front side frame.

In the invention according to another aspect, preferably, the tilt surface of the sub frame is formed into a slope shape with which the rear portion of the power unit moving toward the sub frame interferes first.

In this way, the tilt surface of the sub frame is formed into a slope shape capable of freely setting the tilt angle or tilt length. In addition, when the power unit is moved toward the rear of the vehicle body, the rear portion of the power unit interferes with the tilt surface first. It is therefore possible to make the downward component force act on the tilt surface in an early stage and quickly separate the front fastening portion of the sub frame from the front mounting portion of the front side frame.

Furthermore, in a state in which the front fastening portion of the sub frame is separated, the power unit moves toward the rear of the vehicle body, and the tilt surface having the slope shape with a sufficient length or a sufficiently large angle is thus pressed downward. Hence, the sub frame largely rotates downward using the rear end on the rear side in the vehicle body with respect to the rear fastening portion as a fulcrum. This can quickly separate (that is, drop) the rear fastening portion of the sub frame from the rear mounting portion of the front side frame.

When the sub frame is quickly separated from the front side frame in this way, the deformation amount of the front side frame can early be ensured, and impact energy input by the front collision can more reliably be absorbed.

In the invention according to another aspect, preferably, a tilt angle of the tilt surface is set such that, by a load input to the tilt surface when the rear portion of the power unit interferes with the tilt surface, the rear fastening portion is separated from the rear mounting portion before a front portion of the sub frame interferes with the ground, and the sub frame drops downward toward the rear of the vehicle body together with the steering gear box.

In this way, the tilt angle of the tilt surface is set such that, by the retreat load of the power unit input from the power unit to the tilt surface, the rear fastening portion of the sub frame is separated from the rear mounting portion of the front side frame before the front portion of the sub frame interferes with the ground. In addition, after the separation of the rear fastening portion of the sub frame, the sub frame is dropped downward toward the rear of the vehicle body by the retreat load of the power unit together with the steering gear box.

Hence, the power unit can be retreated up to the front of the dash lower, and the bending deformation amount of the front side frame can more satisfactorily be ensured. This can sufficiently bend and deform the front side frame and further increase the absorption amount of impact energy. Hence, setting the tilt angle to a predetermined angle is particularly useful for a small vehicle in which the length of the front side frame is suppressed small.

In the invention according to another aspect thereof, preferably, the vehicle body front structure further comprises a rear mount bracket provided on the rear mounting portion of the front side frame, the rear mount bracket comprises an upper bracket portion provided on the rear mounting portion and formed from a high strength steel sheet, and a lower bracket portion provided on the upper bracket portion and formed from a low strength steel sheet having a strength lower than the upper bracket portion, to which the rear fastening portion of the sub frame is fastened, and the rear mount bracket is formed into a two-stage structure by the upper bracket portion and the lower bracket portion.

In this way, the upper bracket portion of a high strength steel sheet is provided on the rear mounting portion of the front side frame, and the lower bracket portion of a low strength steel sheet is provided on the upper bracket portion. In addition, the rear fastening portion of the sub frame is fastened to the lower bracket portion of the low strength steel sheet. In this way, when the upper bracket portion is formed by the high strength steel sheet, the rear mount bracket can be made lightweight, and the supporting rigidity of the sub frame by the rear mount bracket can be increased. This can improve the maneuvering stability.

On the other hand, when the lower bracket portion is formed by the low strength steel sheet, the lower bracket portion of the low strength steel sheet can be torn, and the rear fastening portion of the sub frame can satisfactorily be separated from the lower bracket.

In the invention according to another aspect thereof, there is provided an impact absorbing method of a vehicle body front structure in which a power unit is supported by a pair of front side frames, arranged on a rear side of the power unit in a vehicle body, front fastening portions and rear fastening portions of a sub frame are connected to the pair of front side frames, and a tilt surface facing a rear portion of the power unit is formed on the sub frame, comprising: inputting an impact load of a front collision to a front end of the front side frame toward a rear of the vehicle body in an early stage of the front collision; bending at three, a first bent portion, a second bent portion, and a third bent portion sequentially from a front to the rear; deforming a front mounting portion of the front side frame outward in a vehicle width direction to separate from the front fastening portion by the impact load to generate a first phase difference that separates the front fastening portion of the sub frame from the front side frame, and moving the power unit sandwiched between the left and right first bent portions toward the rear of the vehicle body; making the rear portion of the power unit interfere with the tilt surface of the sub frame to press the sub frame downward in a later stage of the front collision, thereby further moving the power unit toward the rear of the vehicle body by the impact load of the front collision and moving the power unit onto the sub frame; pressing the sub frame downward by the power unit, thereby rotating the sub frame downward using a rear end of the sub frame as a fulcrum; and generating a second phase difference that separates the rear fastening portion provided on a front side of the rear end of the sub frame in the vehicle body from a rear mounting portion of the front side frame.

In this way, in the early stage of a front collision, the power unit is moved toward the rear of the vehicle body by an impact load. By moving the power unit, the rear portion of the power unit is made to interfere with the tilt surface of the sub frame. Hence, the component force of the impact load acts downward on the tilt surface, and the displacement amount (that is, the first phase difference (the displacement amount or the moving amount between the front mounting portion and the front fastening portion)) of the front fastening portion from the front mounting portion becomes large. It is therefore possible to separate the front fastening portion of the sub frame from the front mounting portion of the front side frame.

In the later stage of the front collision, the power unit is moved onto the sub frame, and the sub frame thus rotates downward using the rear end of the sub frame as a fulcrum. Hence, the displacement amount (that is, the second phase difference (the displacement amount or the moving amount between the rear mounting portion and the rear fastening portion)) of the rear fastening portion from the rear mounting portion becomes large. It is therefore possible to separate the rear fastening portion of the sub frame from the rear mounting portion of the front side frame.

In this way, the front fastening portion and the rear fastening portion of the sub frame can sequentially be separated using the movement of the power unit toward the rear of the vehicle body. Hence, the sub frame can reliably be separated (that is, dropped) from the front side frame. The deformation amount of the front side frame can thus be ensured, and impact energy input by the front collision can reliably be absorbed.

In addition, the sub frame is separated using the movement of the power unit toward the rear of the vehicle body. Hence, the lower end of the front bulkhead and the front end of the sub frame are connected by an extended arm, and the sub frame need not be separated using the extended arm. This can decrease the number of parts and suppress the cost and weight.

In the invention according to another aspect, there is provided an impact absorbing method of a vehicle body front structure in which a power unit is supported by a pair of front side frames, arranged on a rear side of the power unit in a vehicle body, front fastening portions and rear fastening portions of a sub frame are connected to the pair of front side frames, and a tilt surface facing a rear portion of the power unit is formed on the sub frame, comprising inputting an impact load of a front collision to a front end of the front side frame toward a rear of the vehicle body in an early stage of the front collision, deforming a front mounting portion of the front side frame in a direction to separate from the front fastening portion by the impact load and moving the power unit toward the rear of the vehicle body, making the rear portion of the power unit interfere with the tilt surface of the sub frame to press the sub frame downward, thereby generating a first phase difference that separates the front fastening portion of the sub frame from the front side frame, moving the power unit toward the rear of the vehicle body by the impact load of the front collision and moving the power unit onto the sub frame in a later stage of the front collision, pressing the sub frame downward by the power unit, thereby rotating the sub frame downward using a rear end of the sub frame as a fulcrum, and generating a second phase difference that separates the rear fastening portion provided on a front side of the rear end of the sub frame in the vehicle body from a rear mounting portion of the front side frame.

In this way, in the early stage of a front collision, the power unit is moved toward the rear of the vehicle body by an impact load. By moving the power unit, the rear portion of the power unit is made to interfere with the tilt surface of the sub frame. Hence, the component force of the impact load acts downward on the tilt surface, and the displacement amount (that is, the first phase difference (the displacement amount or the moving amount between the front mounting portion and the front fastening portion)) of the front fastening portion from the front mounting portion becomes large. It is therefore possible to separate the front fastening portion of the sub frame from the front mounting portion of the front side frame.

In the later stage of the front collision, the power unit is moved onto the sub frame, and the sub frame thus rotates downward using the rear end of the sub frame as a fulcrum. Hence, the displacement amount (that is, the second phase difference (the displacement amount or the moving amount between the rear mounting portion and the rear fastening portion)) of the rear fastening portion from the rear mounting portion becomes large. It is therefore possible to separate the rear fastening portion of the sub frame from the rear mounting portion of the front side frame.

In this way, the front fastening portion and the rear fastening portion of the sub frame can sequentially be separated using the movement of the power unit toward the rear of the vehicle body. Hence, the sub frame can reliably be separated (that is, dropped) from the front side frame. The deformation amount of the front side frame can thus be ensured, and impact energy input by the front collision can reliably be absorbed.

In addition, the sub frame is separated using the movement of the power unit toward the rear of the vehicle body. Hence, the lower end of the front bulkhead and the front end of the sub frame are connected by an extended arm, and the sub frame need not be separated using the extended arm. This can decrease the number of parts and suppress the cost and weight.

In the invention according to another aspect, preferably, the front side frame is bent and deformed at least upward.

In this way, the front side frame is bent and deformed upward. Hence, the front mounting portion of the front side frame can be raised upward. Accordingly, the displacement amount (that is, the first phase difference) of the front fastening portion from the front mounting portion can satisfactorily be ensured.

It is therefore possible to reliably separate the front fastening portion of the sub frame from the front mounting portion of the front side frame.

In the invention according to another aspect, preferably, the front side frame is bent and deformed at least outward in a vehicle width direction.

In this way, the front side frame is bent and deformed outward in the vehicle width direction. Hence, the front mounting portion of the front side frame can be moved outward in the vehicle width direction. Accordingly, the displacement amount (that is, the first phase difference) of the front fastening portion from the front mounting portion can satisfactorily be ensured.

It is therefore possible to reliably separate the front fastening portion of the sub frame from the front mounting portion of the front side frame.

Advantageous Effects of Invention

According to the present invention, the front fastening portions and the rear fastening portions of the sub frame can reliably be dropped from the front side frames using the movement of the power unit toward the rear of the vehicle body. It is therefore possible to ensure the deformation amount of the front side frames and the moving amount of the power unit and reliably absorb impact energy.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Figure 1:
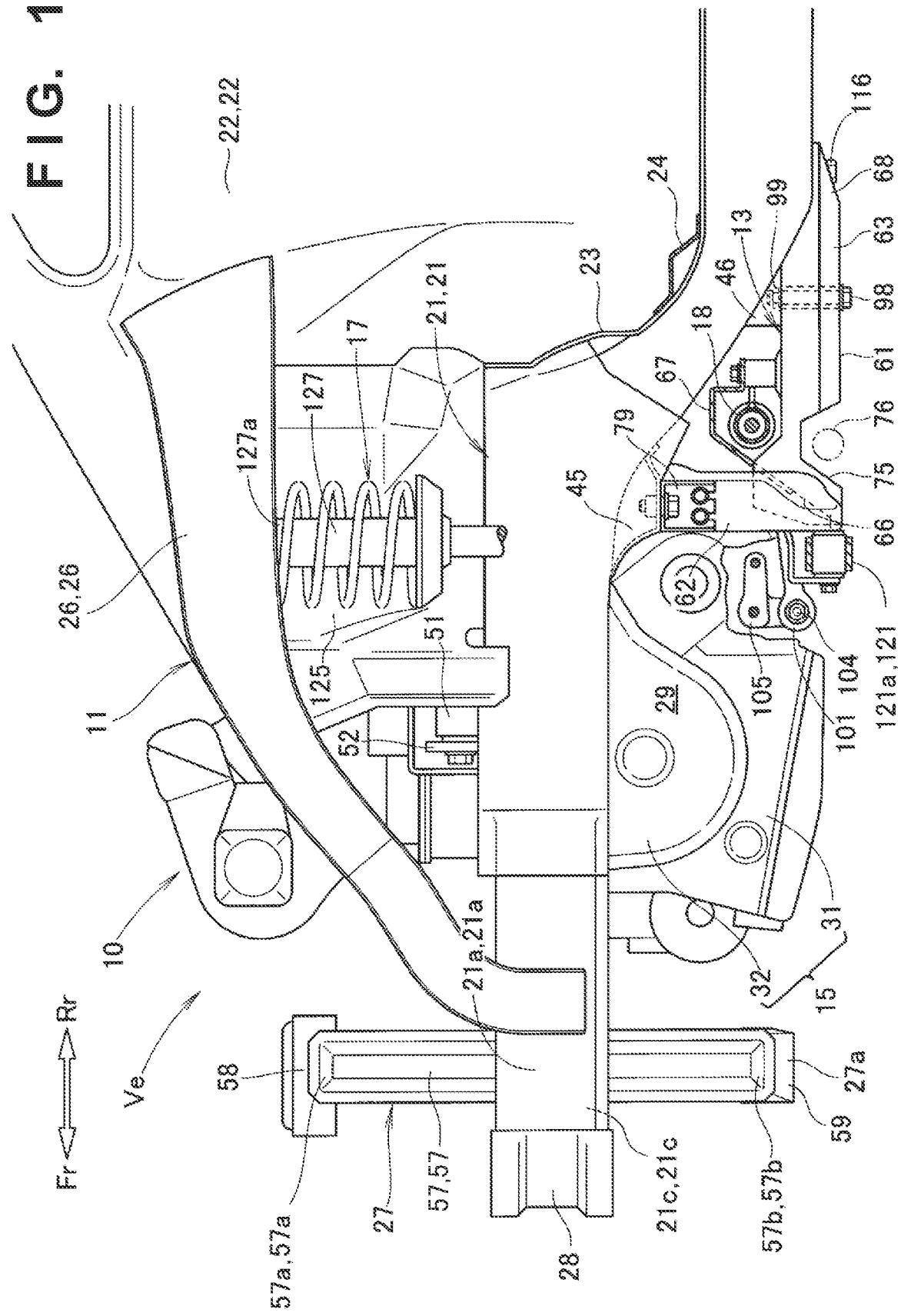
FIG. 1 is a side view showing a vehicle body front structure according to the first embodiment of the present invention.

The best mode for carrying out the present invention will now be described with reference to the accompanying drawings. Note that "front (Fr)", "rear (Rr)", "left (L)", and "right (R)" comply with directions viewed from a driver.

First Embodiment

A vehicle body front structure 10 according to the first embodiment and an impact absorbing method of the vehicle body front structure 10 will be described.

Note that the vehicle body front structure 10 is a substantially bilaterally symmetrical structure. Hence, the left and right members of the vehicle body front structure 10 are denoted by the same reference numerals. The left members will be described in detail, and a description of the right members will be omitted.

Figure 2:
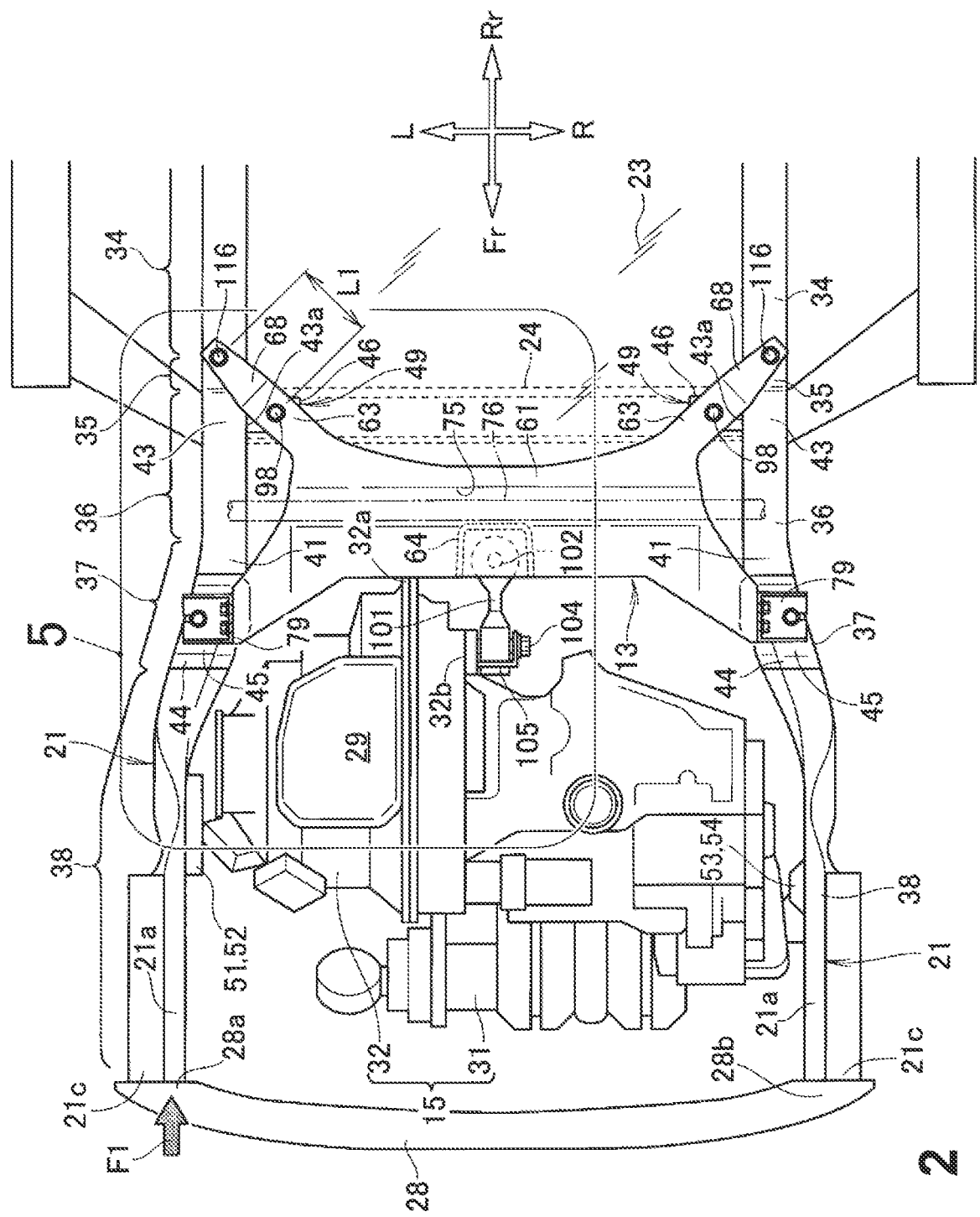
FIG. 2 is a bottom view showing the vehicle body front structure in FIG. 1.

As shown in FIGS. 1 and 2, the vehicle body front structure 10 is a portion that constitutes the front structure of a vehicle Ve. The vehicle body front structure 10 includes a vehicle body skeleton portion 11 that forms the skeleton of the vehicle body front structure 10, a sub frame 13 provided in the vehicle body skeleton portion 11, a power unit 15 supported by the vehicle body skeleton portion 11, suspension portions 17 provided on the left and right sides of the power unit 15, and a steering gear box 18 supported by the sub frame 13.

The vehicle body skeleton portion 11 includes a left front side frame 21 and a right front side frame 21 (a pair of front side frames) provided on both sides of the vehicle body, front pillars 22 provided on the outer sides of the front side frames 21 in the vehicle width direction, a lower dashboard (dash lower) 23 arranged between the left front pillar 22 and the right front pillar 22, and a dash cross member 24 provided on the lower dashboard 23.

In addition, the vehicle body skeleton portion 11 includes upper/lower members 26 extending from the left front pillar 22 and the right front pillar 22 toward the front of the vehicle body, a front bulkhead 27 provided on front portions 21a of the left front side frame 21 and the right front side frame 21, and a front bumper beam 28 arranged on the front side of the front bulkhead 27 in the vehicle body.

The left front side frame 21, the right front side frame 21, the front bumper beam 28, and the lower dashboard 23 form an engine room 29. The power unit 15 is arranged in the engine room 29. As an example, the power unit 15 is a unit in which an engine 31 and a transmission 32 are integrated.

Here, the engine 31 is arranged horizontally, and the engine 31 and the transmission 32 are arranged in the vehicle width direction. That is, the power unit 15 is mounted in a lateral state in which it extends in the vehicle width direction.

In this state, the front portion of the power unit 15 is kept almost flat, and a rear portion (rear projecting portion) 32a (also see FIG. 3) of the transmission 32 projects toward the rear of the vehicle body.

Figure 3:
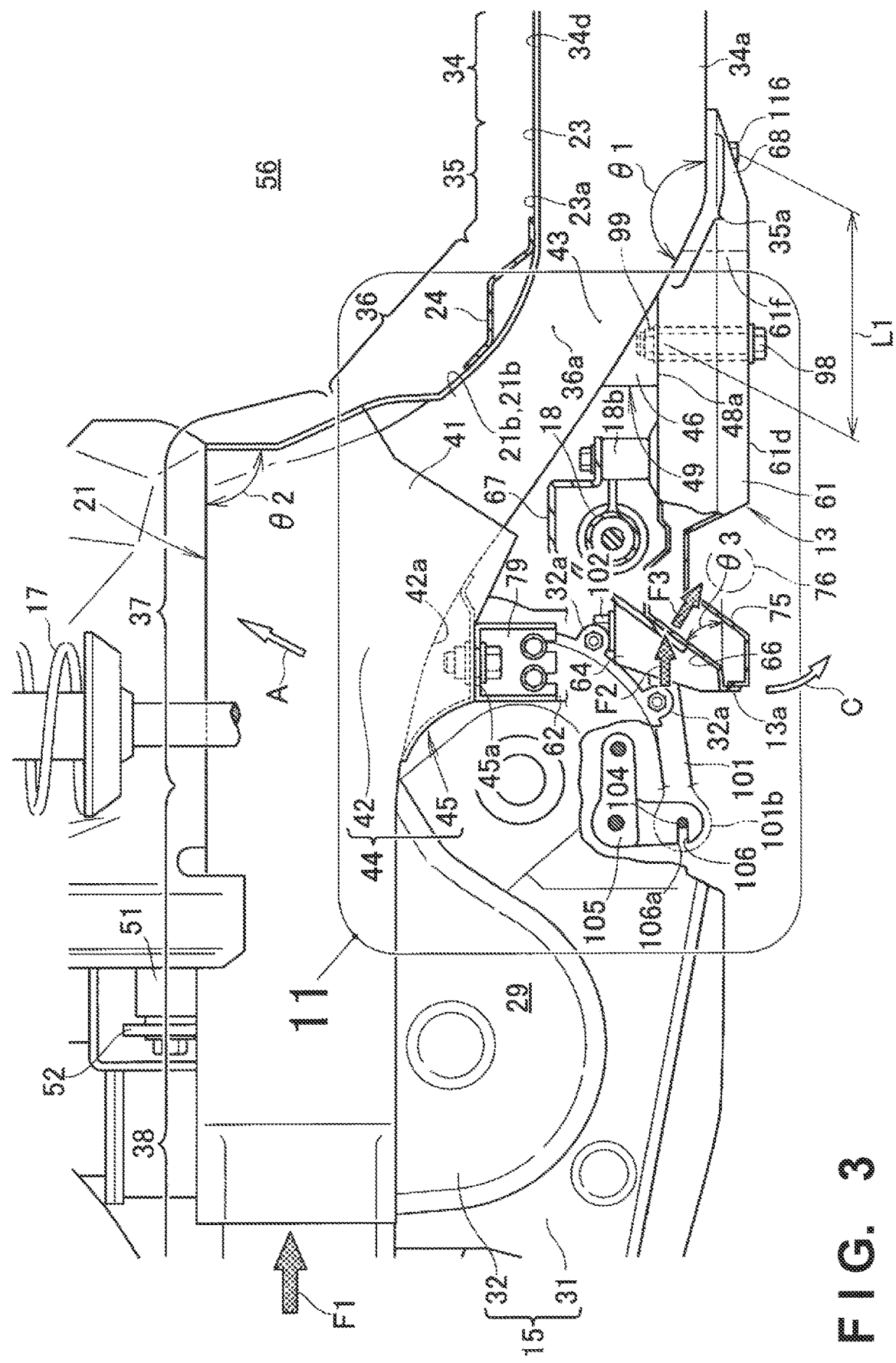
FIG. 3 is a side view showing the main part of the vehicle body front structure in FIG. 1.

As shown in FIG. 3, the left front side frame 21 extends in the longitudinal direction of the vehicle body and is formed into a closed section that is hollow and has an almost rectangular shape. More specifically, the left front side frame 21 includes a lower horizontal portion 34 provided on the side of the lower dashboard 23, a lower bent portion 35 provided at the front end of the lower horizontal portion 34, a tilt portion 36 extending from the lower bent portion 35 to the upper front side of the vehicle body, an upper bent portion 37 provided on the upper front portion of the tilt portion 36, and an upper horizontal portion 38 extending from the upper bent portion 37 toward the front of the vehicle body.

The lower horizontal portion 34, the lower bent portion 35, the tilt portion 36, the upper bent portion 37, and the upper horizontal portion 38 are sequentially continuously extended toward the front of the vehicle body, thereby forming the left front side frame 21. The lower bent portion 35 is bent at an angle θ1 in a side view. The upper bent portion 37 is bent at an angle θ2 in a side view.

When a front collision load F1 is input to a front end 21c (see FIG. 2) of the left front side frame 21, bending deformation occurs such that the lower bent portion 35 and the upper bent portion 37 bend, and the tilt portion 36 rises. Hence, the upper portion of the tilt portion 36, the upper bent portion 37, and the upper horizontal portion 38 is displaced on the upper side toward the rear of the vehicle body obliquely upward as indicated by an arrow A.

The front collision load F1 is an impact load that is input to the left front side frame 21 by a front collision of the vehicle body front structure 10.

In addition, the lower bent portion 35 includes a bent lower surface (the lower surface of the lower bent portion) 35a formed into a curve with a downward convex shape between the tilt portion 36 and the lower horizontal portion 34. Furthermore, a rear extended portion 68 (to be described later) of the sub frame 13 is extended along the bent lower surface 35a.

Figure 4:
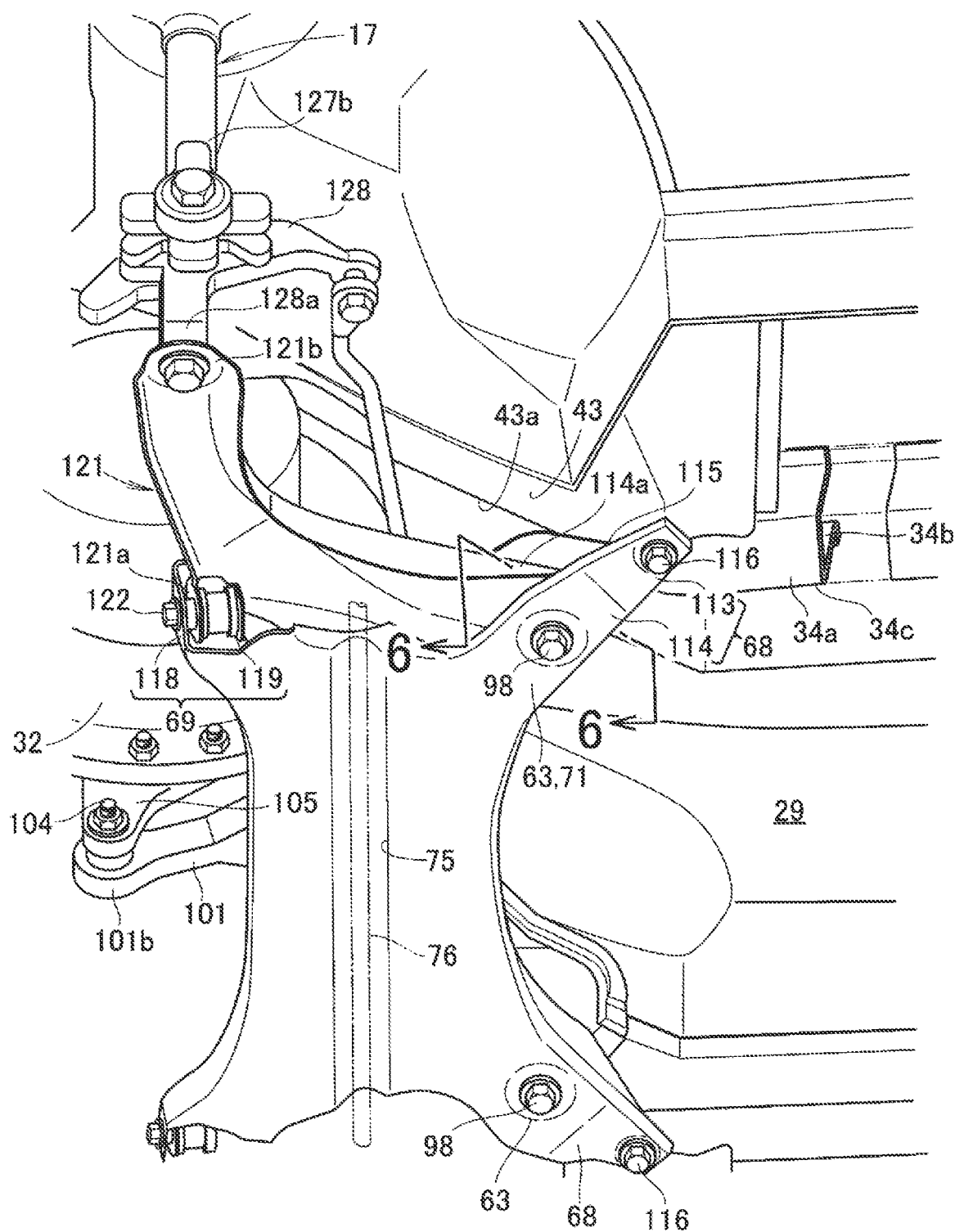
FIG. 4 is a perspective view showing a state in which the vehicle body front structure in FIG. 1 is viewed from the lower left side.

Moreover, as shown in FIG. 4, a ridge 34c is formed by the intersection between a lower surface 34a of the lower horizontal portion 34 and an inner wall 34b of the lower horizontal portion 34. The ridge 34c is formed into a convex angle so as to project to the side of the engine room 29 (that is, the side of the vehicle body center).

Figure 5:
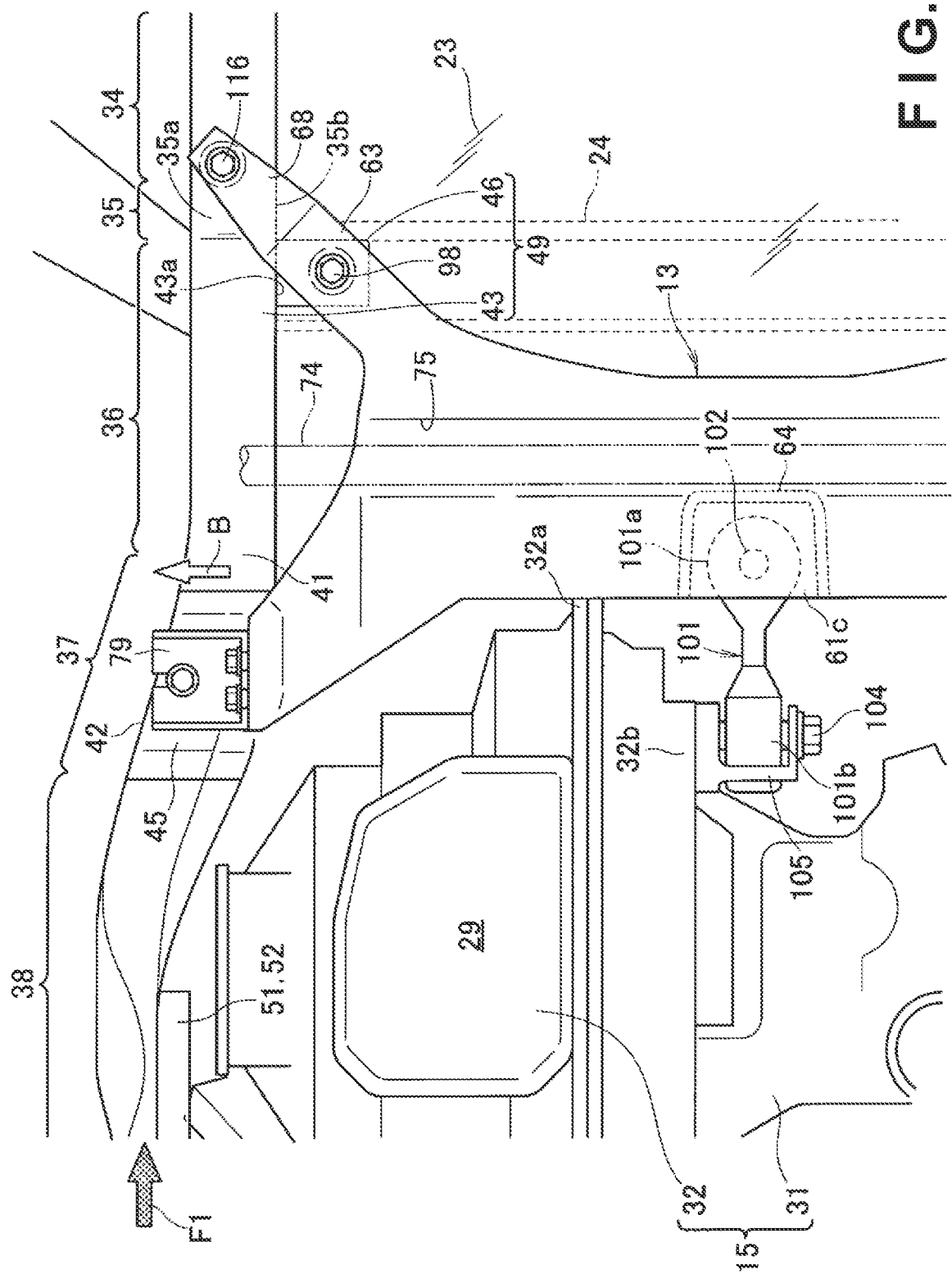
FIG. 5 is an enlarged view of a portion 5 in FIG. 2.

As shown in FIG. 5, the upper bent portion 37 includes a bending deformation permitting portion 41 on the upper front portion side of the tilt portion 36 of the left front side frame 21. Here, the power unit 15 is mounted in a lateral state. For this reason, the bending deformation permitting portion 41 is formed as a curved frame to widen the left front side frame 21 outward in the vehicle width direction, thereby allowing the power unit 15 to be mounted on the inner side of the left front side frame 21 in the vehicle width direction.

In addition, the bending deformation permitting portion 41 is formed to bend and deform outward in the vehicle width direction, as indicated by an arrow B, by the front collision load F1 input to the front end 21c (see FIG. 2) of the left front side frame 21. When the bending deformation permitting portion 41 bends and deforms, the front collision load F1 is absorbed. In addition, when the front collision load F1 is absorbed, the angle of bending of the upper bent portion 37 by the front collision load F1 becomes small.

In other words, the bending deformation permitting portion 41 is a portion that bends and deforms outward in the vehicle width direction, as indicated by the arrow B, thereby permitting bending deformation in a direction to decrease the angle of bending of the upper bent portion 37 by the front collision load F1. Note that the upper bent portion 37 is formed to be readily deformed by suppressing the strength and rigidity low as compared to the other portions of the left front side frame 21.

The angle of bending of the upper bent portion 37 by the front collision load F1 thus becomes small. It is possible to suitably displace a front mounting portion 42 (to be described later) provided in the upper bent portion 37 upward and/or suitably displace the front mounting portion 42 outward in the vehicle width direction.

Referring back to FIG. 3, the upper bent portion 37 of the left front side frame 21 includes the front mounting portion 42. A front mount bracket 45 is provided on a lower portion 42a of the front mounting portion 42. The front mounting portion 42 and the front mount bracket 45 constitute a front sub frame mounting portion 44.

The front mount bracket 45 is provided on the bending deformation permitting portion 41 (that is, the upper bent portion 37) (also see FIG. 5) as well.

Hence, when the bending deformation permitting portion 41 bends and deforms outward in the vehicle width direction, the front mount bracket 45 of the front sub frame mounting portion 44 is displaced outward in the vehicle width direction. A front fastening portion 79 (to be described later) of the sub frame 13 is fastened to a lower surface 45a of the front mount bracket 45.

Figure 6:
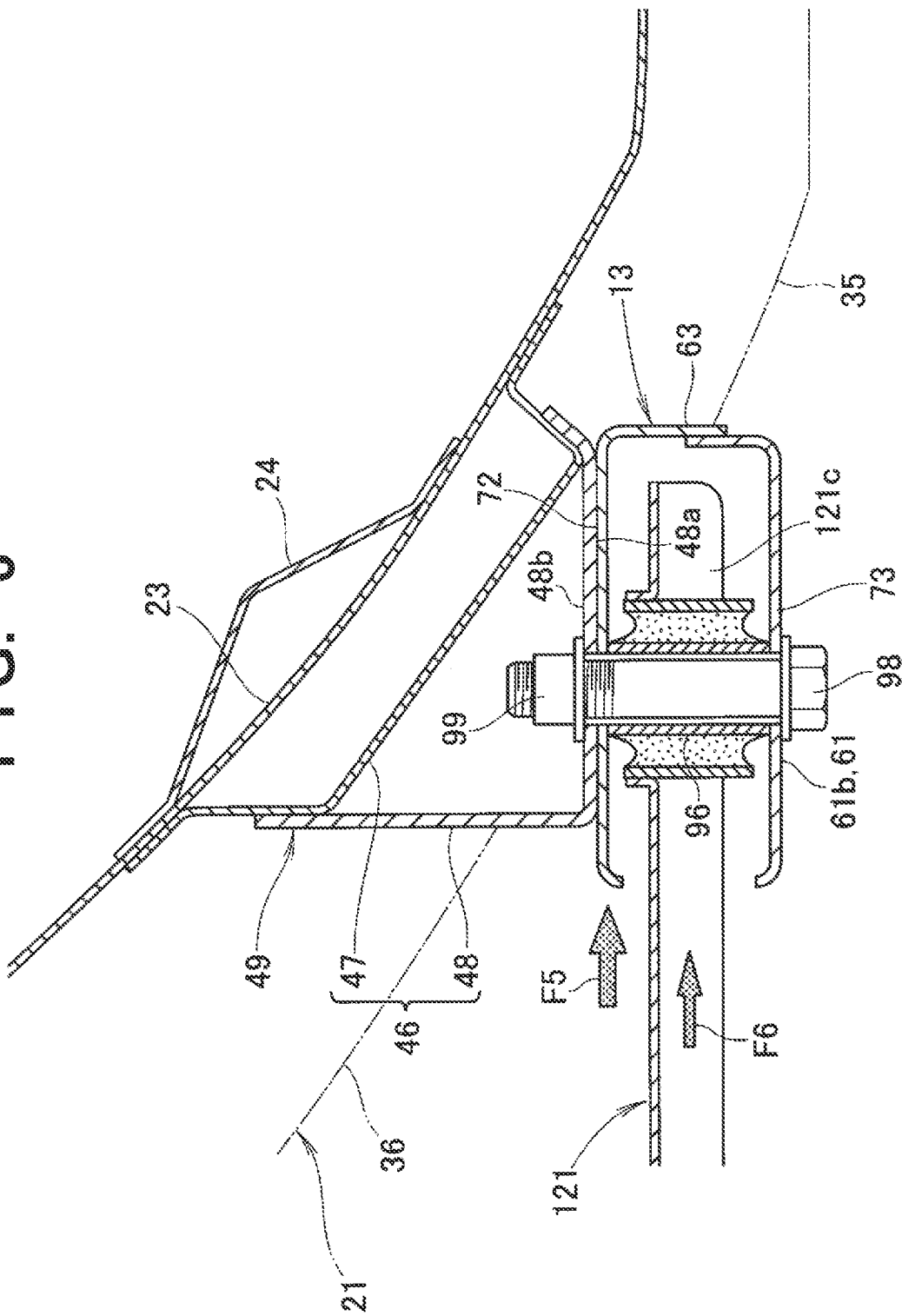
FIG. 6 is a sectional view taken along a line 6-6 in FIG. 4.

As shown in FIGS. 2, 3, and 6, a rear portion 36a of the tilt portion 36 includes a rear mounting portion 43 of the left front side frame 21. A rear mount bracket 46 is provided on an inner wall 43a (also see FIG. 5) of the rear mounting portion 43 and the lower dashboard 23. The rear mounting portion 43 and the rear mount bracket 46 constitute a rear sub frame mounting portion 49.

The rear mount bracket 46 is formed from an upper bracket portion 47 connected to the inner wall 43a and the lower dashboard 23, and a lower bracket portion 48 connected to the upper bracket portion 47.

The upper bracket portion 47 is a high strength member formed from a high strength steel sheet with a tensile strength of, for example, 440 MPa or 590 MPa. The lower bracket portion 48 is a low strength member formed from a low strength steel sheet that has a strength lower than the upper bracket portion 47 and has a tensile strength of, for example, 270 MPa.

A rear fastening portion 63 (to be described later) of the sub frame 13 is fastened to a lower surface (the lower surface of the rear mount bracket) 48a of the lower bracket portion 48.

The rear mount bracket 46 is formed into a two-stage structure by the upper bracket portion 47 and the lower bracket portion 48. In addition, when the upper bracket portion 47 is formed into a high strength, the supporting rigidity of the sub frame 13 by the rear mount bracket 46 is increased.

The suspension portion 17 is supported in a stable state by the sub frame 13. The rigidity of the suspension portion 17 (that is, the undercarriage portion) thus increases, and the maneuvering stability can be improved.

Note that it is also possible to form a double structure in which the board thickness of the upper bracket portion 47 is made small, and the board thickness of the lower bracket portion 48 is made large, join a nut 99 to the upper bracket portion 47, and form, in the lower bracket portion 48, a through hole having a diameter larger than the outer diameter of the nut. When a bolt 98 is fastened to the nut 99 of the upper bracket portion 47, the load bearing capacity of the sub frame 13 corresponding to a load toward the rear of the vehicle body can more suitably be ensured.

As shown in FIGS. 2, 3, and 5, the lower surface 34a of the lower horizontal portion 34 of the left front side frame 21 is arranged at a position lower than the lower surface 48a of the rear mount bracket 46 (more specifically, the lower bracket portion 48). In addition, in a state in which the rear fastening portion 63 is fastened to the rear mount bracket 46, the rear extended portion 68 is extended from the rear fastening portion 63 up to the lower surface 34a of the lower horizontal portion 34 via the bent lower surface 35a of the lower bent portion 35 toward the rear of the vehicle body and outward in the vehicle width direction.

The rear extended portion 68 or a rear end 61f of the sub frame 13 (more specifically, a sub frame main body 61) serves as a fulcrum from which the sub frame 13 rotates downward. Hence, the rear end 61f of the sub frame main body 61 contacts an inner wall 35b or the bent lower surface 35a of the lower bent portion 35. Alternatively, the rear end 61f of the sub frame main body 61 faces the inner wall 35b or the bent lower surface 35a of the lower bent portion 35 in an adjacent state.

The upper horizontal portion 38 of the left front side frame 21 includes a left power unit support portion 51. The transmission 32 of the power unit 15 is supported by the left power unit support portion 51 via a mission bracket 52.

In addition, the upper horizontal portion 38 of the right front side frame 21 includes a right power unit support portion 53. The engine 31 of the power unit 15 is supported by the right power unit support portion 53 via an engine bracket 54.

Furthermore, the lower dashboard 23 is provided on rear surfaces 21b of the left front side frame 21 and the right front side frame 21. The rear surface 21b also includes an upper surface 34d of the lower horizontal portion 34. The engine room 29 and a cabin 56 are partitioned by the lower dashboard 23.

In addition, the dash cross member 24 is provided on a surface 23a of the lower dashboard 23 on the side of the cabin 56.

The dash cross member 24 is extended in the vehicle width direction so as to cross the left front side frame 21 and the right front side frame 21. In addition, the rear mount bracket 46 is joined to the rear mounting portion 43 (in particular, the inner wall 43a) of the left front side frame 21 and the lower dashboard 23 (also see FIG. 6) on the inner side of the rear mounting portion 43 in the vehicle width direction. Similarly, the rear mount bracket 46 is joined on the inner side of the rear mounting portion 43 of the right front side frame 21 in the vehicle width direction.

In this state, the dash cross member 24 faces the rear mounting portion 43 of the left front side frame 21, the rear mounting portion 43 of the right front side frame 21, and the rear mount brackets 46 on the left and right sides. Hence, the rear mount brackets 46 of the rear mount brackets 46 on the left and right sides are firmly supported by the dash cross member 24.

Referring back to FIG. 1, a left stay 57 of the front bulkhead 27 is provided on the front portion 21a of the left front side frame 21. Similarly, the right stay 57 of the front bulkhead 27 is provided on the front portion 21a of the right front side frame 21.

In addition, upper ends 57a of the left stay 57 and the right stay 57 are connected by an upper beam 58. Furthermore, lower ends 57b of the left stay 57 and the right stay 57 are connected by a lower beam 59.

The front bulkhead 27 is formed into an almost rectangular frame shape in a front view by the left stay 57, the right stay 57, the upper beam 58, and the lower beam 59. A cooling unit (a radiator, a capacitor, and the like) is supported by the front bulkhead 27.

The front bumper beam 28 is arranged on the front side of the front bulkhead 27 in the vehicle body.

As shown in FIG. 2, a left end 28a of the front bumper beam 28 is provided at the front end 21c of the left front side frame 21. In addition, a right end 28b of the front bumper beam 28 is provided at the front end 21c of the right front side frame 21.

That is, the front bumper beam 28 is stretched between the front ends 21c of the left front side frame 21 and the right front side frame 21.

As shown in FIG. 3, the left front side frame 21 and the right front side frame 21 are provided with the sub frame 13 from below (also see FIG. 2).

Note that the sub frame 13 is a substantially bilaterally symmetrical member. The left and right portions of the sub frame 13 are denoted by the same reference numerals. The left portion will be described in detail, and a description of the right portion will be omitted.

Figure 7:
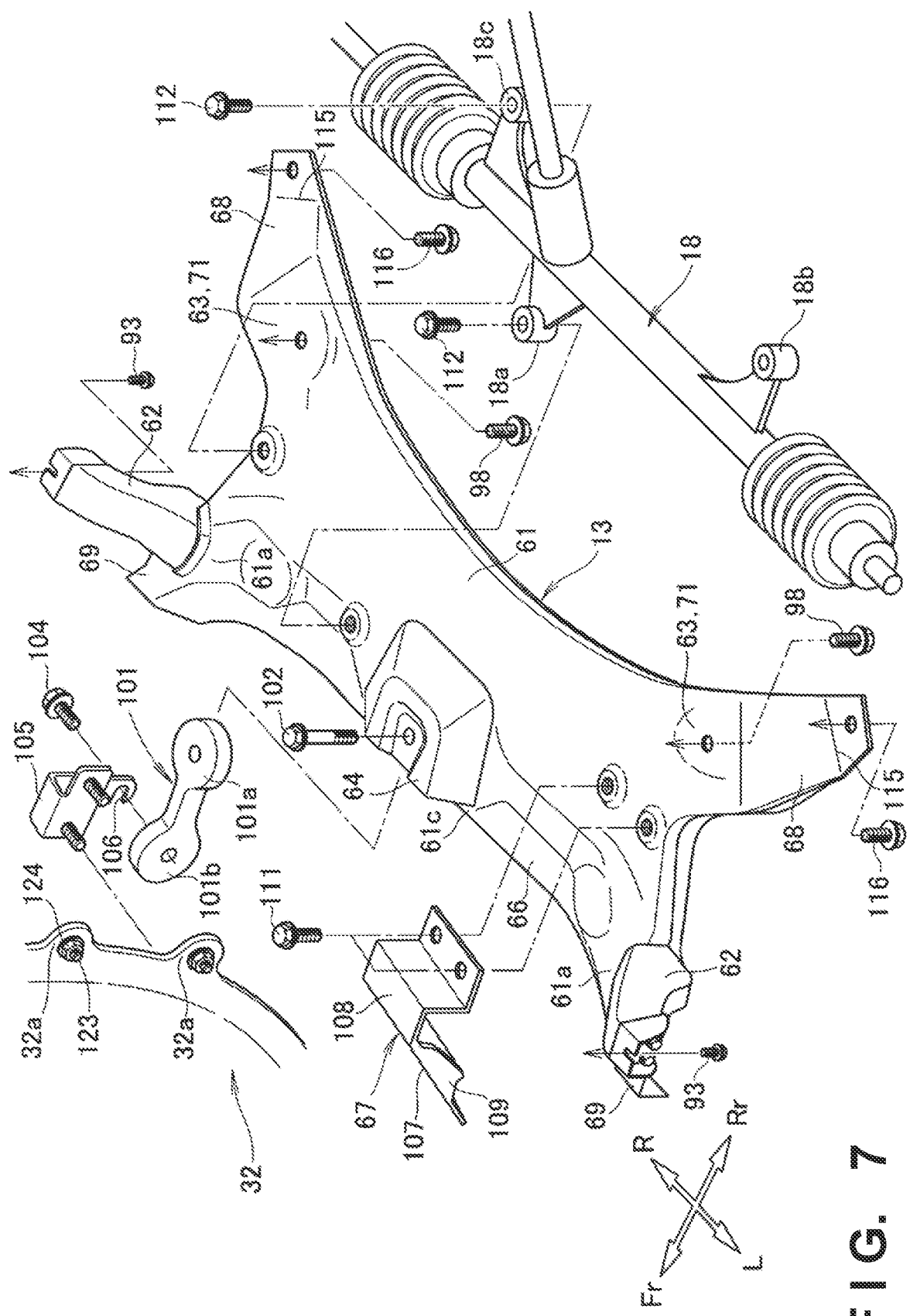
FIG. 7 is an exploded perspective view showing the relationship between a sub frame, a slider member, and a torque rod in FIG. 3.
Figure 8:
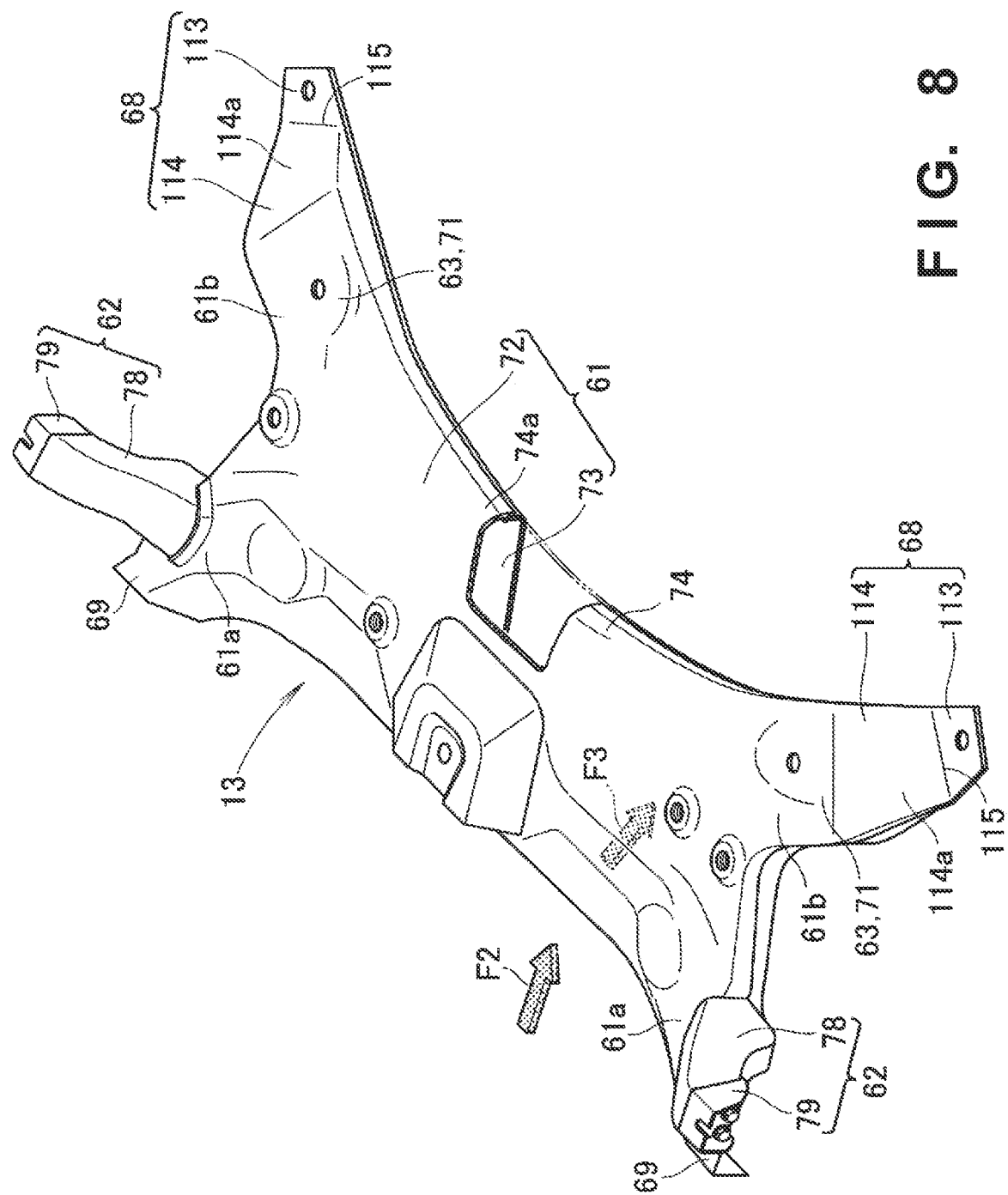
FIG. 8 is a perspective view showing the sub frame in FIG. 7.

As shown in FIGS. 7 and 8, the sub frame 13 is formed into a rigid body. More specifically, the sub frame 13 includes the sub frame main body 61 formed into an almost rectangular shape in a plan view, a front arm 62 provided in a left front portion 61a of the sub frame main body 61, the rear fastening portion 63 provided in a left rear portion 61b of the sub frame main body 61, and a connecting portion 64 provided on a front center portion 61c of the sub frame main body 61.

In addition, the sub frame 13 includes a tilt surface 66 formed between the connecting portion 64 and the front arm 62, a slider member 67 that continues to the tilt surface 66, the rear extended portion 68 extending from the rear fastening portion 63 outward toward the rear of the vehicle body, and a front lower arm support portion (lower arm support portion) 69 and a rear lower arm support portion 71 which support a lower arm 121 of the suspension portion 17.

The rear lower arm support portion 71 is included in the rear fastening portion 63 of the sub frame 13.

The sub frame main body 61 is formed into a hollow body by two steel sheets on the upper and lower sides, that is, a high strength steel sheet (high tensile steel) 72 on the upper side and a high strength steel sheet (high tensile steel) 73 on the lower side. In addition, the sub frame main body 61 includes a frame rear portion 74 formed in the rear portion of the sub frame main body 61, and a storage concave portion 75 (see FIG. 3) formed in a lower portion 61d of the sub frame main body 61.

The frame rear portion 74 is formed into an almost arch shape in a plan view between the rear fastening portion 63 on the left side and the rear fastening portion 63 on the right side. More specifically, the frame rear portion 74 is formed into a curve in a plan view so as to be recessed to the front side of the vehicle body from the rear fastening portion 63 on the left side and the rear fastening portion 63 on the right side toward a vehicle-width-direction center 74a of the frame rear portion 74.

Here, the power unit 15 (see FIG. 3) moves (retreats) toward the rear of the vehicle body upon a front collision and interferes with the tilt surface 66 or the slider member 67 of the sub frame main body 61. A retreat load (a load input to the tilt surface) F2 of the power unit 15 is thus input to the tilt surface 66 or the slider member 67. Hence, a downward component force F3 (also see FIG. 3) is generated by the retreat load F2 in the tilt surface 66 or the slider member 67.

The retreat load F2 or the downward component force F3 acts on the vehicle-width-direction center 74a of the frame rear portion 74 of the sub frame main body 61. When the frame rear portion 74 is formed into an almost arch shape in a plan view, the retreat load F2 or the downward component force F3 can be made to act on the top portion of the almost arch shape in the plan view. It is therefore possible to ensure the rigidity of the sub frame main body 61 against the retreat load F2 or the downward component force F3. When the rigidity of the sub frame main body 61 is ensured, the suspension portion 17 (see FIG. 4) is supported in a stable state by the sub frame 13.

The rigidity of the suspension portion 17 (that is, the undercarriage portion) thus increases, and the maneuvering stability can be improved.

Figure 9:
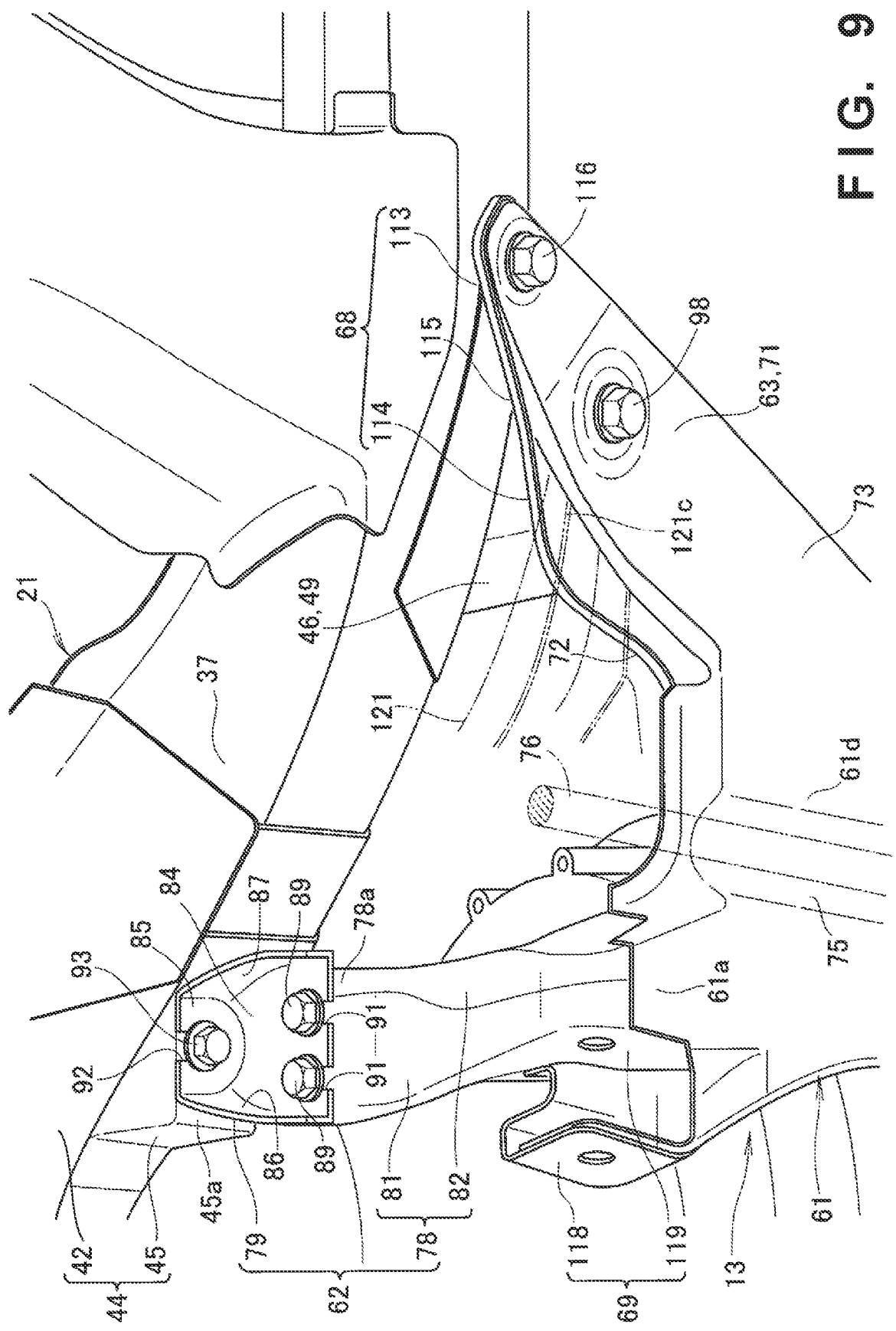
FIG. 9 is a perspective view showing the left side portion of the sub frame in FIG. 4.

As shown in FIG. 9, the storage concave portion 75 is formed on the rear side of the tilt surface 66 (see FIG. 3) of the lower portion 61d of the sub frame main body 61. The storage concave portion 75 is recessed upward and extended in the vehicle width direction.

Here, the suspension portion 17 (see FIG. 4) is provided with a stabilizer 76 in consideration of rolling and the like of the vehicle body. The stabilizer 76 is stored (arranged) in the storage concave portion 75. When the stabilizer 76 is stored in the storage concave portion 75, the stabilizer 76 can be protected by the sub frame main body 61.

The front arm 62 includes an arm portion 78 raised upward from the left front portion 61a of the sub frame main body 61, and the front fastening portion 79 provided on an upper outer wall 78a of the arm portion 78.

The arm portion 78 is formed into a hollow column by two steel sheets on the front and rear sides, that is, a high strength steel sheet (high tensile steel) 81 on the front side and a high strength steel sheet (high tensile steel) 82 on the rear side.

The front fastening portion 79 is provided on the upper outer wall 78a of the arm portion 78. The front fastening portion 79 includes a vertical wall 84 mounted on the upper outer wall 78a, a top portion 85 bent from the upper end of the vertical wall 84 outward in the vehicle width direction, and a front reinforcing portion 86 and a rear reinforcing portion 87 which reinforce the vertical wall 84 and the top portion 85.

Figure 10:
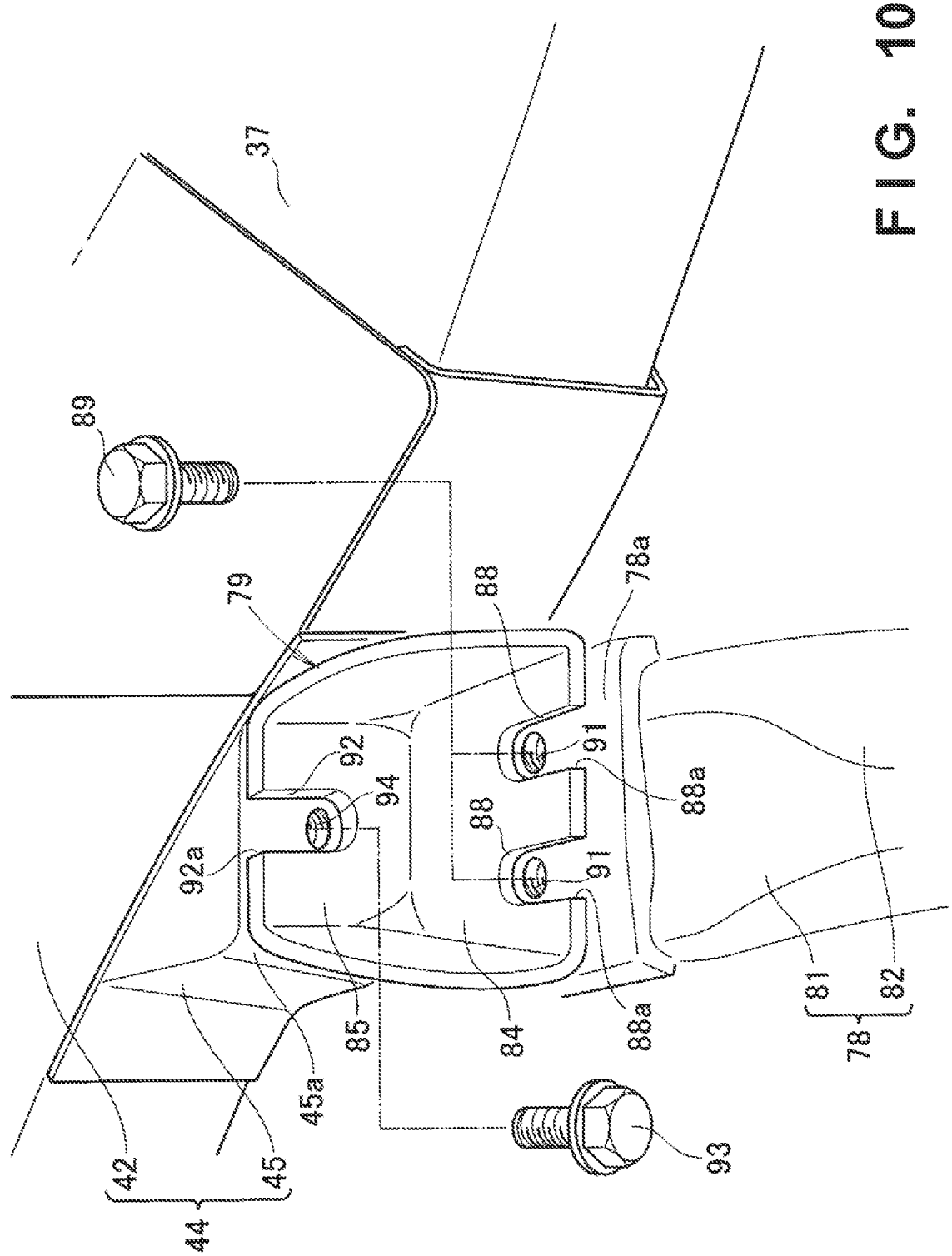
FIG. 10 is a perspective view showing a front fastening portion in FIG. 9.

As shown in FIG. 10, a pair of vertical slits 88 and a horizontal slit 92 are formed as slits in the front fastening portion 79. More specifically, the pair of vertical slits 88 are formed in the vertical wall 84 to extend in the vertical direction, and a lower end 88a of each vertical slit 88 opens. A bolt (first fastening member) 89 extends through each vertical slit 88, and the bolt 89 extending through the slit is screwed into a nut (first fastening member) 91.

Here, the nut 91 is joined to the inner surface of the upper outer wall 78a. Hence, the vertical wall 84 is fastened (fixed) to the upper outer wall 78a of the arm portion 78 by the bolts 89 and the nuts 91 from the outer side in the vehicle width direction.

In addition, the horizontal slit 92 is formed in the top portion 85 to extend in the vehicle width direction, and an outer end 92a of the horizontal slit 92 opens. A bolt (second fastening member) 93 extends through the horizontal slit 92, and the bolt 93 extending through the slit is connected to a nut (second fastening member) 94.

Here, the nut 94 is joined to the inner surface of the lower surface 45a of the front mount bracket 45. Hence, the top portion 85 is fastened (fixed) to the lower surface 45a of the front mount bracket 45 from below by the bolt 93 and the nut 94.

As shown in FIG. 9, the vertical wall 84 is fastened to the upper outer wall 78a of the arm portion 78, and the top portion 85 is fastened to the front mount bracket 45. The left front portion 61a of the sub frame main body 61 is thus connected to the front mount bracket 45 via the front arm 62.

In addition, the rear fastening portion 63 is integrally provided on the left rear portion 61b of the sub frame main body 61. That is, the rear fastening portion 63 is formed into a hollow body by two steel sheets on the upper and lower sides, that is, the high strength steel sheet 72 on the upper side and the high strength steel sheet 73 on the lower side, like the sub frame main body 61 (also see FIG. 6).

As described above, the sub frame main body 61 and the rear fastening portion 63 are each formed into a hollow body by two steel sheets on the upper and lower sides, that is, the high strength steel sheet 72 on the upper side and the high strength steel sheet 73 on the lower side. Additionally, the arm portion 78 is formed into a hollow column by two steel sheets on the front and rear sides, that is, the high strength steel sheet 81 on the front side and the high strength steel sheet 82 on the rear side.

The sub frame main body 61, the rear fastening portion 63, and the arm portion 78 (that is, the sub frame 13) are thus formed into rigid bodies.

Referring back to FIG. 6, a rear end 121c of the lower arm 121 is stored inside the rear fastening portion 63, and the rear end 121c of the lower arm 121 is provided with a collar 96 and an elastic member 97. The bolt (fastening member) 98 extends through the collar 96, and the bolt 98 extending through the collar is connected to the nut (fastening member) 99. Here, the nut 99 is joined to an inner surface 48b of the lower surface 48a of the rear mount bracket 46 (more specifically, the lower bracket portion 48).

Hence, in a state in which the rear end 121c of the lower arm 121 and the rear fastening portion 63 are arranged on the same axis, the rear end 121c of the lower arm 121 and the rear fastening portion 63 are fastened (fixed) to the rear mount bracket 46 from below by the bolt 98 and the nut 99.

As shown in FIGS. 5 and 7, the connecting portion 64 is provided on the front center portion 61c of the sub frame main body 61. A rear connecting portion 101a of a torque rod 101 is connected to the connecting portion 64 by a bolt 102. In addition, a front connecting portion 101b of the torque rod 101 is connected to a mounting bracket 105.

Here, the mounting bracket 105 is mounted on a vicinity 32b of the rear portion 32a of the transmission 32 of the power unit 15.

Hence, the connecting portion 64 of the sub frame 13 is connected to the vicinity 32b of the rear portion 32a of the transmission 32 by the torque rod 101 via the mounting bracket 105. The vibration of the rear portion of the power unit 15 is thus suppressed by the torque rod 101.

As shown in FIG. 3, the mounting bracket 105 includes a slit (notch) 106. The slit 106 extends toward the front of the vehicle body, and a front end 106a opens. A bolt (fastening member) 104 extends through the slit 106, and the front connecting portion 101b of the torque rod 101 is connected to the mounting bracket 105 by the bolt 104 extending through the slit.

Hence, when the power unit 15 moves toward the rear of the vehicle body upon a front collision, the mounting bracket 105 (that is, the slit 106) moves toward the rear of the vehicle body. When the slit 106 moves toward the rear of the vehicle body, the slit 106 disengages from the bolt 104.

That is, the power unit 15 disengages from the torque rod 101, and the movement of the power unit 15 toward the rear of the vehicle body is not impeded by the torque rod 101. It is therefore possible to smoothly move (retreat) the power unit 15 toward the rear of the vehicle body.

Figure 11:
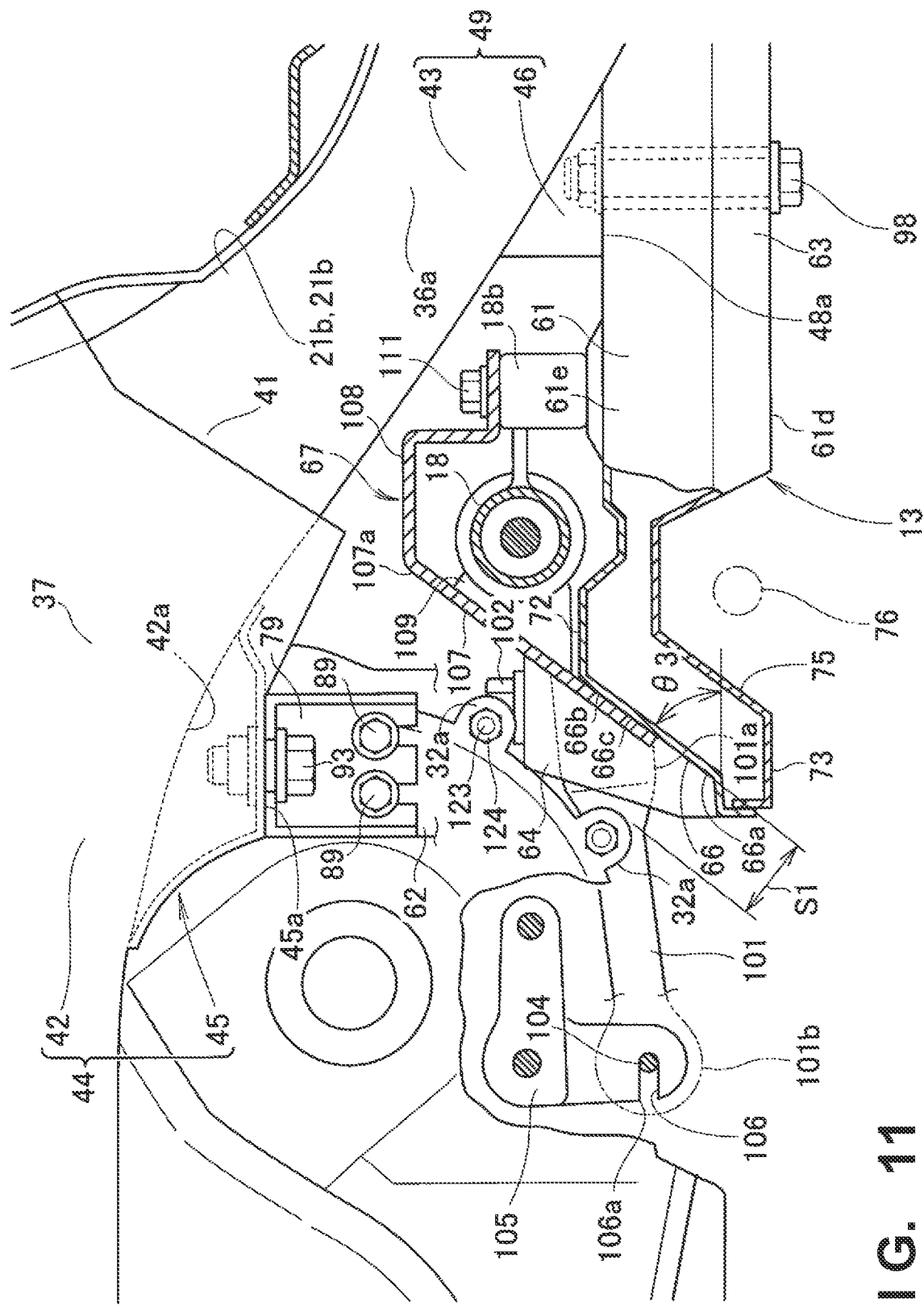
FIG. 11 is an enlarged view of a portion 11 in FIG. 3.

As shown in FIGS. 7 and 11, the tilt surface 66 is formed between the connecting portion 64 and the front arm 62 on the left side. In other words, the tilt surface 66 is arranged on the rear side of the rear portion 32a of the transmission 32 of the power unit 15 in the vehicle body and at a position facing the rear portion 32a.

The tilt surface 66 is formed by the high strength steel sheet 72 on the upper side into a slope shape (that is, a tilt shape) ascending from a front end 66a to a rear end 66b toward the rear of the vehicle body. The steering gear box 18 is supported on the rear side of the rear end 66b of the tilt surface 66 in the vehicle body.

When the tilt surface 66 is formed into a slope shape, the tilt angle and the tilt length of the tilt surface 66 can freely be set. For example, when the tilt surface 66 is formed into a slope shape with a sufficient length or a sufficiently large angle, the downward component force F3 that acts on the tilt surface 66 or the slider member 67 by the retreat load F2 can suitably be generated.

The upper bent portion 37 (including the bending deformation permitting portion 41) of the left front side frame 21 is located on the upper side of the tilt surface 66. In other words, the tilt surface 66 is arranged to match the upper bent portion 37 of the left front side frame 21 in the longitudinal direction of the vehicle body.

The tilt surface 66 is formed into a slope shape with which the rear portion 32a of the power unit 15 interferes first when the power unit 15 moves toward the sub frame 13.

In addition, the tilt surface 66 is formed into a tilt angle θ3. More specifically, the tilt angle θ3 is set such that the rear fastening portion 63 separates downward from the rear mount bracket 46 of the rear sub frame mounting portion 49 by the retreat load F2 input to the tilt surface 66 when the rear portion 32a of the power unit 15 interferes with the tilt surface 66.

Furthermore, the tilt angle θ3 is set such that after the rear fastening portion 63 separates downward from the rear mount bracket 46, the sub frame 13 drops (retreats) downward toward the rear of the vehicle body together with the steering gear box 18 by the retreat load F2 of the power unit 15.

In addition, the tilt surface 66 has such a strength that it is deformed into a concave shape upon interference with the rear portion 32a of the power unit 15 (see 140b in FIG. 14) and maintains a state in which the tilt surface 66 is fitted on the rear portion 32a. That is, when the rear portion 32a of the power unit 15 interferes with the tilt surface 66, the tilt surface 66 is deformed into a concave shape by the retreat load F2 of the power unit 15, and a state in which the rear portion 32a of the power unit 15 is fitted in the tilt surface 66 with the concave shape is maintained.

Hence, the retreat load F2 of the power unit 15 is efficiently transmitted as a load that separates the front fastening portion 79 or the rear fastening portion 63 downward.

Here, the steering gear box 18 includes a front mounting bracket 18a, a rear mounting bracket 18b on the left side, and a rear mounting bracket 18c on the right side. The front mounting bracket 18a and the rear mounting bracket 18c on the right side are fastened to the sub frame main body 61 by bolts 112. In addition, the rear mounting bracket 18b on the left side is fastened to the sub frame main body 61 by a bolt 111 together with the slider member 67.

Figure 12:
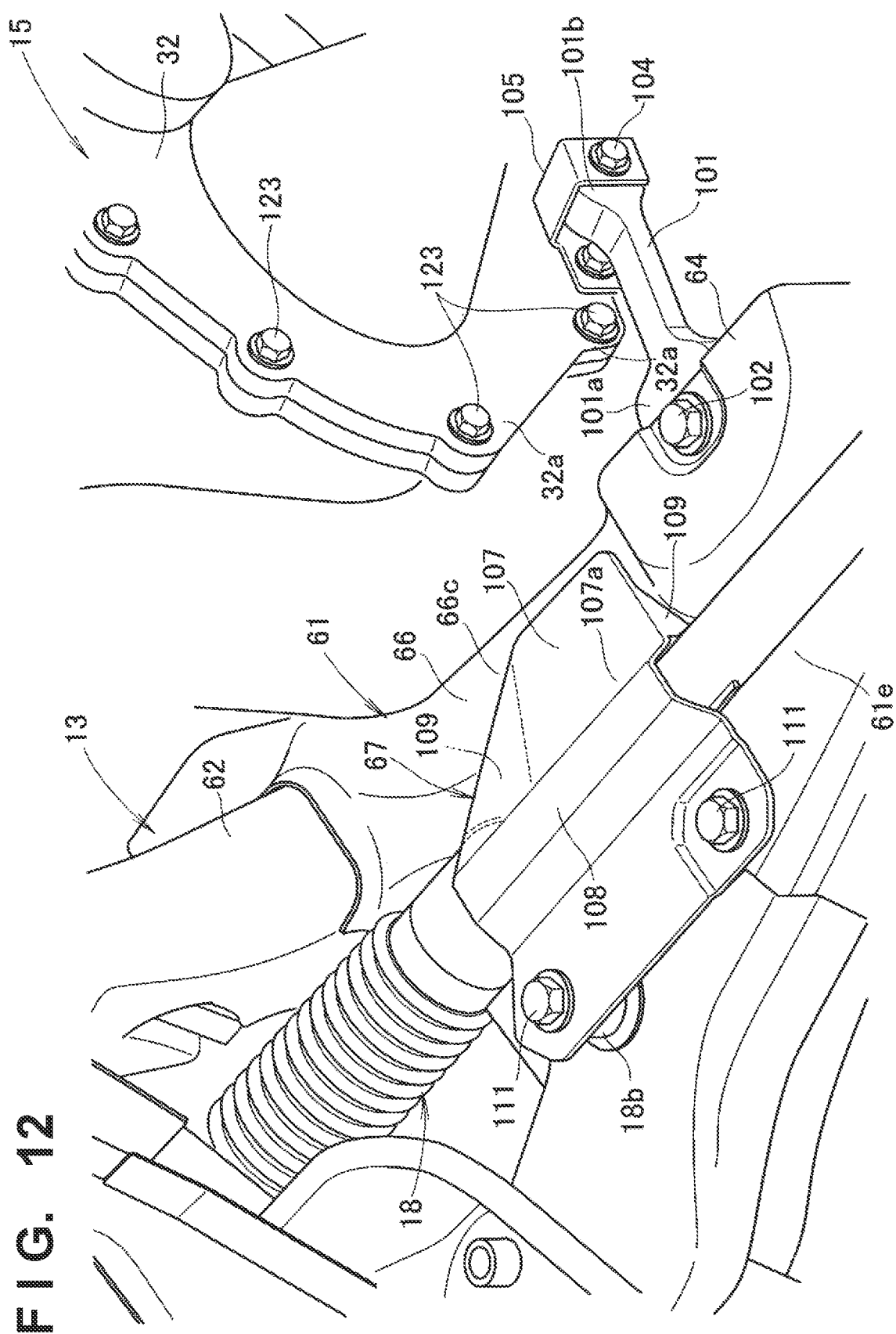
FIG. 12 is a perspective view showing a tilt surface, the slider member, and the torque rod in FIG. 11.

As shown in FIGS. 11 and 12, the slider member 67 that continues to the tilt surface 66 is provided on an upper portion 61e of the sub frame main body 61. The slider member 67 includes a slider tilt surface 107 that covers an upper half portion 66c of the tilt surface 66 from the front side of the vehicle body, and a slider support portion 108 bent from an upper end 107a of the slider tilt surface 107 toward the rear of the vehicle body.

The slider tilt surface 107 extends from a midpoint of the tilt surface 66 to above the steering gear box 18 in a tilting state so as to continue to the tilt surface 66. Hence, the upper half portion 66c of the tilt surface 66 and the steering gear box 18 are covered with the slider tilt surface 107 from the front side of the vehicle body.

Reinforcing portions 109 (for the reinforcing portion 109 of the outer side portion, see FIG. 7) are bent from the outer side portion and the inner side portion of the slider tilt surface 107 toward the rear of the vehicle body. Hence, the tilt surface 66 is reinforced by the reinforcing portion 109 on the outer side and the reinforcing portion 109 on the inner side.

A slider support portion 108 is bent from the upper end 107a of the slider tilt surface 107 toward the rear of the vehicle body and extended up to the rear of the steering gear box 18. Hence, the steering gear box 18 is covered with the slider support portion 108 from above and from the rear of the vehicle body.

In this state, the slider member 67 is mounted on the sub frame main body 61 by bolts 111.

Referring back to FIGS. 4 and 7, the rear extended portion 68 is extended from the rear fastening portion 63 of the sub frame 13 outward toward the rear of the vehicle body. The rear extended portion 68 is integrally extended from the rear fastening portion 63 up to the lower surface 34a of the lower horizontal portion 34 of the left front side frame 21 on the rear side of the vehicle body and outward in the vehicle width direction in a tilting state in a plan view.

The rear extended portion 68 includes a rear end 113 connected to the lower surface 34a of the lower horizontal portion 34, and an upper surface tilt portion 114 whose upper surface 114a is gradually lowered from the rear fastening portion 63 toward the rear end 113.

When the upper surface 114a of the upper surface tilt portion 114 is gradually lowered toward the rear end 113, the section of the upper surface tilt portion 114 is gradually reduced toward the rear end 113. Hence, a concave angular portion 115 is formed by the upper surface 114a and the rear end 113. The concave angular portion 115 faces the ridge 34c of the lower horizontal portion 34 of the left front side frame 21.

In this state, the rear end 113 of the rear extended portion 68 is connected to the lower surface 34a of the lower horizontal portion 34 by a bolt 116. Hence, the rear fastening portion 63 of the sub frame main body 61 can be reinforced by the rear extended portion 68, and the rigidity of the rear fastening portion 63 is increased. Accordingly, the suspension portion 17 is supported by the sub frame 13 in a stable state.

The rigidity of the suspension portion 17 (that is, the undercarriage portion) thus increases, and the maneuvering stability can be improved. Note that the rear extended portion 68 may be a plate member different from the rear fastening portion 63.

As shown in FIGS. 4 and 9, the front lower arm support portion 69 is provided on the front side of the front arm 62 of the left front portion 61a of the sub frame main body 61. More specifically, the front lower arm support portion 69 includes a front support portion 118 formed by the high strength steel sheet 72 on the upper side of the sub frame main body 61, and a rear support portion 119 formed by the high strength steel sheet 81 on the front side of the front arm 62.

A front end 121a of the lower arm 121 of the suspension portion 17 is arranged between the front support portion 118 and the rear support portion 119. In this state, the front end 121a of the lower arm 121 is supported by the front support portion 118 and the rear support portion 119 via a bolt 122 so as to be rotatable in the vertical direction.

Here, the front support portion 118 is formed by the high strength steel sheet 72 on the upper side of the sub frame main body 61, and the rear support portion 119 is formed by the high strength steel sheet 81 on the front side of the front arm 62. Hence, the strength of the front lower arm support portion 69 is ensured. Accordingly, the front end 121a of the lower arm 121 is firmly supported by the front lower arm support portion 69.

In addition, when the front lower arm support portion 69 is formed using the high strength steel sheet 72 on the upper side of the sub frame main body 61 and the high strength steel sheet 81 on the front side of the front arm 62, the front lower arm support portion 69 need not be prepared as a separate member. This can decrease the number of parts of the sub frame 13.

Furthermore, the rear fastening portion 63 of the sub frame main body 61 includes the rear lower arm support portion 71. The rear end 121c of the lower arm 121 is stored inside the rear fastening portion 63 (that is, the rear lower arm support portion 71). In this state, the rear fastening portion 63 and the rear end 121c of the lower arm 121 are fastened to the rear mount bracket 46 of the rear sub frame mounting portion 49 by the bolt 98.

As shown in FIG. 11, the power unit 15 is arranged on the front side of the sub frame 13 in the vehicle body, and the power unit 15 is stored in the engine room 29. In the power unit 15, the transmission 32 projects toward the rear of the vehicle body with respect to the engine 31, and the projecting portion forms the rear portion 32a of the power unit 15.

Additionally, the transmission case of the transmission 32 is held in a sealed state by a plurality of bolts 123 and nuts 124. The seat portions of the bolts 123 and the nuts 124 project toward the rear of the vehicle body, and the rear portion 32a of the power unit 15 is formed by the seat portions (also see FIG. 12).

Here, as shown in FIG. 2, the transmission 32 of the power unit 15 is supported by the left power unit support portion 51 of the upper horizontal portion 38 of the left front side frame 21 via the mission bracket 52.

In addition, the engine 31 of the power unit 15 is supported by the right power unit support portion 53 of the upper horizontal portion 38 of the right front side frame 21 via the engine bracket 54.

As shown in FIG. 7, the connecting portion 64 of the sub frame 13 is connected to the vicinity 32b of the rear portion (rear projecting portion) 32a of the transmission 32 via the torque rod 101 and the mounting bracket 105. Hence, the transmission 32 is connected to the sub frame 13 via the torque rod 101 and the mounting bracket 105.

That is, as shown in FIG. 1, the power unit 15 is connected to the left front side frame 21, the right front side frame 21, and the sub frame 13. In this state, the rear portion 32a of the transmission 32 faces the tilt surface 66 (see FIG. 11) of the sub frame main body 61.

Referring back to FIG. 7, the rear connecting portion 101a of the torque rod 101 is connected to the connecting portion 64 of the sub frame main body 61, and the front connecting portion 101b of the torque rod 101 is connected to the mounting bracket 105. In this state, the rear connecting portion 101a is offset (shifted) upward with respect to the front connecting portion 101b (see FIG. 11).

In addition, the torque rod 101 is connected to the vicinity 32b of the rear portion 32a of the transmission 32 via the mounting bracket 105. Hence, the vibration of the rear portion 32a of the power unit 15 is suppressed by the torque rod 101.

Accordingly, an interval S1 between the rear portion 32a of the power unit 15 and the tilt surface 66 of the sub frame main body 61 is suppressed small (see FIG. 11) Similarly, the interval between the slider member 67 and the rear portion 32a of the power unit 15 is suppressed small.

As shown in FIG. 3, the left front side frame 21 is deformed by the front collision load F1, and the power unit 15 moves (retreats) toward the rear of the vehicle body together with the left power unit support portion 51. Hence, the rear portion 32a of the power unit 15 interferes with the tilt surface 66 or the slider member 67 of the sub frame main body 61, and the retreat load F2 of the power unit 15 is input to the tilt surface 66.

The downward component force F3 of the retreat load F2 thus acts downward on the tilt surface 66, and the front portion of the sub frame main body 61 lowers. Hence, the displacement amount (that is, a first phase difference) of the front fastening portion 79 with respect to the front mount bracket 45 becomes large, and the front fastening portion 79 of the sub frame 13 is separated downward from the front mount bracket 45.

After the downward component force F3 of the retreat load F2 starts acting downward on the tilt surface 66, the sub frame 13 rotates downward, as indicated by an arrow C, using the rear end 61f of the sub frame main body 61 as a fulcrum. Hence, the displacement amount (that is, a second phase difference) of the rear fastening portion 63 from the rear mount bracket 46 becomes large. Accordingly, the rear fastening portion 63 of the sub frame 13 is separated downward from the rear mount bracket 46 of the rear sub frame mounting portion 49.

Here, as shown in FIG. 6, the lower bracket portion 48 of the rear mount bracket 46 is formed in a low strength, and the rear fastening portion 63 of the sub frame 13 is connected to the lower surface 48a of the lower bracket portion 48. Accordingly, the rear fastening portion 63 of the sub frame 13 is satisfactorily separated downward from the lower surface 48a of the lower bracket portion 48.

Note that the strength and rigidity of the lower bracket portion 48 are suitably ensured by increasing the board thickness.

As described above, as shown in FIG. 3, the front fastening portion 79 and the rear fastening portion 63 of the sub frame 13 are sequentially separated using the movement of the power unit 15 toward the rear of the vehicle body. Hence, the sub frame 13 can reliably be separated from the left front side frame 21 and dropped downward.

Accordingly, the deformation amount of the left front side frame 21 by the front collision load F1 is ensured, and impact energy input by the front collision is reliably absorbed.

In addition, when the sub frame 13 is separated from the left front side frame 21 using the movement of the power unit 15 toward the rear of the vehicle body, the sub frame 13 need not be separated using an extended arm.

Here, the extended arm is an arm that connects a lower end 27a (see FIG. 1) of the front bulkhead 27 and a front end 13a of the sub frame 13. By removing the extended arm, the number of parts can be decreased, and the cost and weight can be suppressed.

Furthermore, when the power unit 15 moves toward the sub frame 13, the rear portion 32a of the power unit 15 first interferes with the tilt surface 66. Hence, the downward component force F3 acts on the tilt surface 66 early. Accordingly, the front fastening portion 79 of the sub frame 13 is quickly separated from the front mount bracket 45 of the front sub frame mounting portion 44.

Moreover, when the front fastening portion 79 is quickly separated, the rear fastening portion 63 of the sub frame 13 is also quickly separated from the rear mount bracket 46.

Accordingly, the sub frame 13 is quickly separated from the left front side frame 21. Hence, the deformation amount of the left front side frame 21 by the front collision load F1 is ensured early, and the impact energy input by the front collision can more reliably be absorbed.

In addition, the tilt angle θ3 of the tilt surface 66 is set such that the rear fastening portion 63 is separated from the rear mount bracket 46 by the retreat load F2, and the sub frame 13 is dropped together with the steering gear box 18.

When the tilt surface 66 is set to the tilt angle θ3, the sub frame 13 is more reliably be dropped. Hence, the bending deformation amount of the left front side frame 21 is more satisfactorily ensured.

Accordingly, the left front side frame 21 can be sufficiently bent and deformed by the retreat load F2, and the impact energy absorption amount can further be increased.

Note that if the tilt angle θ3 of the tilt surface 66 is set small, the rear mount bracket 46 ruptures such that the rear fastening portion 63 is pulled from the rear mount bracket 46. On the other hand, if the tilt angle θ3 of the tilt surface 66 is set large, the rear mount bracket 46 ruptures such that it is sheared by the rear fastening portion 63.

In addition, as shown in FIG. 11, the interval S1 between the rear portion 32a of the power unit 15 and the tilt surface 66 of the sub frame main body 61 is suppressed small. Hence, the rear portion 32a of the power unit 15 can be made to interfere with the tilt surface 66 early (quickly) and reliably at the time of a front collision. This allows the sub frame 13 to satisfactorily separate from the left front side frame 21.

Additionally, as shown in FIG. 3, the rear end 61f of the sub frame main body 61 faces the bent lower surface 35a of the lower bent portion 35 of the left front side frame 21 in a contact or adjacent state. Hence, when the downward component force F3 acts on the tilt surface 66 of the sub frame main body 61, the rear end 61f of the sub frame main body 61 is supported by the bent lower surface 35a.

This allows the sub frame to rotate downward using the rear end 61f of the sub frame main body 61 as a fulcrum.

Here, as shown in FIGS. 2 and 3, the rear mount bracket 46 of the rear sub frame mounting portion 49 is provided on the tilt portion 36 of the left front side frame 21 and the inner side of the left front side frame 21 in the vehicle width direction. Hence, a long distance L1 is ensured from the rear mount bracket 46 (more specifically, the bolt 98) to the bent lower surface 35a.

Accordingly, when the sub frame 13 is rotated downward using the rear end 61f of the sub frame main body 61 as a fulcrum, a separation load (that is, pull-out load) F4 acting on the rear fastening portion 63 can be increased.

In addition, the left front side frame 21 is a frame that forms the skeleton of the vehicle body and is a member with a high strength. Hence, the high strength (that is, hard) bent lower surface 35a supports the rear end 61f of the sub frame main body 61.

Accordingly, a rotation motion for rotating the sub frame 13 downward is reliably performed using the rear end 61f of the sub frame main body 61 as a fulcrum.

Furthermore, the bent lower surface 35a of the lower bent portion 35 is formed into a curve with a downward convex shape, and the rear extended portion 68 is extended along the bent lower surface 35a. Hence, after the rear fastening portion 63 is separated from the rear mount bracket 46 by the downward rotation of the sub frame 13, the rear extended portion 68 smoothly moves toward the rear of the vehicle body along the bent lower surface 35a.

In addition, when the rear fastening portion 63 is separated from the rear mount bracket 46 of the rear sub frame mounting portion 49, and then, the rear extended portion 68 is moved toward the rear of the vehicle body along the bent lower surface 35a, the sub frame 13 can smoothly be moved toward the rear of the vehicle body.

Accordingly, the moving amount of the power unit 15 toward the rear of the vehicle body can be ensured, and the deformation amount of the left front side frame 21 can be ensured.

Furthermore, as shown in FIG. 4, the concave angular portion 115 of the rear extended portion 68 faces the hard ridge 34c of the lower horizontal portion 34 of the left front side frame 21. Hence, after the front fastening portion 79 of the sub frame 13 is separated from the front mount bracket 45, and the rear fastening portion 63 of the sub frame 13 is separated from the rear mount bracket 46, the concave angular portion 115 is guided along the hard ridge 34c toward the rear of the vehicle body.

Here, as shown in FIG. 3, it is considered that the front end of the sub frame main body 61 abuts against a road surface in a state in which the rear end 61f of the sub frame main body 61 abuts against the bent lower surface 35a.

In this case, the rear end 61f of the sub frame main body 61 may be kept in a state in which it abuts against the bent lower surface 35a, and the drop of the sub frame 13 may be hindered.

On the other hand, when the concave angular portion 115 of the rear extended portion 68 is smoothly moved toward the rear of the vehicle body along the hard ridge 34c, the sub frame 13 is reliably separated (that is, dropped) from the left front side frame 21.

In addition, as shown in FIGS. 3 and 5, the left front side frame 21 includes the bending deformation permitting portion 41. The bending deformation permitting portion 41 is bent and deformed upward or outward in the vehicle width direction by the front collision load F1. Hence, the front mount bracket 45 of the front sub frame mounting portion 44 is displaced upward or outward in the vehicle width direction.

Accordingly, since the front mount bracket 45 is displaced in a direction to separate from the front fastening portion 79 of the sub frame 13, the front fastening portion 79 can satisfactorily be separated from the front mount bracket 45.

In addition, at almost the same timing as the deformation in the direction to separate from the front fastening portion 79 by the upper bent portion 37 of the left front side frame 21, the downward component force F3 of the retreat load F2 of the power unit 15 acts downward on the tilt surface 66 so as to separate from the front mount bracket 45.

Hence, the displacement (that is, the first phase difference) of the front fastening portion 79 with respect to the front mount bracket 45 of the front sub frame mounting portion 44 becomes large. When the first phase difference is increased in this way, the front fastening portion 79 can easily be separated from the front mount bracket 45.

In particular, the upper bent portion 37 (including the bending deformation permitting portion 41) of the left front side frame 21 is arranged to match the tilt surface 66 of the sub frame 13 in the longitudinal direction of the vehicle body. Hence, the timing of the deformation of the upper bent portion 37 and the timing of the interference of the rear portion 32a of the power unit 15 with the tilt surface 66 can be made to match.

Accordingly, the displacement amount (that is, the first phase difference) of the front fastening portion 79 separating from the front mount bracket 45 becomes large, and the front fastening portion 79 can reliably be separated from the front mount bracket 45.

Furthermore, as shown in FIG. 11, the slider tilt surface 107 of the slider member 67 is provided to continue to the tilt surface 66. In addition, the steering gear box 18 is covered with the slider tilt surface 107 and the slider support portion 108. Hence, when the rear portion 32a of the power unit 15 interferes with the slider tilt surface 107, the rear portion 32a of the power unit 15 can be guided toward the rear of the vehicle body along the tilting direction of the slider member 67.

That is, it is possible to prevent the rear portion 32a of the power unit 15 from being caught by the steering gear box 18. This allows the rear portion 32a of the power unit 15 to satisfactorily move onto the upper portion 61e of the sub frame main body 61.

Hence, the rear fastening portion 63 of the sub frame 13 is stably separated from the rear mount bracket 46 of the left front side frame 21.

Furthermore, as shown in FIG. 8, the frame rear portion 74 of the sub frame main body 61 is formed into an almost arch shape in a plan view. Hence, the rigidity of the sub frame main body 61 is ensured against the retreat load F2 toward the rear of the vehicle body or the downward component force F3 toward below, which is generated by the interference between the tilt surface 66 and the rear portion 32a of the power unit 15.

Hence, as shown in FIG. 3, the sub frame 13 can smoothly be rotated downward by the downward component force F3 acting on the tilt surface 66. Accordingly, the front fastening portion 79 or the rear fastening portion 63 of the sub frame 13 is sequentially satisfactorily separated from the left front side frame 21.

In addition, as shown in FIGS. 9 and 10, the bolts 89 extend through the vertical slits 88 of the vertical wall 84 of the front fastening portion 79, and the vertical wall 84 is fixed to the upper outer wall 78a of the arm portion 78 by the bolts 89 and the nuts 91. In addition, the bolt 93 extends through the horizontal slit 92 of the top portion 85 of the front fastening portion 79, and the top portion 85 is fixed to the lower surface 45a of the front mount bracket 45 by the bolt 93 and the nut 94.

Hence, when the upper bent portion 37 of the left front side frame 21 is bent and deformed upward by the front collision load F1 (see FIG. 3), the bolts 89 slip from the vertical slits 88 and satisfactorily disengage. In addition, when the left front side frame 21 is bent and deformed outward in the vehicle width direction by the front collision load F1, the bolt 93 slips from the horizontal slit 92 and satisfactorily disengages.

This allows the front sub frame mounting portion 44 of the left front side frame 21 can be displaced in a direction to separate from the front fastening portion 79 of the sub frame 13. Hence, the displacement amount (that is, the first phase difference) of the front fastening portion 79 separating from the front mount bracket 45 of the front sub frame mounting portion 44 can be increased, and the front fastening portion 79 of the sub frame 13 can reliably be separated.

In particular, the upper bent portion 37 (including the bending deformation permitting portion 41) of the left front side frame 21 matches the tilt surface 66 of the sub frame 13 in the longitudinal direction of the vehicle body. Hence, the timing of the deformation of the upper bent portion 37 and the timing of the interference of the rear portion 32a of the power unit 15 with the tilt surface 66 match.

Accordingly, the displacement amount (that is, the first phase difference) of the front fastening portion 79 separating from the front mount bracket 45 of the front sub frame mounting portion 44 becomes large, and the front fastening portion 79 of the sub frame 13 can reliably be separated from the front mount bracket 45.

Additionally, as shown in FIG. 3, the rear sub frame mounting portion 49 (more specifically, the rear mount bracket 46) of the left front side frame 21 is firmly supported by the dash cross member 24. This satisfactorily separates the rear fastening portion 63 of the sub frame 13 from the rear mount bracket 46.

Furthermore, the dash cross member 24 is provided on the surface 23a of the lower dashboard 23 on the side of the cabin 56. Hence, the dash cross member 24 need not project to the side of the engine room 29.

It is therefore possible to increase the moving amount (collision stroke) of the power unit 15 toward the rear of the vehicle body or the deformation amount (collision stroke) of the left front side frame 21 by a front collision and reliably absorb the impact energy.

Referring back to FIGS. 1 and 4 here, the suspension portion 17 is provided on the left side of the power unit 15. The suspension portion 17 includes a damper 127 with an upper end 127a supported at the top of a damper housing 125, a knuckle 128 supported at a lower end 127b of the damper 127, and the lower arm 121 supported at a lower end 128a of the knuckle 128.

The damper housing 125 is joined to the left front side frame 21 and the left upper/lower member 26.

The lower arm 121 includes an outer end 121b supported at the lower end 128a of the knuckle 128, the front end 121a supported by the front lower arm support portion 69, and the rear end 121c (see FIG. 6) supported by the rear mount bracket 46.

The front end 121a of the lower arm 121 is supported by the front lower arm support portion 69 via the bolt 122 so as to be rotatable in the vertical direction.

Additionally, as shown in FIG. 6, the rear end 121c of the lower arm 121 is stored inside the rear fastening portion 63 of the sub frame 13. The rear end 121c is mounted on the elastic member 97. In this state, the bolt 98 extends through the collar 96, and the bolt 98 extending through the collar is connected to the nut 99.

Hence, the rear end 121c of the lower arm 121 is fastened to the rear mount bracket 46 of the rear sub frame mounting portion 49 together with the rear fastening portion 63 on the same axis.

Accordingly, a front collision load F5 transmitted to the sub frame 13 by a front collision and a load F6 transmitted from a front wheel to the lower arm 121 act on the rear fastening portion 63. Hence, the rear fastening portion 63 of the sub frame 13 is more satisfactorily separated from the rear mount bracket 46.

Here, when the sub frame 13 fixes the rear fastening portion 63 of the sub frame 13 and the rear end 121c of the lower arm 121 on the same axis on the rear mount bracket 46, the rear end 121c of the lower arm 121 is firmly supported by the rear mount bracket 46.

The rigidity of the periphery of the rear end 121c of the lower arm 121 is thus improved, and the maneuvering stability is improved.

An impact absorbing method of the vehicle body front structure 10 will be described next based on FIGS. 13 to 15.

Figure 13:
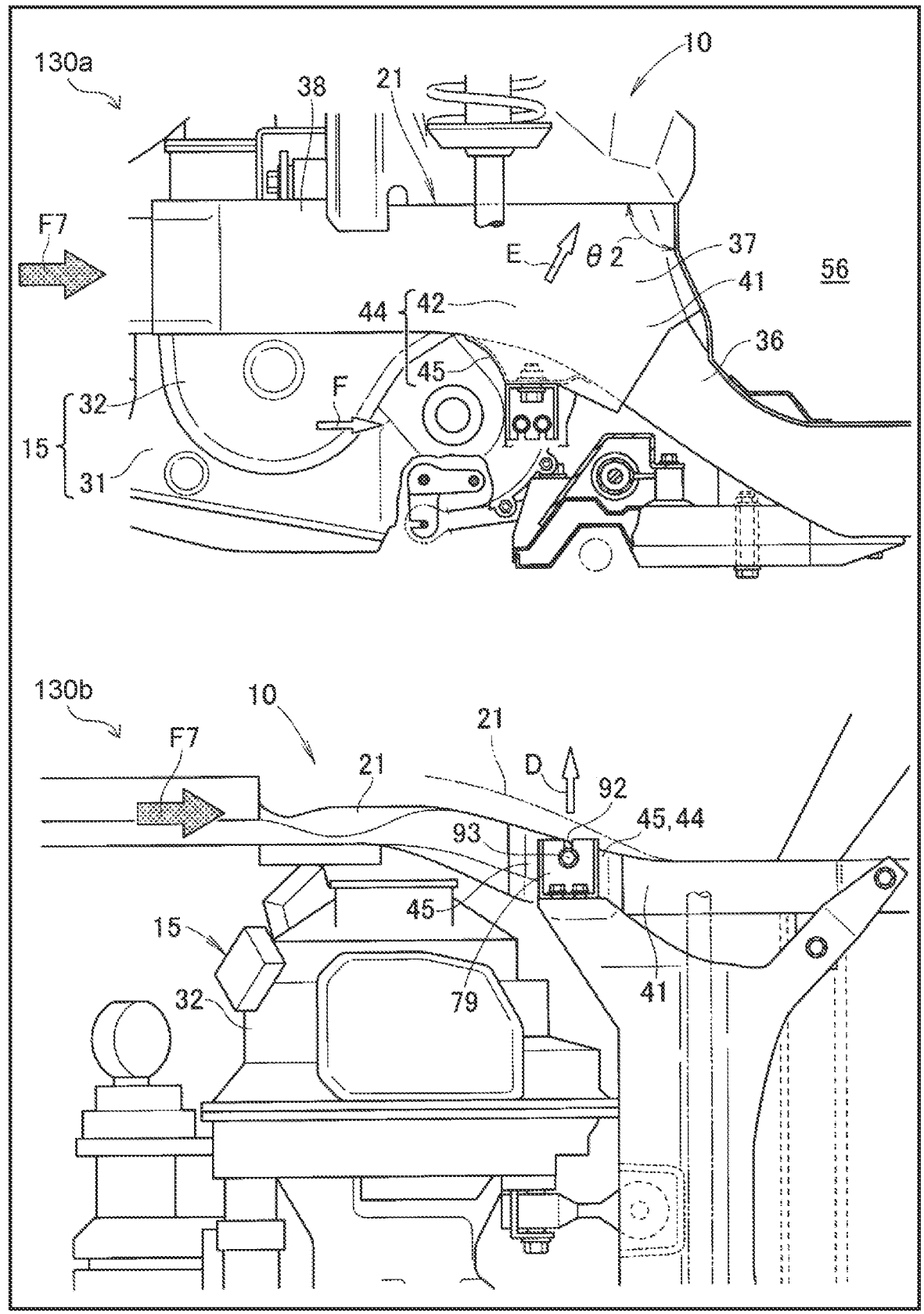
FIG. 13 is a view for explaining an example in which a left front side frame is bent and deformed outward in a vehicle width direction by a front collision load in an impact absorbing method according to the first embodiment.

As indicated by 130a in FIG. 13, in the early stage of a front collision, when the vehicle body front structure 10 causes the front collision, a front collision load F7 is input from the front side of the vehicle body to the left front side frame 21.

As indicated by 130b in FIG. 13, the power unit 15 is mounted in a lateral state in the vehicle body front structure 10. For this reason, the left front side frame 21 is widened outward in the vehicle width direction from the floor side of the cabin 56 (see 130a in FIG. 13) toward the front of the vehicle body. In addition, the upper bent portion 37 includes the bending deformation permitting portion 41.

When the front collision load F7 is input to the left front side frame 21, the bending deformation permitting portion 41 bends and deforms outward in the vehicle width direction, as indicated by an arrow D. Accordingly, the bolt 93 is displaced outward in the vehicle width direction as indicated by an arrow D together with the front mount bracket 45.

The bolt 93 on the side of the front sub frame mounting portion 44 thus moves in a direction to disengage and separate from the horizontal slit 92 of the front fastening portion 79, and a part of the first phase difference is generated.

Referring back to 130a in FIG. 13, the upper bent portion 37 and the tilt portion 36 are bent and deformed by the front collision load F7 at the same time as the bending deformation of the bending deformation permitting portion 41. Hence, the upper bent portion 37 and the upper horizontal portion 38 are displaced obliquely upward, as indicated by an arrow E. The power unit 15 thus moves toward the rear of the vehicle body, as indicated by an arrow F.

Note that it is considered that the left front side frame 21 is extended on a line in the longitudinal direction of the vehicle body without being widened outward in the vehicle width direction from the floor side of the cabin 56 toward the front of the vehicle body. In this case as well, when the upper bent portion 37 is bent to the angle θ2 in a side view, the power unit 15 moves upward, as indicated by the arrow F, so as to make the angle θ2 of the upper bent portion 37 small.

The side of the front mount bracket 45 of the front sub frame mounting portion 44 is thus displaced upward from the front fastening portion 79, and a part of the first phase difference is generated.

Figure 14:
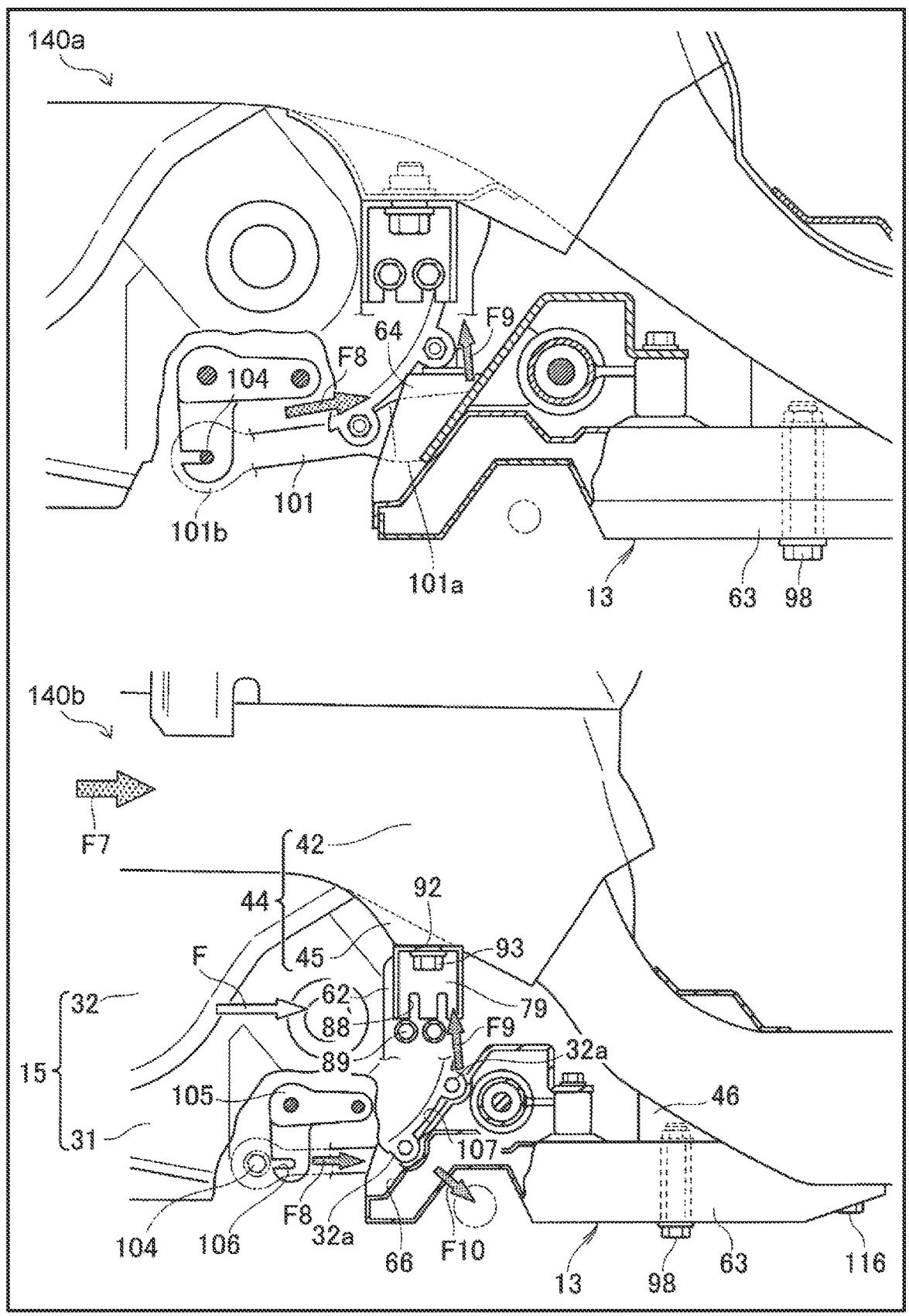
FIG. 14 is a view for explaining an example in which the front fastening portion of the sub frame is separated from the left front side frame in the impact absorbing method according to the first embodiment.

Here, as indicated by 140a in FIG. 14, the rear connecting portion 101a of the torque rod 101 is offset upward with respect to the front connecting portion 101b. In addition, the rear connecting portion 101a is located on the front side of the vehicle body with respect to the bolt 98 of the rear fastening portion 63 of the sub frame 13.

A retreat load F8 of the power unit 15 is transmitted to the connecting portion 64 of the sub frame 13 via the torque rod 101, and an upward component force F9 acts on the connecting portion 64.

In this state, as indicated by 140b in FIG. 14, the mounting bracket 105 moves toward the rear of the vehicle body, as indicated by the arrow F, together with the power unit 15. Hence, the slit 106 of the mounting bracket 105 disengages from the bolt 104.

Note that if the slit 106 is not formed in the mounting bracket 105, the torque rod 101 ruptures.

The power unit 15 thus disengages from the torque rod 101, and the power unit 15 smoothly moves toward the rear of the vehicle body, as indicated by the arrow F.

The rear portion 32a (that is, the seat portion of the transmission 32) of the power unit 15 interferes with the tilt surface 66 or the slider tilt surface 107. By the interference of the rear portion 32a, the tilt surface 66 or the slider tilt surface 107 is deformed into a concave shape by the retreat load F8 of the power unit 15. In addition, a state in which the rear portion 32a of the power unit 15 is fitted in the deformed concave portion is maintained.

Hence, the retreat load F8 of the power unit 15 is efficiently transmitted to the tilt surface 66 or the slider tilt surface 107. Accordingly, a downward component force F10 of the retreat load F7 acts downward on the tilt surface 66 or the slider tilt surface 107.

Note that in the later stage of the collision, the rear portion 32a of the power unit 15 passes over the tilt surface 66 or the slider tilt surface 107 and moves onto the upper surface of the sub frame. Hence, the concave deformation of the tilt surface 66 or the slider tilt surface 107 is not essential.

Here, the upward component force F9 (see 140a in FIG. 14) acts on the connecting portion 64 of the sub frame 13 until just before the downward component force F10 acts on the tilt surface 66 or the slider tilt surface 107. Hence, when the downward component force F10 acts on the tilt surface 66, the upward component force F9 is removed almost simultaneously.

By removing the upward component force F9 and making the downward component force F10 act, the downward component force F10 in an increased state can be made to act on the sub frame 13 (more specifically, the front fastening portion 79 or the rear fastening portion 63).

In this way, it is possible to displace the front mount bracket 45 outward in the vehicle width direction and simultaneously raise the front mount bracket 45 obliquely upward, or in either one of the states, make the downward component force F10 act in an increased state.

Hence, the displacement amount of the front fastening portion 79 with respect to the front mount bracket 45 of the front sub frame mounting portion 44 becomes large, and the first phase difference is generated.

In particular, the upper bent portion 37 (including the bending deformation permitting portion 41) of the left front side frame 21 matches the tilt surface 66 of the sub frame 13 or the slider tilt surface 107 in the longitudinal direction of the vehicle body.

Hence, the timing of the deformation of the upper bent portion 37 and the timing of interference of the rear portion 32a of the power unit 15 with the tilt surface 66 match.

Accordingly, the displacement amount (that is, the first phase difference) of the front fastening portion 79 separating from the front mount bracket 45 becomes large, and the front fastening portion 79 of the sub frame 13 can reliably be separated from the front mount bracket 45.

Note that when the front mount bracket 45 is displaced outward in the vehicle width direction, the bolt 93 disengages from the horizontal slit 92 (also see 130b in FIG. 13) of the front fastening portion 79, and when the front mount bracket 45 is raised obliquely upward, the bolts 89 disengage from the vertical slits 88.

The front fastening portion 79 of the sub frame 13 is thus reliably separated from the front mount bracket 45 of the left front side frame 21.

As indicated by 150a in FIG. 15, in the later stage of the front collision, the power unit 15 continuously moves toward the rear of the vehicle body, as indicated by the arrow F, and moves onto the upper portion 61e of the sub frame main body 61. The tilt surface 66 and the slider tilt surface 107 are pressed downward, and the sub frame 13 rotates downward, as indicated by an arrow G, using the rear end 61f of the sub frame main body 61 as a fulcrum.

Hence, the displacement amount of the rear fastening portion 63 with respect to the rear mount bracket 46 becomes large, and the second phase difference is generated. Accordingly, the rear fastening portion 63 of the sub frame 13 is reliably separated from the rear mount bracket 46 of the left front side frame 21.

In addition, the bolt 116 disengages from the lower surface 34a of the lower horizontal portion 34, and the rear end 113 of the rear extended portion 68 is separated from the lower surface 34a. Note that when the rear extended portion 68 of the sub frame 13 is changed to a plate separate from the rear fastening portion 63, the separate plate is deformed so as to bend, and the rear fastening portion 63 of the sub frame 13 is separated from the rear mount bracket 46.

Figure 15:
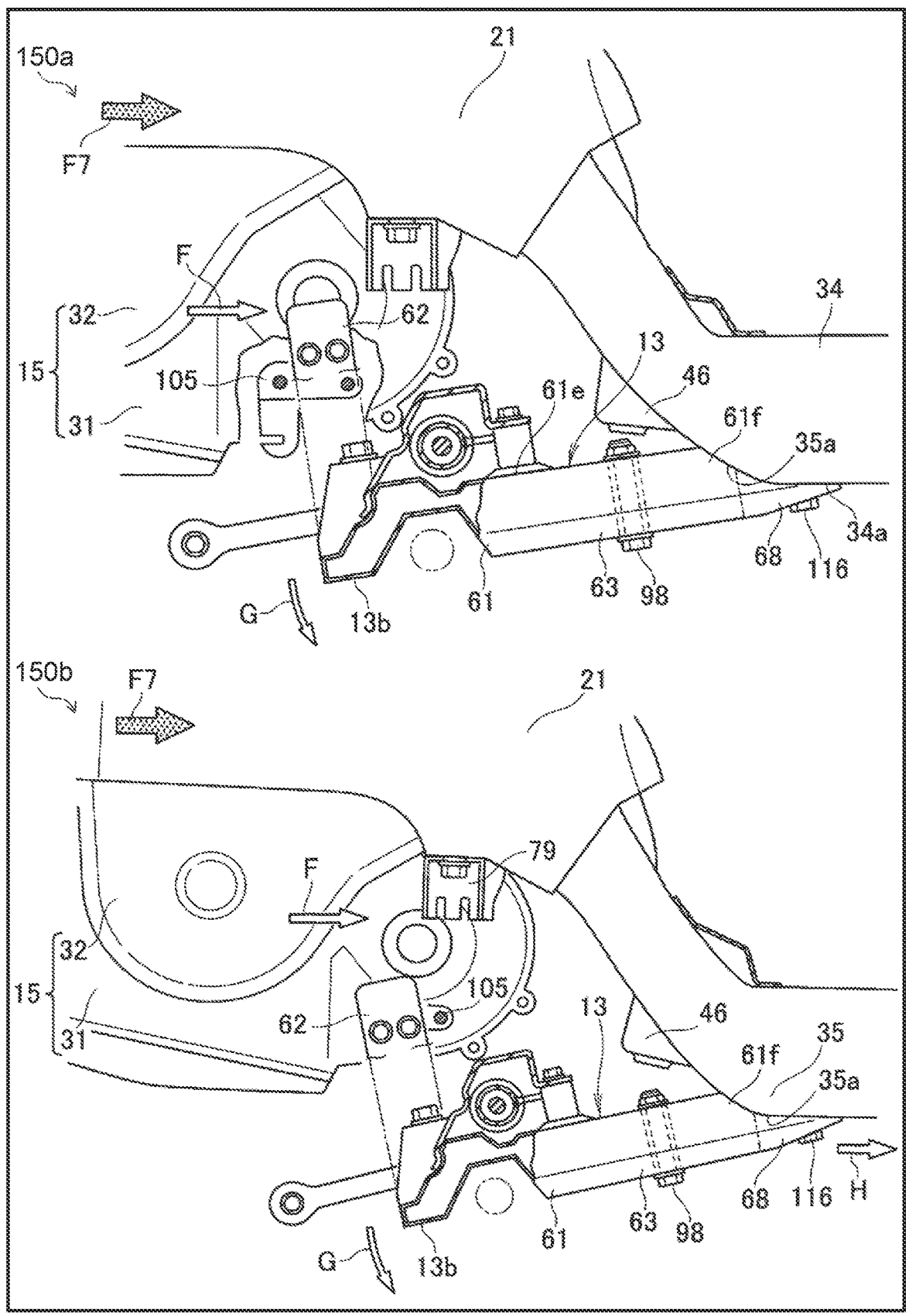
FIG. 15 is a view for explaining an example in which the rear fastening portion of the sub frame is separated from the left front side frame in the impact absorbing method according to the first embodiment.

As indicated by 150b in FIG. 15, the power unit 15 continuously moves toward the rear of the vehicle body, as indicated by the arrow F. Here, the bent lower surface 35a of the lower bent portion 35 is formed into a curve with a downward convex shape. Hence, following the movement of the power unit 15, the rear extended portion 68 of the sub frame 13 smoothly moves along the bent lower surface 35a toward the rear of the vehicle body, as indicated by an arrow H.

That is, the sub frame 13 smoothly moves toward the rear of the vehicle body, as indicated by the arrow H. This can ensure the moving amount of the power unit 15 toward the rear of the vehicle body and ensure the deformation amount of the left front side frame 21. Hence, the front collision load F7 input by the front collision can reliably be absorbed.

In addition, when the sub frame 13 smoothly moves toward the rear of the vehicle body, as indicated by the arrow H, the rear fastening portion 63 is separated from the rear mount bracket 46 before a front portion 13b of the sub frame 13 interferes with the ground. Accordingly, the sub frame 13 can be dropped downward toward the rear of the vehicle body together with the steering gear box 18.

In this way, the front fastening portion 79 and the rear fastening portion 63 of the sub frame 13 can sequentially be separated using the movement of the power unit 15 toward the rear of the vehicle body. Hence, the sub frame 13 can reliably be separated from the left front side frame 21 and dropped downward.

Accordingly, the moving amount of the power unit 15 toward the rear of the vehicle body and the deformation amount of the left front side frame 21 can be ensured, and the impact energy input by the front collision can reliably be absorbed.

Referring back to 140b in FIG. 14, when the rear portion 32a of the power unit 15 interferes with the tilt surface 66 or the slider tilt surface 107, the tilt surface 66 or the slider tilt surface 107 is deformed into a concave shape by the retreat load F7 of the power unit 15. In addition, a state in which the rear portion 32a of the power unit 15 is fitted in the deformed concave portion is maintained.

Hence, the retreat load F7 of the power unit 15 is efficiently transmitted to the front fastening portion 79 or the rear fastening portion 63. This increases the first phase difference (that is, the displacement amount of the front fastening portion 79 with respect to the front mount bracket 45). In addition, the second phase difference (that is, the displacement amount of the rear fastening portion 63 with respect to the rear mount bracket 46) is increased.

Hence, the sub frame 13 is more reliably separated from the left front side frame 21.

The second to fifth embodiments will be described next based on FIGS. 16 to 24. Note that the same reference numerals as in the first embodiment denote the same or similar constituent members in the second to fifth embodiments, and a detailed description thereof will be omitted.

Second Embodiment

A vehicle body front structure 140 according to the second embodiment will be described.

Figure 16:
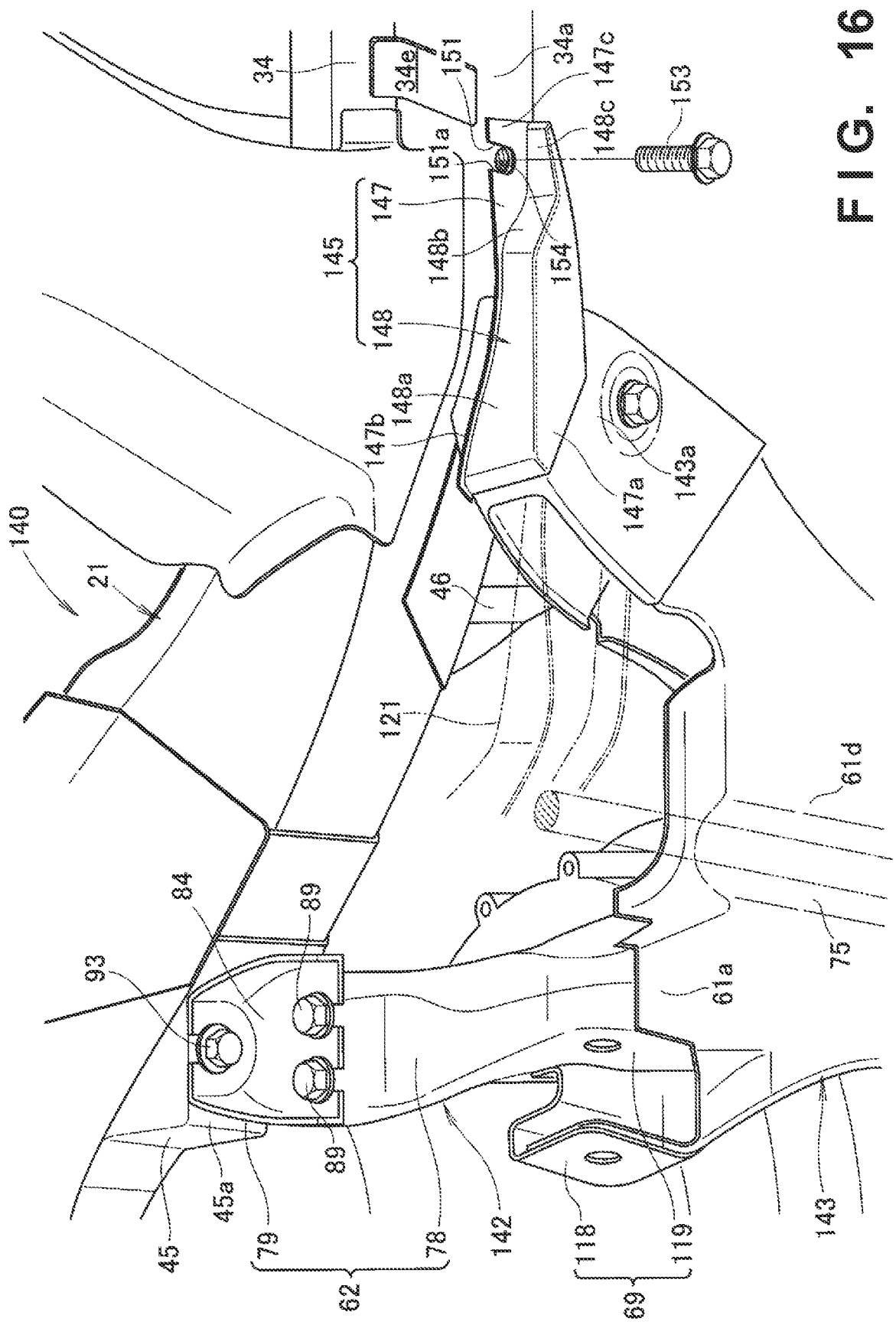
FIG. 16 is a perspective view showing a vehicle body front structure according to the second embodiment of the present invention.
Figure 17:
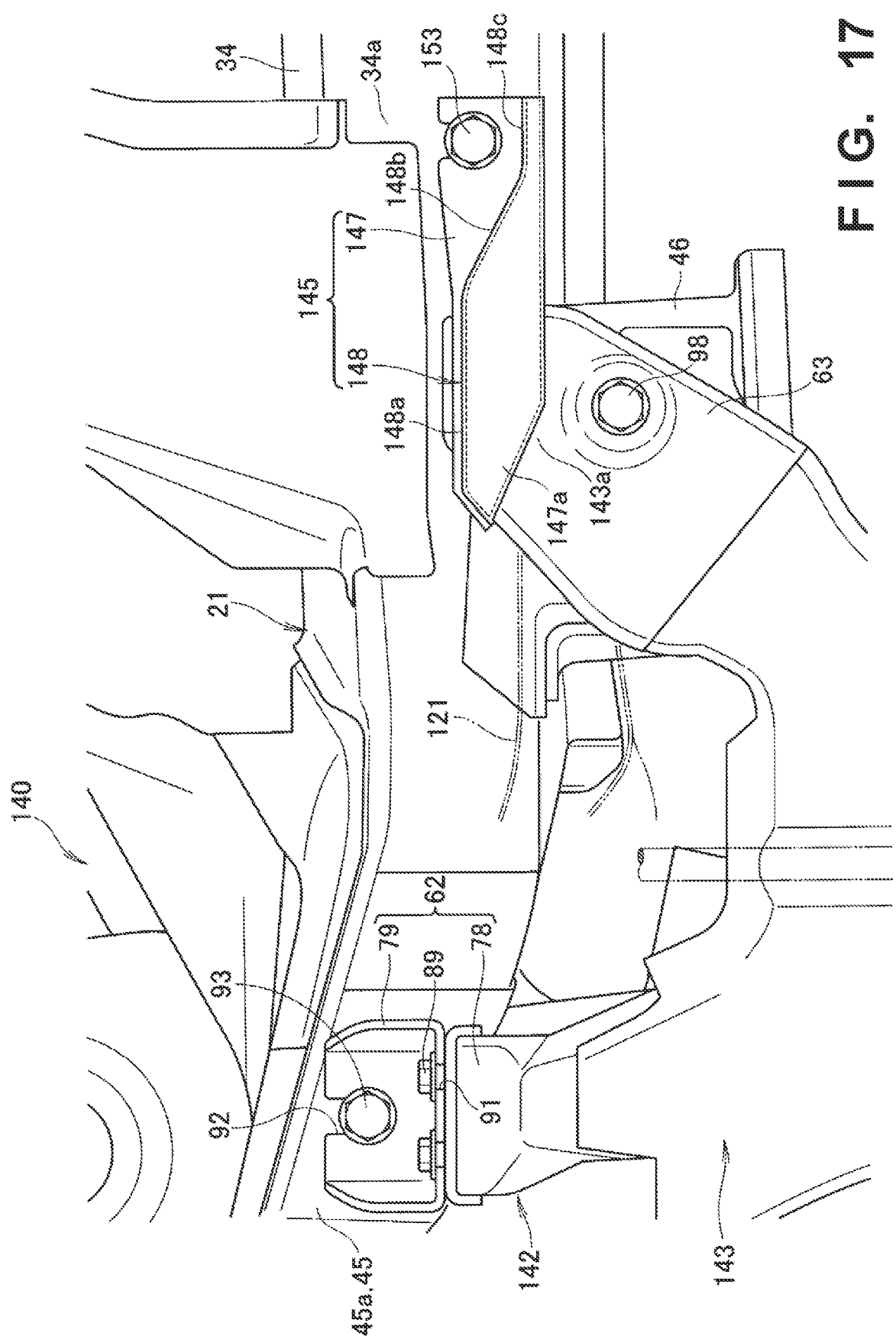
FIG. 17 is a bottom view showing the vehicle body front structure in FIG. 16.

As shown in FIGS. 16 and 17, in the vehicle body front structure 140, the sub frame 13 is changed to a sub frame 142, and the rest of the arrangement is almost the same as that of the vehicle body front structure 10 according to the first embodiment.

The sub frame 142 includes a reinforcing stay (that is, a rear extended portion) 145 mounted as a separate body on a rear end 143a of a sub frame main body 143.

The reinforcing stay 145 includes a stay main body 147 mounted on the rear end 143a of the sub frame main body 143, and a vertical wall portion 148 provided on the stay main body 147.

In the stay main body 147, a front end 147a is mounted on the rear end 143a of the sub frame main body 143, and an upper surface 147b is connected to a lower surface 34a of a lower horizontal portion 34.

More specifically, a notch 151 is formed in a rear portion 147c of the upper surface 147b of the stay main body 147. The notch 151 extends outward in the vehicle width direction, and an outer end 151a opens outward in the vehicle width direction. A bolt (fastening member) 153 extends through the notch 151 from below, and the bolt 153 extending through the notch is screwed into a nut 154.

The nut 154 is joined to an inner surface 34e of the lower surface 34a of the lower horizontal portion 34. Hence, the upper surface 147b of the stay main body 147 is fastened to the lower surface 34a of the lower horizontal portion 34 by the bolt 153 and the nut 154.

Figure 18:
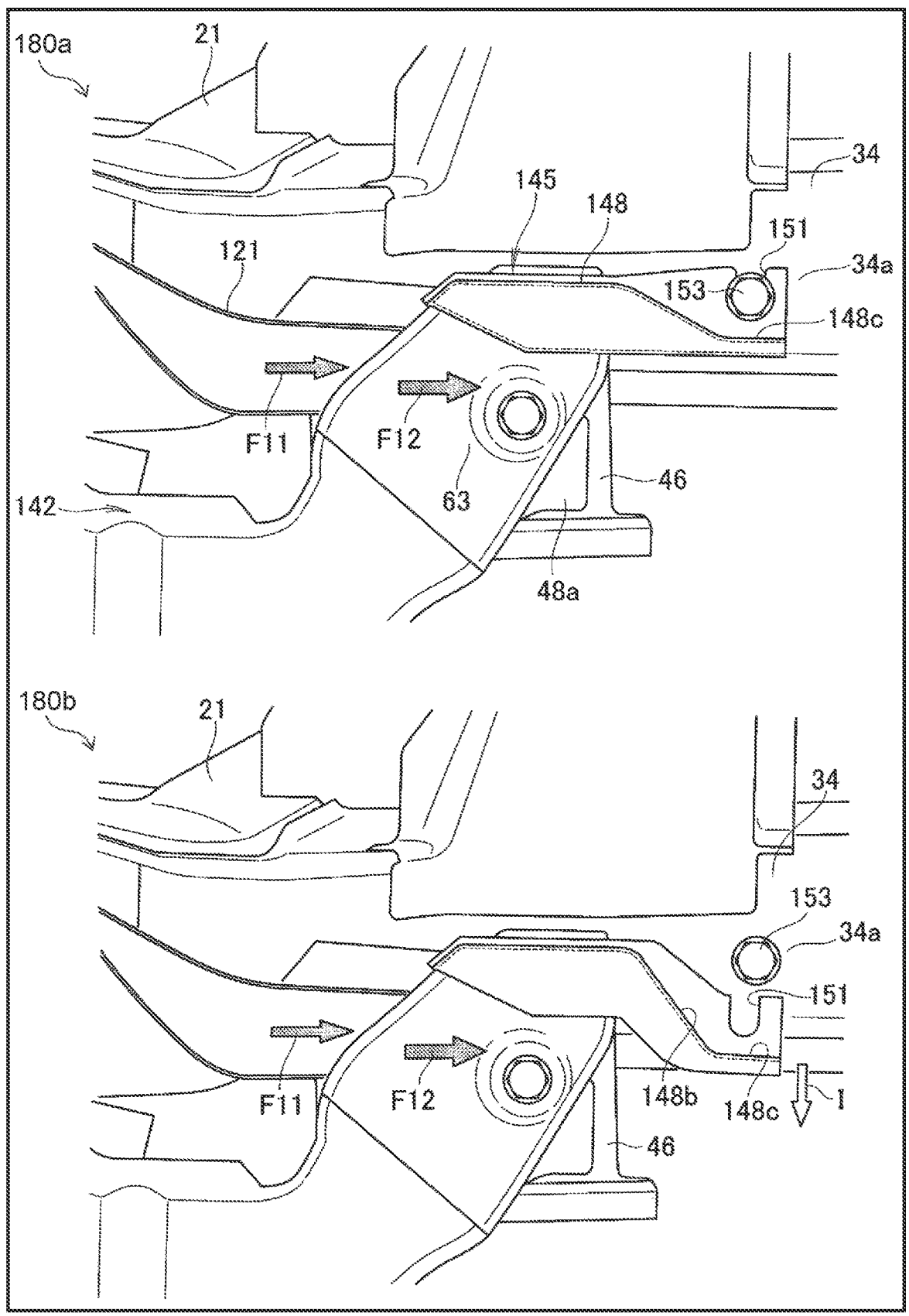
FIG. 18 is a view for explaining an example in which a stay main body according to the second embodiment is separated from a lower horizontal portion.

As shown in FIG. 18, an input load F11 that acts from a lower arm 121 of a suspension portion 17 on the rear end 143a of the sub frame main body 143 or a retreat load F12 of a power unit 15 is input to the reinforcing stay 145. The input load F11 of the lower arm 121 or the retreat load F12 of the power unit 15 is supported by the reinforcing stay 145.

Referring back to FIGS. 16 and 17, the vertical wall portion 148 is projected downward from the upper surface 147b of the stay main body 147 and extended in the longitudinal direction of the vehicle body. The vertical wall portion 148 includes a front half wall 148a extending in the longitudinal direction of the vehicle body, a tilt wall 148b extending in a tilting state from the rear end of the front half wall 148a inward in the vehicle width direction, and a rear wall (rear portion) 148c extending from the rear end (inner end) of the tilt wall 148b toward the rear of the vehicle body.

Hence, the rear wall 148c is offset (shifted) inward in the vehicle width direction with respect to the front half wall 148a. The notch 151 is formed on the outer side of the rear wall 148c in the vehicle width direction.

An example in which the stay main body 147 is separated from the lower surface 34a of the lower horizontal portion 34 will be described next based on FIG. 18.

As indicated by 180a in FIG. 18, a rear fastening portion 63 of the sub frame 142 separates from a lower surface 48a of a rear mount bracket 46. After the separation, the input load F11 of the lower arm 121 or the retreat load F12 of the power unit 15 is input to the reinforcing stay 145.

Here, in the reinforcing stay 145, the rear wall 148c of the vertical wall portion 148 is offset inward in the vehicle width direction. In addition, the notch 151 is formed on the outer side of the rear wall 148c in the vehicle width direction.

As indicated by 180b in FIG. 18, the front end or the rear end of the tilt wall 148b of the vertical wall portion 148 is bent by the input load F11 of the lower arm 121 or the retreat load F12 of the power unit 15, and the rear wall 148c is displaced inward in the vehicle width direction, as indicated by an arrow I.

Hence, the notch 151 moves inward in the vehicle width direction, and the notch 151 disengages from the bolt 153. This can reliably drop the sub frame 142 from a left front side frame 21.

A vehicle body front structure 160 according to the third embodiment will be described next.

Figure 19:
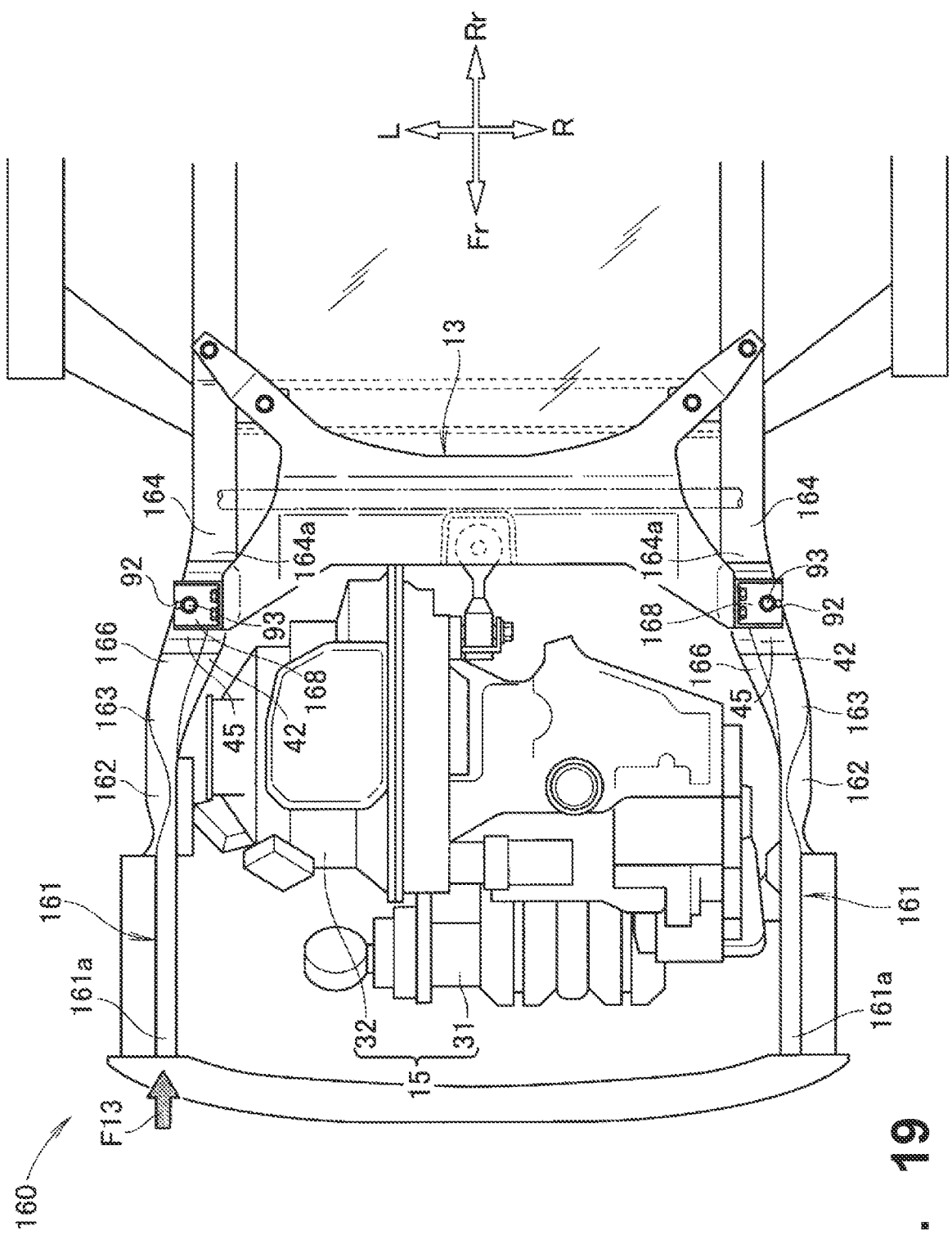
FIG. 19 is a bottom view showing a vehicle body front structure according to the third embodiment of the present invention.

As shown in FIG. 19, in the vehicle body front structure 160, the left front side frame 21 according to the first embodiment is changed to a left front side frame 161, and the right front side frame 21 according to the first embodiment is changed to the right front side frame 161.

Additionally, in the vehicle body front structure 160, the front fastening portion 79 of the sub frame 13 according to the first embodiment is changed to a front fastening portion 168.

The left front side frame 161 and the right front side frame 161 are substantially bilaterally symmetrical members. Portions of the right front side frame 161 are denoted by the same reference numerals as those of portions of the left front side frame 161, and a detailed description of the right front side frame 161 will be omitted.

In addition, the sub frame according to the third embodiment will be described as a sub frame 13 by assigning the same reference numeral as the sub frame 13 according to the first embodiment for the descriptive convenience.

The left front side frame 161 includes a first bent portion 162 located on the side of a front portion 161a, a second bent portion 163 located on the rear side of the first bent portion 162 in the vehicle body, and a third bent portion 164 located on the rear side of the second bent portion 163 in the vehicle body.

The first bent portion 162 is a portion to be deformed into an almost V shape (almost dogleg shape) inward in the vehicle width direction by a front collision load F13 input to the left front side frame 161 by a front collision.

The second bent portion 163 is a portion to be deformed into an almost V shape (almost dogleg shape) outward in the vehicle width direction by the front collision load F13 input to the left front side frame 161.

The third bent portion 164 is a portion to be deformed into an almost V shape (almost dogleg shape) when a portion 164a on the side of the second bent portion 163 is bent outward in the vehicle width direction by the front collision load F13 input to the left front side frame 161.

Here, a portion between the second bent portion 163 and the third bent portion 164 of the left front side frame 161 will be defined as a frame portion 166. Hence, when the portion 164a of the third bent portion 164 on the side of the second bent portion 163 is bent outward in the vehicle width direction, the frame portion 166 is deformed outward in the vehicle width direction using the third bent portion 164 as a fulcrum. The frame portion 166 corresponds to the upper bent portion 37 (including the bending deformation permitting portion 41) according to the first embodiment.

In addition, the frame portion 166 includes a front mounting portion 42 (denoted by the same reference numeral as the front mounting portion 42 according to the first embodiment for the descriptive convenience) of the left front side frame 161. The front fastening portion 168 is fastened to a front mount bracket 45 of the front mounting portion 42.

Figure 20:
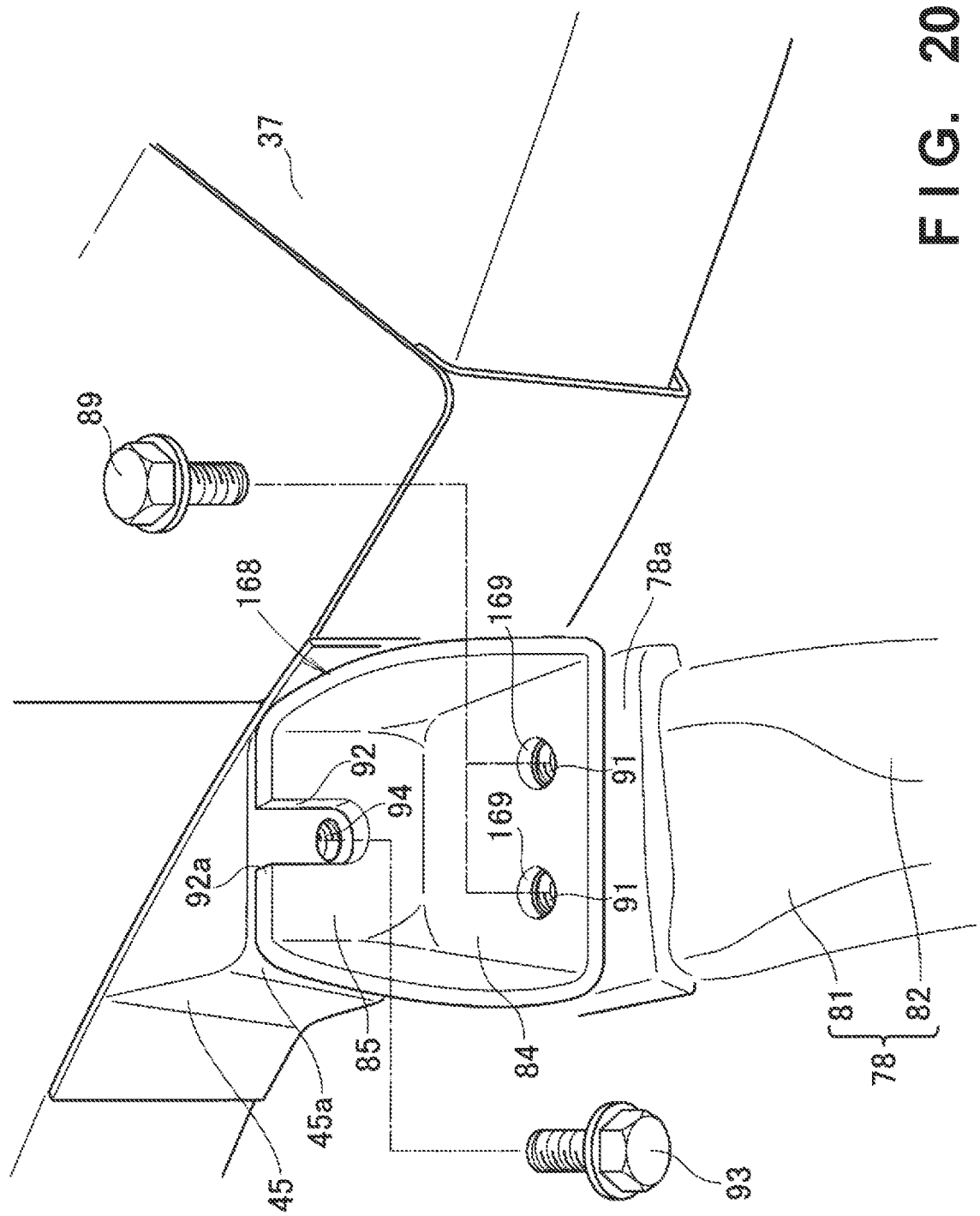
FIG. 20 is a perspective view showing a front fastening portion according to the third embodiment.

As shown in FIG. 20, a pair of mounting holes 169 are formed in the front fastening portion 168, and additionally, a horizontal slit 92 is formed as a slit. More specifically, the pair of mounting holes 169 are formed in a vertical wall 84. A bolt 89 extends through each mounting hole 169, and the bolt 89 extending through the mounting hole is screwed into a nut 91.

Here, the nut 91 is joined to the inner surface of an upper outer wall 78a. Hence, the vertical wall 84 is fastened (fixed) to the upper outer wall 78a of an arm portion 78 by the bolts 89 and the nuts 91 from the outer side in the vehicle width direction.

In addition, the horizontal slit 92 is formed in a top portion 85 to extend in the vehicle width direction, and an outer end 92a of the horizontal slit 92 opens. A bolt 93 extends through the horizontal slit 92, and the bolt 93 extending through the slit is connected to a nut 94.

Here, the nut 94 is joined to the inner surface of a lower surface 45a of the front mount bracket 45. Hence, the top portion 85 is fastened (fixed) to the lower surface 45a of the front mount bracket 45 from below by the bolt 93 and the nut 94.

That is, the vertical wall 84 is fastened to the upper outer wall 78a of the arm portion 78, and the top portion 85 is fastened to the front mount bracket 45. A left front portion 61a of a sub frame main body 61 is thus connected to the front mount bracket 45 via a front arm 62.

In this state, the front fastening portion 168 is arranged on the frame portion 166.

An example in which the sub frame 13 is dropped from the left front side frame 161 in the vehicle body front structure 160 will be described next based on FIG. 21.

Figure 21:
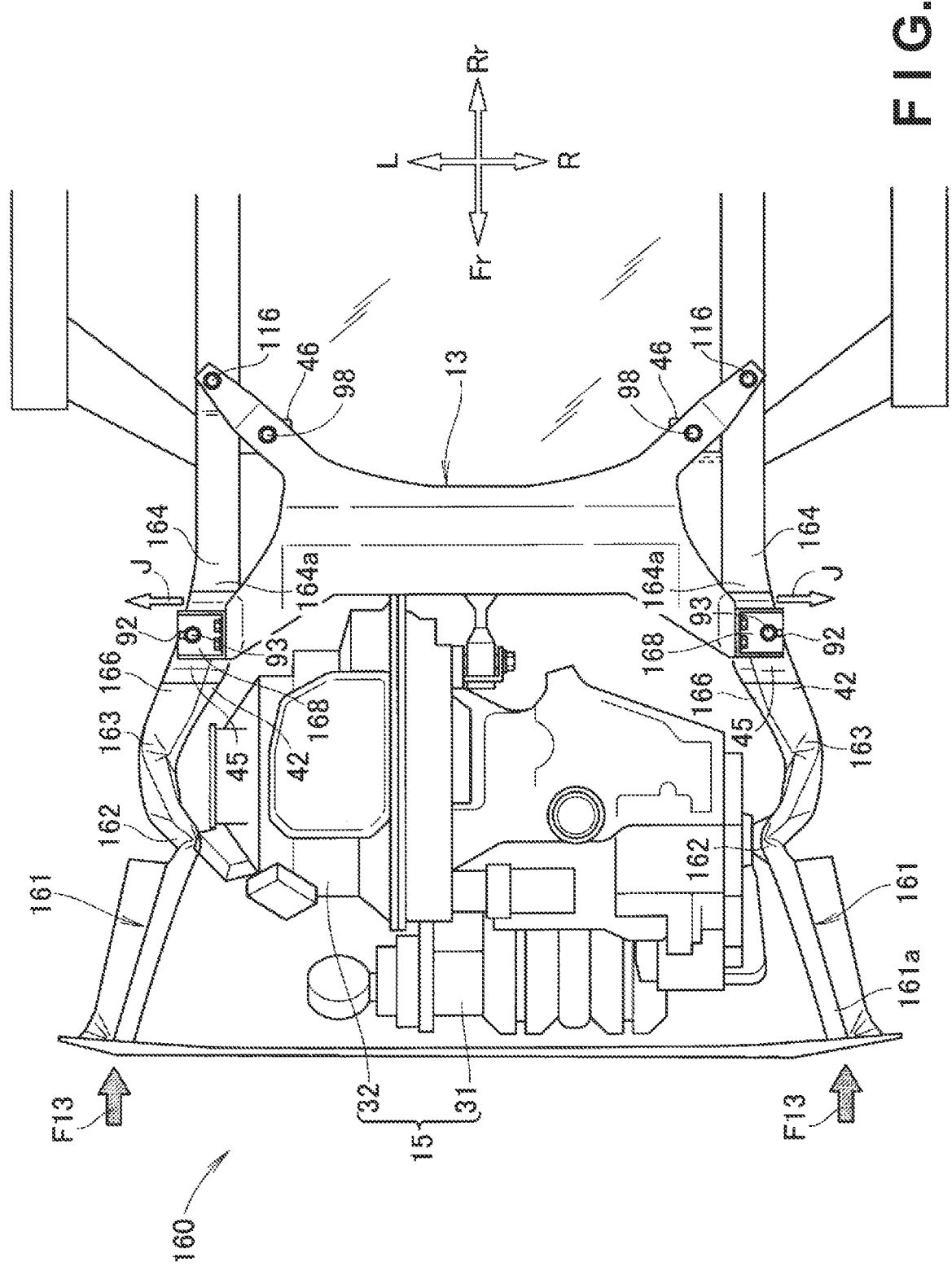
FIG. 21 is a view for explaining an example in which a sub frame is dropped from a left front side frame in the vehicle body front structure according to the third embodiment.

As shown in FIG. 21, when the vehicle body front structure 160 causes a front collision, a front collision load F13 is input to the left front side frame 161. When the front collision load F13 is input, the left front side frame 161 is bent in the vehicle width direction at three portions, that is, the first bent portion 162, the second bent portion 163, and the third bent portion 164.

More specifically, the first bent portion 162 is deformed into an almost V shape inward in the vehicle width direction. Additionally, the second bent portion 163 is deformed into an almost V shape outward in the vehicle width direction and interferes with a power unit 15. Furthermore, the portion 164a of the third bent portion 164 on the side of the second bent portion 163 is bent outward in the vehicle width direction, and the frame portion 166 is thus deformed outward in the vehicle width direction using the third bent portion 164 as a fulcrum.

In this way, the first bent portion 162 interferes with the power unit 15 and supports the power unit 15 on both sides and retreats it, thereby reliably retreating the power unit 15. It is therefore possible to generate a first phase difference and a second phase difference.

This can reliably separate and drop the sub frame 13 from the left front side frame 161, and bend the left front side frame 161 at the three portions and increase the energy absorptivity of the front collision load F13.

Here, the front mount bracket 45 is provided on the frame portion 166, and the front fastening portion 168 of the sub frame 13 is fastened to the front mount bracket 45. Hence, when the frame portion 166 is deformed outward in the vehicle width direction, the bolt 93 moves in a direction to separate from the front fastening portion 168, as indicated by an arrow J, together with the frame portion 166.

Accordingly, the bolt 93 disengages from the horizontal slit 92, and the front fastening portion 168 can satisfactorily be separated from the front mount bracket 45.

A vehicle body front structure 180 according to the fourth embodiment will be described next.

Figure 22:
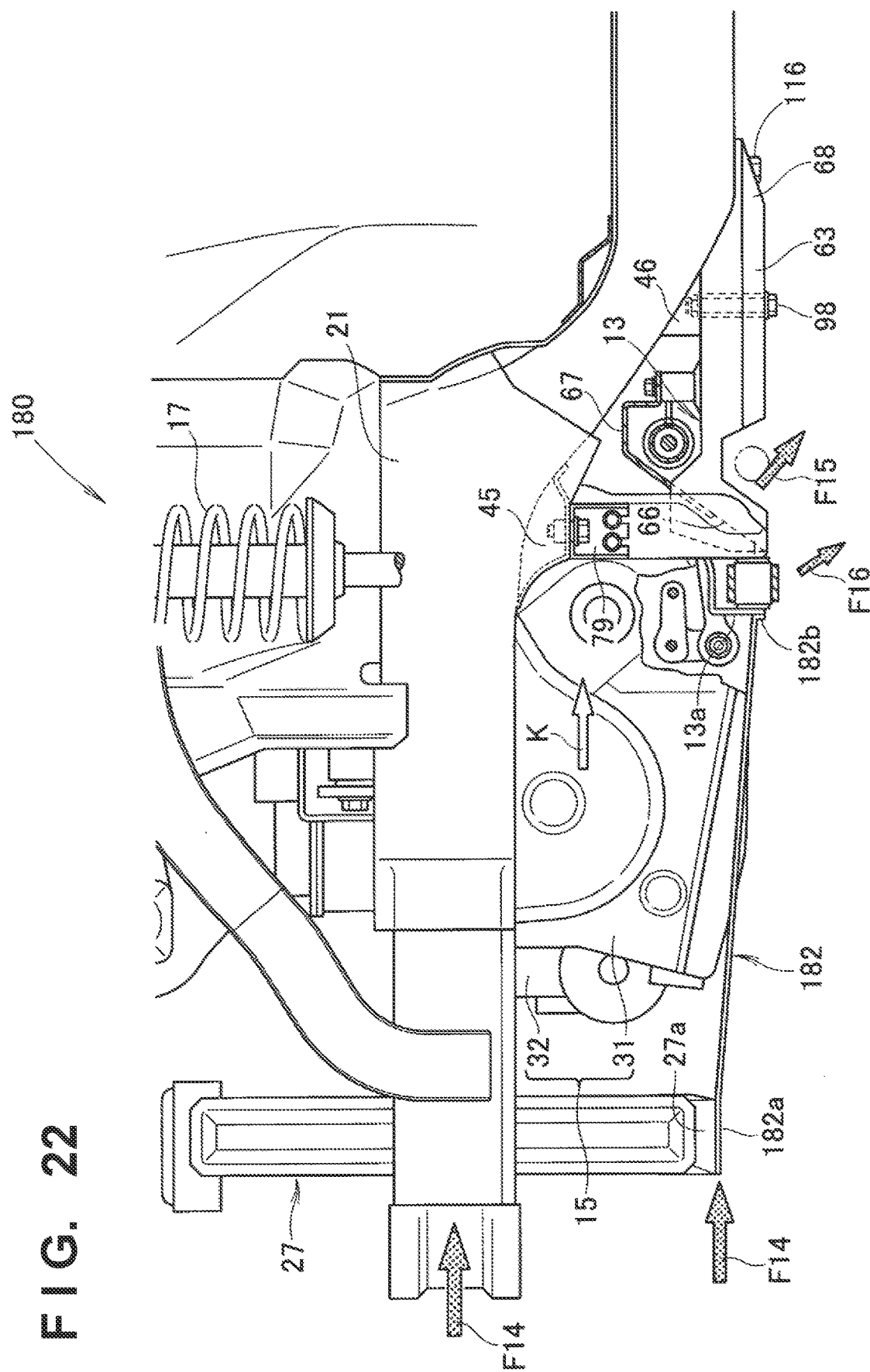
FIG. 22 is a side view showing a vehicle body front structure according to the fourth embodiment of the present invention.

As shown in FIG. 22, in the vehicle body front structure 180, a left under load path member (under load path member) 182 and a right under load path member (under load path member) 182 are added to the vehicle body front structure 10 according to the first embodiment, and the rest of the arrangement is almost the same as that of the vehicle body front structure 10 according to the first embodiment.

The left under load path member 182 and the right under load path member 182 are substantially bilaterally symmetrical members. The left under load path member 182 will be described below in detail, and a description of the right under load path member 182 will be omitted.

In the left under load path member 182, a front end 182*a* is connected to a lower end 27*a* of a front bulkhead 27, and a rear end 182*b* is connected to a front end 13*a* of a sub frame 13.

Here, the front end 13*a* of the sub frame 13 is located on the lower side of a lower end 27*a* of the front bulkhead 27. Hence, the left under load path member 182 is extended to descend from the lower end 27*a* of the front bulkhead 27 to the front end 13*a* of the sub frame 13 toward the rear of the vehicle body.

In this state, a front collision load F14 is input to a left front side frame 161 or the under load path member 182 in the early stage of a front collision. Axial collapse of the under load path member is caused by the input front collision load F14, and impact energy can be absorbed.

Additionally, as in the first embodiment, when a rear portion 32*a* of a power unit 15 interferes with a tilt surface 66 of the sub frame 13 to make a downward component force F15 act, a front fastening portion 79 of the sub frame 13 can be separated from a front mount bracket 45 of a left front side frame 21.

Here, the left under load path member 182 is extended to descend from the lower end 27*a* of the front bulkhead 27 to the front end 13*a* of the sub frame 13 toward the rear of the vehicle body.

Hence, in the later stage of the front collision, a downward component force F16 acts from the left under load path member 182 that has caused the axial collapse on the front end 13*a* of the sub frame 13. Additionally, as in the first embodiment, the power unit 15 continuously moves toward the rear of the vehicle body, as indicated by an arrow K.

In this way, in addition to the movement of the power unit 15 toward the rear of the vehicle body, the downward component force F16 is made to act by the left under load path member 182, thereby separating a rear fastening portion 63 from a rear mount bracket 46 of the left front side frame 21. It is therefore possible to satisfactorily drop the sub frame 13 from the left front side frame 21.

Accordingly, in the later stage of the front collision, the deformation amount of the left front side frame 21 and the moving amount of the power unit 15 can be ensured, and impact energy input by the front collision can be absorbed.

As described above, when the lower end 27*a* of the front bulkhead 27 and the front end 13*a* of the sub frame 13 are connected by the left under load path member 182, the impact energy can satisfactorily be absorbed in both the early stage and the later stage of the front collision.

A sub frame 190 according to the fifth embodiment will be described next.

Figure 23:
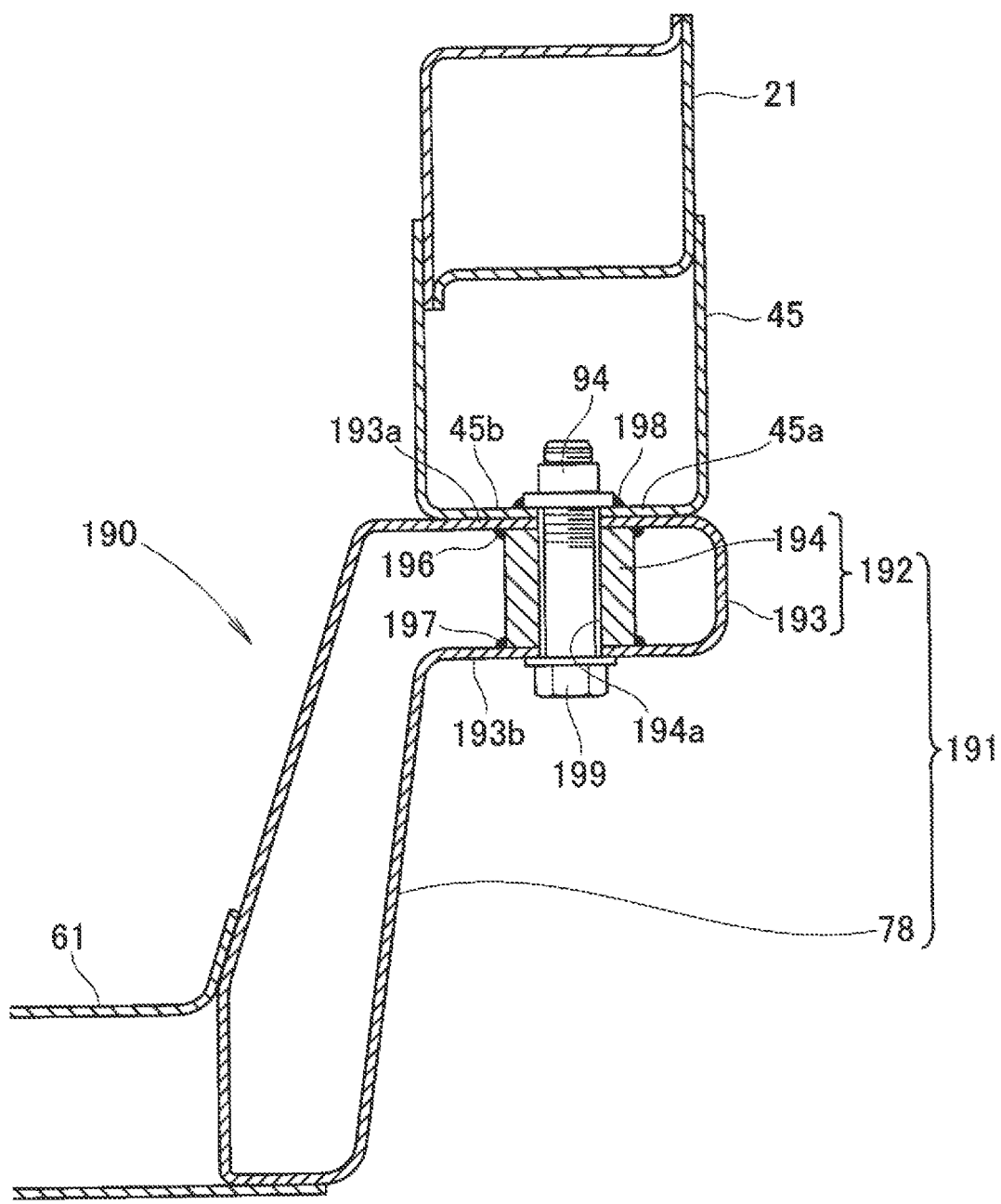
FIG. 23 is a sectional view showing a sub frame according to the fifth embodiment of the present invention.

As shown in FIG. 23, in the sub frame 190, the front arm 62 according to the first embodiment is changed to a front arm 191, and the rest of the arrangement is almost the same as that of the front arm 62 according to the first embodiment.

The front arm 191 includes an arm portion 78 raised upward from a left front portion 61*a* of a sub frame main body 61, and a front fastening portion 192 provided on an upper end 78*b* of the arm portion 78.

The arm portion according to the fifth embodiment will be described as an arm portion 78 by assigning the same reference numeral as the arm portion 78 according to the first embodiment for the descriptive convenience.

The front fastening portion 192 includes a fastening portion main body 193 formed into a hollow shape, and a through collar 194 provided in the fastening portion main body 193. The upper end of the through collar 194 is joined to an upper surface 193*a* of the fastening portion main body 193 by an upper welding portion (welding portion) 196, and the lower end of the through collar 194 is joined to a lower surface 193*b* of the fastening portion main body 193 by a lower welding portion (welding portion) 197. In this state, a through hole 194*a* of the through collar 194 is arranged in the vertical direction.

In a front mount bracket 45 of a left front side frame 21, a nut 94 is joined to an inner surface 45*b* of a lower surface 45*a* by a welding portion 198.

A bolt 199 extends through the through collar 194 from below, and the bolt 199 is fastened to the nut 94. The front fastening portion 192 is thus fastened (fixed) to the lower surface 45*a* of the front mount bracket 45.

Figure 24:
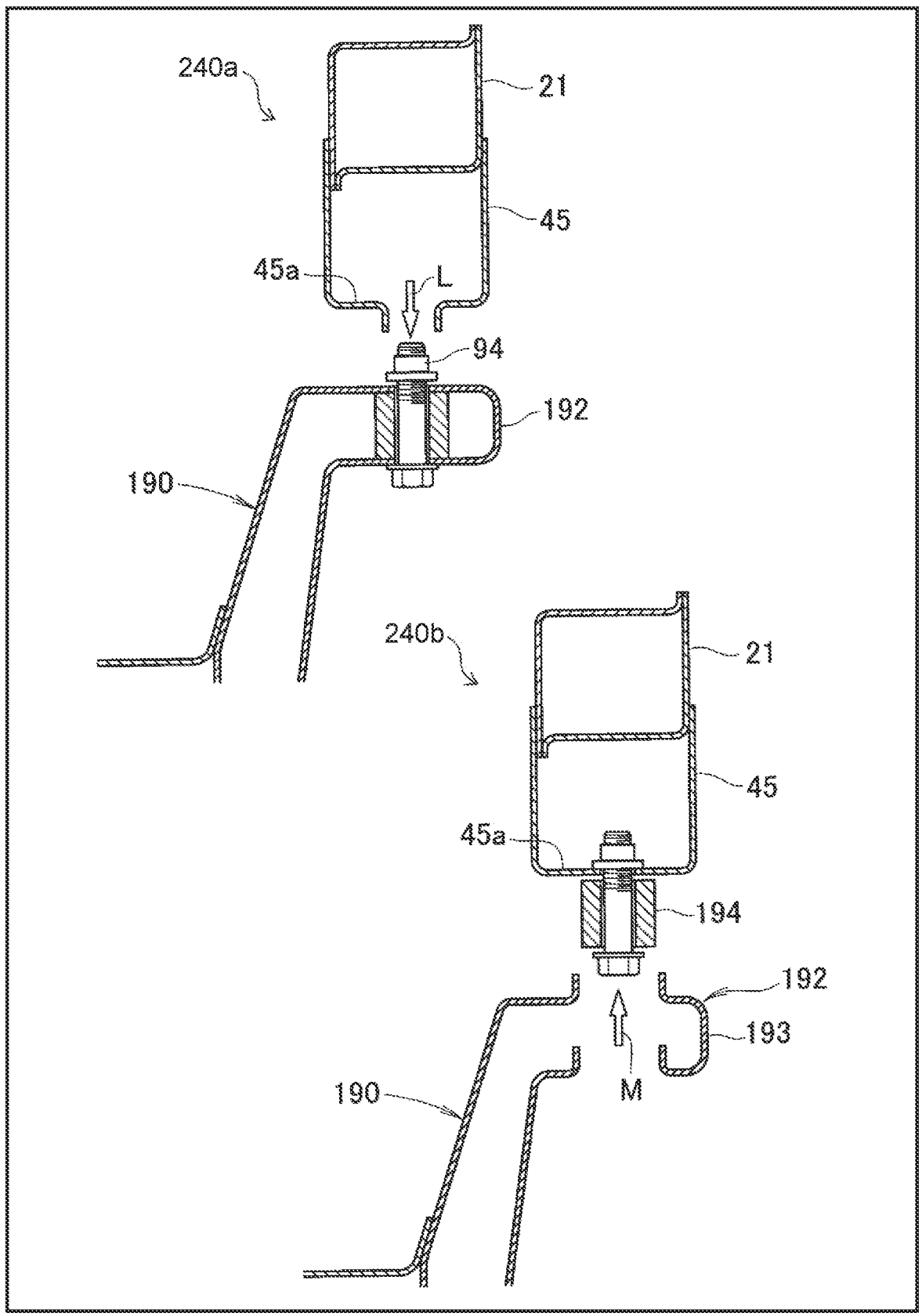
FIG. 24 is a view for explaining an example in which the sub frame according to the fifth embodiment is dropped from a left front side frame.

As indicated by 240*a* in FIG. 24, the left front side frame 21 is bent and deformed upward or outward in the vehicle width direction by a front collision load. This makes a crack in the welding portion 198 (see FIG. 23) between the nut 94 and the lower surface 45*a* of the front mount bracket 45 and ruptures the welding portion 198.

Hence, the nut 94 is pulled downward from the lower surface 45*a* of the front mount bracket 45, as indicated by an arrow L. Accordingly, the front fastening portion 192 can satisfactorily be removed downward from the lower surface 45*a* of the front mount bracket 45. It is therefore possible to reliably drop the sub frame 190 from the front mount bracket 45 of the left front side frame 21.

Alternatively, as indicated by 240*b* in FIG. 24, the left front side frame 21 is bent and deformed upward or outward in the vehicle width direction by the front collision load. This makes a crack in the upper welding portion 196 or the lower welding portion 197 (see FIG. 23) between the fastening portion main body 193 and the through collar 194 and ruptures the upper welding portion 196 or the lower welding portion 197.

Hence, the through collar 194 is pulled upward from the fastening portion main body 193, as indicated by an arrow M. Accordingly, the front fastening portion 192 can satisfactorily be removed downward from the lower surface 45*a* of the front mount bracket 45. It is therefore possible to reliably drop the sub frame 190 from the front mount bracket 45 of the left front side frame 21.

Note that the vehicle body front structure and the impact absorbing method of the vehicle body front structure according to the present invention are not limited to the above-described embodiments, and changes and improvements can appropriately be done.

For example, in the first to fifth embodiments, an example in which the front mounting portion 42 is provided on the upper bent portion 37 of the left front side frame 21, and the front mount bracket 45 is provided on the lower portion 42*a* of the front mounting portion 42 has been described. However, the present invention is not limited to this.

For example, it is also possible to provide the front mounting portion 42 on a portion of the upper horizontal portion 38 near the upper bent portion 37 or on a portion of the tilt portion 36 near the upper bent portion 37 and provide the front mount bracket 45 on the lower portion 42*a* of the front mounting portion 42.

Additionally, in the first, second, fourth, and fifth embodiments, the bending deformation permitting portion 41 that bends and deforms the left front side frame 21 upward or deforms the left front side frame 21 outward in the vehicle width direction at the upper bent portion 37 has been described. However, the present invention is not limited to this.

For example, it is also possible to cause the periphery of the portion of the left front side frame 21 to be bent and deformed to have a high strength to set a rigidity difference and displace the front mount bracket 45 upward or outward in the vehicle width direction. Alternatively, the left front side frame 21 may be bent and deformed upward or outward in the vehicle width direction by a recess, a bead shape, a hole, or the like, thereby displacing the front mount bracket 45 upward or outward in the vehicle width direction.

This can satisfactorily ensure the displacement amount (that is, the first phase difference) of the front fastening portion 79 with respect to the lower surface 45a of the front mount bracket 45. This can reliably separate the front fastening portion 79 of the sub frame 13 from the lower surface 45a of the front mount bracket 45.

Additionally, in the third embodiment, an example in which the left front side frame 161 is bent in the vehicle width direction at three portions, that is, the first bent portion 162, the second bent portion 163, and the third bent portion 164 has been described. However, the present invention is not limited to this.

For example, it is also possible to bend and deform the left front side frame 161 at two portions, that is, the second bent portion 163 and the third bent portion 164 and thus bend the left front side frame 161 only outward in the vehicle width direction. When the left front side frame 161 is bent and deformed outward in the vehicle width direction, the front mount bracket 45 can be displaced outward in the vehicle width direction.

This can satisfactorily ensure the displacement amount (that is, the first phase difference) of the front fastening portion 79 with respect to the lower surface 45a of the front mount bracket 45. This can reliably separate the front fastening portion 79 of the sub frame 13 from the lower surface 45a of the front mount bracket 45.

Additionally, in the first to fifth embodiments, an example in which the seat portion of the transmission 32 (more specifically, the transmission case) is used as the rear portion 32a of the power unit 15 has been described. However, the present invention is not limited to this.

For example, another portion of the transmission 32 or a portion of a rigid body such as the engine 31 or a motor can be used as the rear portion 32a of the power unit 15.

Furthermore, in the first, second, and fourth embodiments, an example in which the vertical slits 88 are formed in the vertical wall 84 of the front fastening portion 79 and the horizontal slit 92 is formed in the top portion 85 of the front fastening portion 79 has been described. However, the present invention is not limited to this. For example, the vertical slits 88 can also be formed only in the vertical wall 84 of the front fastening portion 79, or the vertical slits 88 can also be formed only in the top portion 85 of the front fastening portion 79.

Additionally, in the first to fifth embodiments, an example in which the rear extended portion 68 is integrally extended from the rear fastening portion 63 of the sub frame 13 has been described. However, the present invention is not limited to this, and the rear fastening portion 63 of the sub frame 13 and the rear extended portion 68 may be formed as separate bodies. That is, the rear extended portion 68 as a separate body can be extended from the rear fastening portion 63 of the sub frame 13 toward the rear of the vehicle body and outward in the vehicle width direction.

Moreover, in the first to fifth embodiments, an example in which the rear connecting portion 101a of the torque rod 101 is offset (shifted) upward with respect to the front connecting portion 101b has been described. However, the present invention is not limited to this, and the rear connecting portion 101a can also be offset downward with respect to the front connecting portion 101b.

When the rear connecting portion 101a is offset downward with respect to the front connecting portion 101b, the downward component force acts on the connecting portion 64 of the sub frame main body 61 via the torque rod 101. Hence, when the component force F3 of the retreat load F2 acts downward on the tilt surface 66 by the interference of the power unit 15, the downward load can be made to act on the rear fastening portion 63 of the sub frame 13 in an increased state.

In addition, in the first to fifth embodiments, an example in which the notch 151 is formed in the mounting bracket 105, and the notch 151 is disengaged from the bolt 153 to ensure the movement of the power unit 15 has been described. However, the present invention is not limited to this arrangement.

For example, it is also possible to cause a rupture or bending in the torque rod by the retreat load of the power unit and cancel the connection between the power unit and the sub frame. The movement of the power unit 15 is thus ensured, and the rear portion 32a of the power unit 15 interferes with the tilt surface 66 of the sub frame 13.

Furthermore, in the first to fifth embodiments, an example in which the frame rear portion 74 of the sub frame main body 61 is formed into an almost arch shape in a plan view has been described. However, the present invention is not limited to this and, for example, the frame rear portion 74 can also be formed into another shape such as an almost V shape in a plan view.

In addition, the shapes and arrangements of the vehicle body front structure, the sub frame, the power unit, the suspension portion, the steering gear box, and left and right front side frames, the lower dashboard, the dash cross member, the lower horizontal portion, the lower bent portion, the tilt portion, the upper bent portion, the upper horizontal portion, the bending deformation permitting portion, the front mount bracket, the rear mount bracket, the sub frame main body, the front arm, the rear fastening portion, the tilt surface, the slider member, the rear extended portion, the lower arm support portion, the storage concave portion, the arm portion, the front fastening portion, the vertical slit, the horizontal slit, the torque rod, the mounting bracket, the slit of the mounting bracket, the lower arm, the reinforcing stay, the vertical wall portion, the notch of the reinforcing stay, the first bent portion, the second bent portion, the third bent portion, the left and right under load path members, the through collar, and the like shown in the first to fifth embodiments are limited to those exemplified, and can appropriately be changed.

INDUSTRIAL APPLICABILITY

The present invention can suitably be applied a vehicle including a vehicle body front structure in which a sub frame is supported by front side frames, and a power unit is arranged on the front side of the sub frame in the vehicle body.

The present invention is not limited to the above embodiments, and various changes and modifications can be made within the spirit and scope of the present invention. Therefore, to apprise the public of the scope of the present invention, the following claims are made.

This application claims the benefit of Japanese Patent Application No. 2016-014299, filed Jan. 28, 2016, which is hereby incorporated by reference herein in its entirety.

REFERENCE SIGNS LIST

10 . . . vehicle body front structure
13 . . . sub frame
13b . . . front portion of sub frame
15 . . . power unit
17 . . . suspension portion
18 . . . steering gear box
21 . . . left and right front side frames (pair of front side frames)
21a . . . front portion of front side frame
21b . . . rear surface of front side frame
21c . . . front end of front side frame
23 . . . lower dashboard (dash lower)
23a . . . cabin-side surface of lower dashboard
24 . . . dash cross member
31 . . . engine
32 . . . transmission
32a . . . rear portion of power unit
32b . . . vicinity of rear portion of power unit
34 . . . lower horizontal portion
34a . . . lower surface of lower horizontal portion
35 . . . lower bent portion
35a . . . bent lower surface (lower surface of lower bent portion)
36 . . . tilt portion
37 . . . upper bent portion
38 . . . upper horizontal portion
41 . . . bending deformation permitting portion
42 . . . front mounting portion
43 . . . rear mounting portion
45 . . . front mount bracket
45a . . . lower surface of front mount bracket (lower surface of front mounting portion)
45b . . . inner surface of lower surface (inner surface of lower surface of front mounting portion)
46 . . . rear mount bracket
47 . . . upper bracket portion
48 . . . lower bracket portion
48a . . . lower surface of lower bracket portion (lower surface of rear mount bracket)
61 . . . sub frame main body
61a . . . left and right front portions of sub frame main body (left and right front portions of sub frame)
61b . . . left and right rear portions of sub frame main body (left and right rear portions of sub frame)
61d . . . lower portion of sub frame main body (lower portion of sub frame)
61f . . . rear end of sub frame main body (rear end of sub frame)
62 . . . front arm (left and right front arms)
63 . . . rear fastening portion (left and right rear fastening portions)
66 . . . tilt surface
67 . . . slider member
68 . . . rear extended portion
69 . . . front lower arm support portion (lower arm support portion)
72, 73 . . . high strength steel sheets on upper and lower sides
74 . . . frame rear portion
75 . . . storage concave portion
78 . . . arm portion
79 . . . front fastening portion (left and right front fastening portions)
81, 82 . . . high strength steel sheets on front and rear sides
88 . . . vertical slit of front fastening portion (slit)
88a . . . lower end of vertical slit
89, 91 . . . bolt and nut of front fastening portion (first fastening member)
93, 94 . . . bolt and nut of front fastening portion (second fastening member)
92 . . . horizontal slit of front fastening portion (slit)
92a . . . outer end of horizontal slit
98, 99 . . . bolt and nut of rear fastening portion (fastening member)
101 . . . torque rod
101a . . . rear connecting portion
101b . . . front connecting portion
104 . . . bolt of mounting bracket (fastening member)
105 . . . mounting bracket
106 . . . slit of mounting bracket
106a . . . front end of slit
113 . . . rear end of rear extended portion
114 . . . upper surface tilt portion of rear extended portion (upper surface of rear extended portion)
114a . . . upper surface of upper surface tilt portion (upper surface of rear extended portion)
121 . . . lower arm
145 . . . reinforcing stay (rear extended portion)
148 . . . vertical wall portion
148c . . . rear wall of vertical wall portion (rear portion)
151 . . . notch
153 . . . bolt of reinforcing stay (fastening member)
154 . . . nut of inner surface
162 . . . first bent portion
163 . . . second bent portion
164 . . . third bent portion
164a . . . portion of third bent portion on second bent portion side
182 . . . left and right under load path members (under load path member)
194 . . . through collar
F1, F5, F13, F14 . . . front collision load (impact load of front collision)
F2, F7, F12 . . . retreat load of power unit (load input to tilt surface)
F10 . . . input load from lower arm
θ3 . . . tilt angle of tilt surface

The invention claimed is:

1. An impact absorbing method of a vehicle body front structure in which a power unit is supported by a pair of front side frames, arranged on a rear side of the power unit in a vehicle body, front fastening portions and rear fastening portions of a sub frame are connected to the pair of front side frames, and a tilt surface facing a rear portion of the power unit is formed on the sub frame, said method comprising steps of:

inputting an impact load of a front collision to a front end of the front side frame toward a rear of the vehicle body in an early stage of the front collision;

bending the front side frame at a first bent portion, a second bent portion, and a third bent portion sequentially from a front to the rear;

deforming a front mounting portion of the front side frame outward in a vehicle width direction to separate the front side frame from the front fastening portion of the sub frame by the impact load to generate a first phase difference that separates the front fastening portion of the sub frame from the front side frame, and moving the power unit, sandwiched between the left and right first bent portions, toward the rear of the vehicle body;

making the rear portion of the power unit contact the tilt surface of the sub frame to press the sub frame downward in a later stage of the front collision, thereby further moving the power unit toward the rear of the vehicle body by the impact load of the front collision and moving the power unit onto the sub frame;

pressing the sub frame further downward by the power unit, thereby rotating the sub frame downward using a rear end of the sub frame as a fulcrum; and generating a second phase difference that separates the rear fastening portion, provided on a front side of the rear end of the sub frame in the vehicle body, from a rear mounting portion of the front side frame.

2. The impact absorbing method of claim 1, wherein before the collision, the sub frame has a front end disposed proximate a rear end of the power unit.

3. The impact absorbing method of claim 1, wherein before the collision, the tilt surface of the sub frame extends upwardly from a front end to a rear end thereof, thereby tilting to ascend toward a rear of the vehicle body, whereby rearward movement of the power unit on the tilt surface during the collision exerts a downward pressure on the sub frame.

4. The impact absorbing method of claim 3, wherein before the collision, a steering gear box is provided on a rear side of the tilt surface in the vehicle body, and the vehicle body front structure further comprises a slider member configured to cover the steering gear box and continue to the tilt surface.

5. The impact absorbing method of claim 1, wherein before the collision, the power unit and the sub frame are interconnected by a torque rod, and during the collision, the power unit disengages from the torque rod, and the movement of the power unit toward the rear of the vehicle body is not impeded by the torque rod.

* * * * *